United States Patent
Chang et al.

(10) Patent No.: US 10,341,826 B2
(45) Date of Patent: *Jul. 2, 2019

(54) EASY LOCATION SHARING

(71) Applicant: Apple Inc., Cupertino, CA (US)

(72) Inventors: Jae Woo Chang, San Jose, CA (US); Megan M. Frost, Cupertino, CA (US); Joshua B. Dickens, Oakland, CA (US); Stephen O. Lemay, Palo Alto, CA (US); Marcel Van Os, San Francisco, CA (US); Richard R. Dellinger, San Jose, CA (US); Lawrence Y. Yang, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,570

(22) Filed: May 21, 2018

(65) Prior Publication Data

US 2018/0270627 A1    Sep. 20, 2018

Related U.S. Application Data

(63) Continuation of application No. 15/876,673, filed on Jan. 22, 2018, now Pat. No. 9,998,888, which is a
(Continued)

(51) Int. Cl.
*H04W 24/00* (2009.01)
*H04W 4/14* (2009.01)
(Continued)

(52) U.S. Cl.
CPC ............... *H04W 4/14* (2013.01); *H04L 51/08* (2013.01); *H04L 51/20* (2013.01);
(Continued)

(58) Field of Classification Search
None
See application file for complete search history.

(56) References Cited

U.S. PATENT DOCUMENTS 5,475,653 A    12/1995 Yamada et al.
5,801,700 A    9/1998 Ferguson
(Continued)

FOREIGN PATENT DOCUMENTS

AU    2015100705 A4    6/2015
CN    201928419 U    8/2011
(Continued)

OTHER PUBLICATIONS

Final Office Action received for U.S. Appl. No. 15/188,081, dated Dec. 13, 2018, 10 pages.
(Continued)

*Primary Examiner* — Jinsong Hu
*Assistant Examiner* — Alexander J Yi
(74) *Attorney, Agent, or Firm* — Dentons US LLP

(57) ABSTRACT

Systems and methods for sharing location information during a message conversation are provided. An electronic device detects a location-sharing request from a first participant of a message conversation to share first participant location information with a second participant. The device then enables the second participant to obtain the first participant location information during a predetermined location-sharing time period. In response to detecting interaction by one of the first participant and the second participant with the message conversation during the predetermined location-sharing time period, the device extends the predetermined location-sharing time period.

33 Claims, 51 Drawing Sheets

Related U.S. Application Data continuation of application No. 15/142,661, filed on Apr. 29, 2016, now Pat. No. 10,003,938.

(60) Provisional application No. 62/205,562, filed on Aug. 14, 2015.

(51) Int. Cl.
  *H04L 12/58* (2006.01)
  *H04W 64/00* (2009.01)
  *H04W 52/02* (2009.01)

(52) U.S. Cl.
  CPC ..... *H04W 52/0209* (2013.01); *H04W 64/006* (2013.01); *Y02D 70/00* (2018.01); *Y02D 70/1244* (2018.01); *Y02D 70/1246* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/23* (2018.01); *Y02D 70/26* (2018.01)

(56) References Cited

U.S. PATENT DOCUMENTS

| | | | |
|---|---|---|---|
| 6,002,402 | A | 12/1999 | Schacher |
| 6,191,807 | B1 | 2/2001 | Hamada et al. |
| 6,323,846 | B1 | 11/2001 | Westerman et al. |
| 6,362,842 | B1 | 3/2002 | Tahara et al. |
| 6,570,557 | B1 | 5/2003 | Westerman et al. |
| 6,629,793 | B1 | 10/2003 | Miller |
| 6,677,932 | B1 | 1/2004 | Westerman |
| 6,809,724 | B1 | 10/2004 | Shiraishi et al. |
| 6,987,991 | B2 | 1/2006 | Nelson |
| 6,990,452 | B1 | 1/2006 | Ostermann et al. |
| 7,167,731 | B2 | 1/2007 | Nelson |
| 7,365,736 | B2 | 4/2008 | Marvit et al. |
| 7,419,469 | B2 | 9/2008 | Vacca |
| 7,593,749 | B2 | 9/2009 | Vallstrom et al. |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,669,135 | B2 | 2/2010 | Cunningham et al. |
| 7,789,225 | B2 | 9/2010 | Whiteis |
| 7,834,861 | B2 | 11/2010 | Lee |
| 7,844,914 | B2 | 11/2010 | Andre et al. |
| 7,908,219 | B2 | 3/2011 | Abanami et al. |
| 7,957,762 | B2 | 6/2011 | Herz et al. |
| 8,006,002 | B2 | 8/2011 | Kalayjian et al. |
| 8,074,172 | B2 | 12/2011 | Kocienda et al. |
| 8,121,586 | B2 | 2/2012 | Araradian et al. |
| 8,232,973 | B2 | 7/2012 | Kocienda et al. |
| 8,239,784 | B2 | 8/2012 | Hotelling et al. |
| 8,255,810 | B2 | 8/2012 | Moore et al. |
| 8,255,830 | B2 | 8/2012 | Ording et al. |
| 8,279,180 | B2 | 10/2012 | Hotelling et al. |
| 8,285,258 | B2 | 10/2012 | Schultz et al. |
| 8,381,135 | B2 | 2/2013 | Hotelling et al. |
| 8,456,297 | B2 | 6/2013 | Van Os |
| 8,479,122 | B2 | 7/2013 | Hotelling et al. |
| 8,572,493 | B2 | 10/2013 | Qureshi |
| 8,811,951 | B1 | 8/2014 | Faaborg et al. |
| 8,893,023 | B2 | 11/2014 | Perry et al. |
| 8,922,485 | B1 | 12/2014 | Lloyd |
| 8,996,639 | B1 | 3/2015 | Faaborg et al. |
| 9,100,944 | B2 | 8/2015 | Newham et al. |
| 9,185,062 | B1 | 11/2015 | Yang et al. |
| 9,191,988 | B2 | 11/2015 | Newham |
| 9,207,835 | B1 | 12/2015 | Yang et al. |
| 9,317,870 | B2 | 4/2016 | Tew et al. |
| 9,400,489 | B2 | 7/2016 | Kim et al. |
| 9,477,208 | B2 | 10/2016 | Lee et al. |
| 9,575,591 | B2 | 2/2017 | Yang et al. |
| 9,904,906 | B2 | 2/2018 | Kim et al. |
| 2002/0015024 | A1 | 2/2002 | Westerman et al. |
| 2002/0037715 | A1 | 3/2002 | Mauney et al. |
| 2002/0115478 | A1 | 8/2002 | Fujisawa et al. |
| 2003/0081506 | A1 | 5/2003 | Karhu |
| 2004/0070511 | A1 | 4/2004 | Kim |
| 2005/0081150 | A1 | 4/2005 | Beardow |
| 2005/0156873 | A1 | 7/2005 | Walter et al. |
| 2005/0190059 | A1 | 9/2005 | Wehrenberg |
| 2005/0191159 | A1 | 9/2005 | Benko |
| 2005/0268237 | A1 | 12/2005 | Crane et al. |
| 2005/0289173 | A1 | 12/2005 | Vacca |
| 2006/0017692 | A1 | 1/2006 | Wehrenberg et al. |
| 2006/0019649 | A1 | 1/2006 | Feinleib et al. |
| 2006/0026245 | A1 | 2/2006 | Cunningham et al. |
| 2006/0026536 | A1 | 2/2006 | Hotelling et al. |
| 2006/0033724 | A1 | 2/2006 | Chaudhri et al. |
| 2006/0044283 | A1 | 3/2006 | Eri et al. |
| 2006/0053386 | A1 | 3/2006 | Kuhl et al. |
| 2006/0195787 | A1 | 8/2006 | Topiwala et al. |
| 2006/0197753 | A1 | 9/2006 | Hotelling |
| 2007/0002077 | A1 | 1/2007 | Gopalakrishnan |
| 2007/0036300 | A1 | 2/2007 | Brown et al. |
| 2007/0085157 | A1 | 4/2007 | Fadell et al. |
| 2007/0117549 | A1 | 5/2007 | Arnos |
| 2007/0150834 | A1 | 6/2007 | Muller et al. |
| 2007/0150836 | A1 | 6/2007 | Deggelmann et al. |
| 2007/0150842 | A1 | 6/2007 | Chaudhri et al. |
| 2007/0216659 | A1 | 9/2007 | Amineh |
| 2007/0236475 | A1 | 10/2007 | Wherry |
| 2007/0271340 | A1 | 11/2007 | Goodman et al. |
| 2008/0014989 | A1 | 1/2008 | Sandegard et al. |
| 2008/0052945 | A1 | 3/2008 | Matas et al. |
| 2008/0055264 | A1 | 3/2008 | Anzures et al. |
| 2008/0057926 | A1 | 3/2008 | Forstall et al. |
| 2008/0070593 | A1 | 3/2008 | Altman et al. |
| 2008/0079589 | A1 | 4/2008 | Blackadar |
| 2008/0133479 | A1 | 6/2008 | Zelevinsky et al. |
| 2008/0165136 | A1 | 7/2008 | Christie et al. |
| 2008/0168144 | A1 | 7/2008 | Lee |
| 2008/0228386 | A1 | 9/2008 | Geelen et al. |
| 2008/0320391 | A1 | 12/2008 | Lemay et al. |
| 2009/0005011 | A1 | 1/2009 | Christie et al. |
| 2009/0037536 | A1 | 2/2009 | Braam |
| 2009/0049502 | A1 | 2/2009 | Levien et al. |
| 2009/0051648 | A1 | 2/2009 | Shamaie et al. |
| 2009/0051649 | A1 | 2/2009 | Rondel |
| 2009/0055494 | A1 | 2/2009 | Fukumoto |
| 2009/0113315 | A1 | 4/2009 | Fisher et al. |
| 2009/0164219 | A1 | 6/2009 | Yeung et al. |
| 2009/0172599 | A1 | 7/2009 | Nezu |
| 2009/0177981 | A1 | 7/2009 | Christie et al. |
| 2009/0181724 | A1 | 7/2009 | Vargas et al. |
| 2009/0187842 | A1 | 7/2009 | Collins et al. |
| 2009/0254840 | A1* | 10/2009 | Churchill .............. G06F 3/0481 715/753 |
| 2009/0284471 | A1 | 11/2009 | Longe et al. |
| 2009/0298444 | A1 | 12/2009 | Shigeta |
| 2009/0306969 | A1 | 12/2009 | Goud et al. |
| 2010/0058231 | A1 | 3/2010 | Duarte et al. |
| 2010/0124906 | A1 | 5/2010 | Hautala |
| 2010/0125785 | A1* | 5/2010 | Moore ................ G06F 3/04817 715/702 |
| 2010/0281409 | A1 | 11/2010 | Rainisto et al. |
| 2010/0309149 | A1 | 12/2010 | Blumenberg et al. |
| 2010/0325194 | A1 | 12/2010 | Williamson et al. |
| 2010/0332518 | A1 | 12/2010 | Song et al. |
| 2011/0003587 | A1 | 1/2011 | Belz et al. |
| 2011/0059769 | A1 | 3/2011 | Brunolli |
| 2011/0080356 | A1 | 4/2011 | Kang et al. |
| 2011/0151418 | A1 | 6/2011 | Delespaul et al. |
| 2011/0157046 | A1 | 6/2011 | Lee et al. |
| 2011/0164058 | A1 | 7/2011 | Lemay |
| 2011/0167383 | A1 | 7/2011 | Schuller et al. |
| 2011/0183650 | A1 | 7/2011 | McKee |
| 2011/0254684 | A1 | 10/2011 | Antoci |
| 2011/0265041 | A1 | 10/2011 | Ganetakos et al. |
| 2011/0279323 | A1 | 11/2011 | Hung et al. |
| 2011/0306393 | A1 | 12/2011 | Goldman et al. |

(56) References Cited

U.S. PATENT DOCUMENTS

| | | |
|---|---|---|
| 2011/0316769 A1 | 12/2011 | Boettcher et al. |
| 2012/0008526 A1 | 1/2012 | Borghei et al. |
| 2012/0022872 A1 | 1/2012 | Gruber et al. |
| 2012/0102437 A1 | 4/2012 | Worley et al. |
| 2012/0105358 A1 | 5/2012 | Momeyer et al. |
| 2012/0108215 A1 | 5/2012 | Kameli |
| 2012/0117507 A1 | 5/2012 | Tseng et al. |
| 2012/0131458 A1 | 5/2012 | Hayes |
| 2012/0136855 A1 | 5/2012 | Ni et al. |
| 2012/0150970 A1 | 6/2012 | Peterson et al. |
| 2012/0158511 A1 | 6/2012 | Lucero et al. |
| 2012/0172088 A1 | 7/2012 | Kirch et al. |
| 2012/0218177 A1 | 8/2012 | Pang et al. |
| 2012/0239949 A1 | 9/2012 | Kalyanasundaram et al. |
| 2012/0302256 A1 | 11/2012 | Pai et al. |
| 2012/0304084 A1 | 11/2012 | Kim et al. |
| 2012/0306770 A1 | 12/2012 | Moore et al. |
| 2013/0007665 A1 | 1/2013 | Chaudhri et al. |
| 2013/0026293 A1 | 1/2013 | Schneider et al. |
| 2013/0063364 A1 | 3/2013 | Moore |
| 2013/0065566 A1 | 3/2013 | Gisby et al. |
| 2013/0091298 A1 | 4/2013 | Ozzie et al. |
| 2013/0093833 A1 | 4/2013 | Al-Asaaed et al. |
| 2013/0120106 A1 | 5/2013 | Cauwels et al. |
| 2013/0159919 A1 | 6/2013 | Leydon |
| 2013/0159941 A1 | 6/2013 | Langlois et al. |
| 2013/0204897 A1 | 8/2013 | McDougall |
| 2013/0212470 A1 | 8/2013 | Karunamuni et al. |
| 2013/0222236 A1 | 8/2013 | Gardenfors et al. |
| 2013/0234924 A1 | 9/2013 | Janefalkar et al. |
| 2013/0243924 A1 | 9/2013 | Bhandari et al. |
| 2013/0244633 A1 | 9/2013 | Jacobs et al. |
| 2013/0246329 A1 | 9/2013 | Pasquero et al. |
| 2013/0254714 A1 | 9/2013 | Shin et al. |
| 2013/0262298 A1 | 10/2013 | Morley |
| 2013/0275923 A1 | 10/2013 | Griffin et al. |
| 2013/0275924 A1* | 10/2013 | Weinberg ............... G06F 3/017 715/863 |
| 2013/0300645 A1 | 11/2013 | Fedorov |
| 2013/0310089 A1 | 11/2013 | Gianoukos et al. |
| 2013/0322634 A1 | 12/2013 | Bennett et al. |
| 2013/0325970 A1 | 12/2013 | Roberts et al. |
| 2013/0346882 A1 | 12/2013 | Shiplacoff et al. |
| 2013/0347018 A1 | 12/2013 | Limp et al. |
| 2014/0025737 A1 | 1/2014 | Kruglick |
| 2014/0055552 A1 | 2/2014 | Song et al. |
| 2014/0066105 A1* | 3/2014 | Bridge ............... H04L 65/1003 455/457 |
| 2014/0073256 A1 | 3/2014 | Newham et al. |
| 2014/0085487 A1 | 3/2014 | Park et al. |
| 2014/0136990 A1 | 5/2014 | Gonnen et al. |
| 2014/0156262 A1 | 6/2014 | Yuen et al. |
| 2014/0163954 A1 | 6/2014 | Joshi et al. |
| 2014/0181183 A1 | 6/2014 | Houjou et al. |
| 2014/0240122 A1 | 8/2014 | Roberts et al. |
| 2014/0282211 A1 | 9/2014 | Ady et al. |
| 2014/0337438 A1 | 11/2014 | Govande et al. |
| 2014/0365944 A1 | 12/2014 | Moore et al. |
| 2015/0007049 A1 | 1/2015 | Langlois |
| 2015/0040029 A1 | 2/2015 | Koum et al. |
| 2015/0089660 A1* | 3/2015 | Song ............... G06F 3/0481 726/26 |
| 2015/0100537 A1 | 4/2015 | Grieves et al. |
| 2015/0102992 A1 | 4/2015 | Klement et al. |
| 2015/0172393 A1 | 6/2015 | Oplinger et al. |
| 2015/0185849 A1 | 7/2015 | Levesque et al. |
| 2015/0222586 A1 | 8/2015 | Ebersman et al. |
| 2015/0248389 A1 | 9/2015 | Kahn et al. |
| 2015/0256491 A1 | 9/2015 | Eatough et al. |
| 2015/0264303 A1 | 9/2015 | Chastney et al. |
| 2015/0286387 A1 | 10/2015 | Gu et al. |
| 2015/0286391 A1 | 10/2015 | Jacobs et al. |
| 2015/0312185 A1 | 10/2015 | Langholz et al. |
| 2015/0347985 A1 | 12/2015 | Gross et al. |
| 2015/0350141 A1 | 12/2015 | Yang et al. |
| 2016/0036996 A1 | 2/2016 | Midholt et al. |
| 2016/0041597 A1 | 2/2016 | Graham et al. |
| 2016/0054841 A1 | 2/2016 | Yang et al. |
| 2016/0062540 A1 | 3/2016 | Yang et al. |
| 2016/0065707 A1 | 3/2016 | Yang et al. |
| 2016/0065708 A1 | 3/2016 | Yang et al. |
| 2016/0066277 A1 | 3/2016 | Yang et al. |
| 2016/0073223 A1 | 3/2016 | Woolsey et al. |
| 2016/0182410 A1 | 6/2016 | Janakiraman et al. |
| 2016/0224540 A1 | 8/2016 | Stewart et al. |
| 2016/0294958 A1* | 10/2016 | Zhang ............... H04W 4/02 |
| 2016/0295384 A1 | 10/2016 | Shan et al. |
| 2016/0299526 A1 | 10/2016 | Inagaki et al. |
| 2016/0337301 A1 | 11/2016 | Rollins et al. |
| 2016/0342141 A1 | 11/2016 | Koumaiha |
| 2016/0359771 A1 | 12/2016 | Sridhar |
| 2017/0048686 A1 | 2/2017 | Chang et al. |
| 2017/0063753 A1 | 3/2017 | Probasco et al. |
| 2017/0075878 A1 | 3/2017 | Jon et al. |
| 2017/0083189 A1 | 3/2017 | Yang et al. |
| 2017/0083202 A1 | 3/2017 | Yang et al. |
| 2017/0147197 A1 | 5/2017 | Yang et al. |
| 2017/0153795 A1 | 6/2017 | Yang et al. |
| 2017/0220212 A1 | 8/2017 | Yang et al. |
| 2018/0146349 A1 | 5/2018 | Chang et al. |

FOREIGN PATENT DOCUMENTS

| | | |
|---|---|---|
| CN | 102595302 A | 9/2012 |
| CN | 103207674 A | 7/2013 |
| CN | 103309606 A | 9/2013 |
| CN | 103500079 A | 1/2014 |
| CN | 103583031 A | 2/2014 |
| CN | 103959751 A | 7/2014 |
| CN | 104205785 A | 12/2014 |
| CN | 205263700 U | 5/2016 |
| EP | 2574026 A1 | 3/2013 |
| EP | 2610701 A1 | 7/2013 |
| EP | 2610701 A9 | 4/2014 |
| EP | 2849042 A1 | 3/2015 |
| GB | 2550639 A | 11/2017 |
| JP | 2002-366485 A | 12/2002 |
| JP | 2006-72489 A | 3/2006 |
| JP | 2006-113637 A | 4/2006 |
| JP | 2006-129429 A | 5/2006 |
| JP | 2010-503126 A | 1/2010 |
| JP | 2010-503332 A | 1/2010 |
| JP | 2011-107823 A | 6/2011 |
| JP | 2012-508530 A | 4/2012 |
| JP | 2013-48389 A | 3/2013 |
| KR | 10-2004-0089329 A | 10/2004 |
| WO | 2008/030972 A1 | 3/2008 |
| WO | 2009/071112 A1 | 6/2009 |
| WO | 2010/054373 A2 | 5/2010 |
| WO | 2012/128824 A1 | 9/2012 |
| WO | 2012/170446 A2 | 12/2012 |
| WO | 2013/093558 A1 | 6/2013 |
| WO | 2013/169875 A2 | 11/2013 |
| WO | 2014/105276 A1 | 7/2014 |
| WO | 2015/038684 A1 | 3/2015 |
| WO | 2015/087084 A1 | 6/2015 |
| WO | 2015/120358 A1 | 8/2015 |

OTHER PUBLICATIONS

Extended European Search Report received for European Patent Application No. 16807953.1, dated Dec. 4, 2018, 7 Pages.
Final Office Action received for U.S. Appl. No. 14/928,865, dated Dec. 5, 2018, 15 pages.
iOS 8 Release, "Quick Type Keyboard on iOS 8 Makes Typing Easier", Online available at: < https://www.youtube.com/watch?v=0CIdLR4fhVU >, Jun. 3, 2014, 3 pages.
Notice of Allowance received for Chinese Patent Application No. 201510291012.9, dated Jan. 9, 2019, 2 pages (1 page of English Translation and 1 page of Official Copy).
Office Action received for European Patent Application No. 17167629.9, dated Jan. 25, 2019, 7 pages.

(56) References Cited

OTHER PUBLICATIONS

Office Action received for Japanese Patent Application No. 2018-018497, dated Dec. 10, 2018, 8 pages (4 pages of English Translation and 4 pages of Official Copy).
Non-Final Office Action received for U.S. Appl. No. 14/846,574, dated Sep. 20, 2018, 61 pages.
Inews and Tech, "How to Use the QuickType Keyboard in IOS 8", Available online at: http://www.inewsandtech.com/how-to-use-the-quicktype-keyboard-in-ios-8/, Sep. 17, 2014, 6 pages.
Notice of Allowance received for Chinese Patent Application No. 201510290133.1, dated Jan. 9, 2019, 2 pages (1 page of English Translation and 1 page of Official Copy).
Non-Final Office Action received for U.S. Appl. No. 14/503,355, dated Sep. 4, 2018, 25 pages.
Mobile How to, "How to Send a Picture Message/MMS—Samsung Galaxy Note 3", Online Available at: "https://www.youtube.com/watch?v=-3d0z8-KeDw", Published on Nov. 3, 2013, 1 page.
Office Action received for Japanese Patent Application No. 2017-514992, dated Apr. 6, 2018, 11 pages (6 pages of English Translation and 5 pages of Official Copy).
"How to use popular SNS confidence (wechat) in China 2 _ voice message, press together, shake function etc.", Available at "http://seechina365.com/2014/04/05/wechat02/", Apr. 5, 2014.
Airize, "Notification & Control Center Problem Issue Solution" Available online at:—"https://www.youtube.com/watch?v=K0zCueYlaTA", Dec. 6, 2013, 1 page.
Basu, Saikat, "MS Outlook Tip: How to Automatically Organize Incoming Emails", Available online at <http://www.makeuseof.com/tag/ms-outlook-productivity-tip-how-to-move-emails-to-individual-folders-automatically/>, Sep. 27, 2009, pp. 1-6.
CNET download.com, "WeChat for Android", Available at <http://download.cnet.com/WeChat/3000-2150_4-75739423.html>, Jan. 7, 2013, 6 pages.
Digitalstreetsa.com. "Why WeChat might kill Whatsapp's future . . . ", Available at <http://digitalstreetsa.com/why-wechatmight-kill-whatsapps-future/>, Jul. 3, 2013, 10 pages.
Extended European Search Report received for European Patent Application No. 17167629.9, dated Jun. 2, 2017, 7 pages.
Filipowicz, Luke, How to use the QuickType keyboard in iOS 8, available online at <https://www.imore.com/comment/568232>, Oct. 11, 2014, pp. 1-17.
Final Office Action received for U.S. Appl. No. 14/503,355, dated Sep. 8, 2017, 25 pages.
Final Office Action received for U.S. Appl. No. 14/817,572, dated Mar. 23. 2017, 14 pages.
Final Office Action received for U.S. Appl. No. 14/838,235, dated Jun. 15, 2016, 18 pages.
Final Office Action received for U.S. Appl. No. 14/841,623, dated Sep. 5, 2017, 16 pages.
Grothaus, Michael, "WhatsApp Introduces Major New Audio Features", Engadget, Available at <http://www.engadget.com/2013/08/07/whatsapp-introduces-major-new-audio-features/>, Aug. 7, 2013, 4 pages.
"How to Move Mail to Different Folders in Gmail", Available online at <https://web.archive.org/web/20140731230338/http://www.wikihow.com/Move-Mail-to-Different-Folders-in-Gmail>, Jul. 31, 2014, pp. 1-4.
Intention to Grant received for Danish Patent Application No. PA201570550, dated Dec. 22, 2016, 2 pages.
International Preliminary Report on Patentability received for PCT Patent Application No. PCT/US2015/032305, dated Dec. 15, 2016, 8 pages.
International Preliminary Report on Patentability received for PCT Patent Application No. PCT/US2015/032309, dated Dec. 15, 2016, 8 pages.
International Preliminary Report on Patentability received for PCT Patent Application No. PCT/US2015/043487, dated Feb. 16, 2017, 13 Pages.
International Preliminary Report on Patentability received for PCT Patent Application No. PCT/US2015/044083, dated Mar. 16, 2017, 24 pages.
International Preliminary Report on Patentability received for PCT Patent Application No. PCT/US2016/025418, dated Dec. 21, 2017, 16 pages.
International Preliminary Report on Patentability received for PCT Patent Application No. PCT/US2016/046828, dated Mar. 1, 2018. 19 pages.
International Preliminary Report on Patentability received for PCT Patent Application No. PCT/US2016/048044, dated Mar. 22, 2018, 8 pages.
International Preliminary Report on Patentability received for PCT Patent Application No. PCT/US2015/046787, dated Mar. 16, 2017, 19 pages.
International Search Report and Written Opinion received for PCT Patent Application No. PCT/US2015/032305, dated Sep. 10, 2015, 10 pages.
International Search Report and Written Opinion received for PCT Patent Application No. PCT/US2015/032309, dated Sep. 2, 2015, 10 pages.
International Search Report and Written Opinion received for PCT Patent Application No. PCT/US2015/043487, dated Jan. 29, 2016, 19 pages.
International Search Report and Written Opinion received for PCT Patent Application No. PCT/US2015/044083, dated Feb. 4, 2016, 33 pages.
International Search Report and Written Opinion received for PCT Patent Application No. PCT/US2015/046787, dated Apr. 1, 2016, 26 pages.
International Search Report and Written Opinion received for PCT Patent Application No. PCT/US2016/025418, dated Jul. 1, 2016, 20 pages.
International Search Report and Written Opinion received for PCT Patent Application No. PCT/US2016/046828, dated Dec. 15, 2016, 22 pages.
International Search Report and Written Opinion received for PCT Patent Application No. PCT/US2016/048044, dated Oct. 31, 2016, 9 pages.
Invitation to Pay Additional Fees and Partial Search Report received for PCT Patent Application No. PCT/US2015/043487, dated Nov. 9, 2015, 4 pages.
Invitation to Pay Additional Fees received for PCT Patent Application No. PCT/US2015/044083, dated Nov. 4, 2015, 11 pages.
Invitation to Pay Additional Fees received for PCT Patent Application No. PCT/US2015/046787, dated Dec. 15, 2015, 8 pages.
Invitation to Pay Additional Fees received for PCT Patent Application No. PCT/US2016/046828, dated Sep. 23, 2016, 2 pages.
IOSVLOG Daily, "iOS 7 Notification Center Complete Walk-through", Available online at : "https://www.youtube.com/watch?v=gATXt-o42LA", Jun. 10, 2013, 1 page.
Iphone, "User Guide for iOS 7.1 Software", Mar. 2014, 162 pages.
Leonard, Jonathan Oh., "How to: dismiss banner notifications or toast notifications on ios7". Available online at : "https://www.youtube.com/watch?v=vSjHriBFIW_M", Dec. 17, 2013, 1 page.
Lewis, Jeffery, "iOS Notification Banner Pull Down to Notification Center in iOS 7 Beta 5", Available online at :—"https://www.youtube.com/watch?v=nP0s6ETPxDg", Aug. 6, 2013, 1 page.
Non-Final Office Action received for U.S. Appl. No. 14/817,572, dated Sep. 12, 2016, 9 pages.
Non-Final Office Action received for U.S. Appl. No. 14/503,355, dated Dec. 30, 2016, 23 pages.
Non-Final Office Action received for U.S. Appl. No. 14/503,376, dated Dec. 22, 2014, 21 pages.
Non-Final Office Action received for U.S. Appl. No. 14/503,386, dated Jan. 7, 2015, 19 pages.
Non-Final Office Action received for U.S. Appl. No. 14/841,608, dated Apr. 12, 2017, 9 Pages.
Non-Final Office Action received for U.S. Appl. No. 14/841,614, dated Jul. 27, 2017, 13 pages.
Non-Final Office Action received for U.S. Appl. No. 14/841,623, dated Feb. 2, 2017, 17 pages.

(56) References Cited

OTHER PUBLICATIONS

Non-Final Office Action received for U.S. Appl. No. 14/846,574, dated Nov. 29, 2017, 27 pages.
Non-Final Office Action received for U.S. Appl. No. 14/928,865, dated Mar. 27, 2018, 15 pages.
Non-Final Office Action received for U.S. Appl. No. 15/142,661, dated Jan. 25, 2017, 29 pages.
Non-Final Office Action received for U.S. Appl. No. 15/188,081, dated Jun. 8, 2017, 17 pages.
Non-Final Office Action received for U.S. Appl. No. 15/188,081, dated Mar. 30. 2018, 21 pages.
Non-Final Office Action received for U.S. Appl. No. 15/431,435, dated Jun. 8, 2017, 13 pages.
Non-Final Office Action received for U.S. Appl. No. 14/846,574, dated Jun. 22, 2017, 21 pages.
Non-Final Office Action received for U.S. Appl. No. 14/838,235, dated Jan. 5, 2016, 3 pages.
Norman, Don, "Affordances and Design", Jng.org, Available at <http://jnd.org/dn.mss/affordances_and.html>, Jan. 14, 2006, 5 pages.
Notice of Acceptance received for Australian Patent Application No. 2015267259, dated Jan. 30, 2018, 3 pages.
Notice of Acceptance received for Australian Patent Application No. 2015267260, dated Jan. 30, 2018.., 3 pages.
Notice of Allowance received for Chinese Patent Application No. 201520365358.4, dated Nov. 20, 2015, 4 pages.
Notice of Allowance received for Chinese Patent Application No. 201520365843.1, dated Feb. 15, 2016, 5 pages.
Notice of Allowance received for Chinese Patent Application No. 201520669842.6, dated May 18, 2016, 4 pages.
Notice of Allowance received for Chinese Patent Application No. 201620830403.3, dated Sep. 8, 2017, 1 page.
Notice of Allowance received for Danish Patent Application No. PA201570558, dated Mar. 20, 2017, 2 pages.
Notice of Allowance received for Japanese Patent application No. 2017514993, dated Jan. 12, 2018, 4 pages.
Notice of Allowance received for Taiwanese Patent Application No. 104128519, dated Nov. 20, 2017. 5.
Notice of Allowance received for U.S. Appl. No. 12/789,440, dated Apr. 23, 2013, 2 pages.
Notice of Allowance received for U.S. Appl. No. 12/789,440, dated Jan. 14, 2013, 7 pages.
Notice of Allowance received for U.S. Appl. No. 12/789,440, dated Jun. 26, 2012, 9 pages.
Notice of Allowance received for U.S. Appl. No. 14/503,376, dated Jul. 29, 2015, 13 pages.
Notice of Allowance received for U.S. Appl. No. 14/503,376, dated Sep. 2, 2015, 2 pages.
Notice of Allowance received for U.S. Appl. No. 14/503,376, dated Sep. 24, 2015, 5 pages.
Notice of Allowance received for U.S. Appl. No. 14/503,386, dated Jul. 30, 2015, 12 pages.
Notice of Allowance received for U.S. Appl. No. 14/503,386, dated Sep. 24, 2015, 5 pages.
Notice of Allowance received for U.S. Appl. No. 14/817,572, dated Nov. 30, 2017, 26 pages.
Notice of Allowance received for U.S. Appl. No. 14/838,235, dated Dec. 29, 2016, 4 pages.
Notice of Allowance Received for U.S. Appl. No. 14/838,235, dated Oct. 4, 2016, 7 pages.
Notice of Allowance received for U.S. Appl. No. 14/841,608, dated Nov. 14, 2017, 5 pages.
Notice of Allowance received for U.S. Appl. No. 15/142,661, dated Feb. 15, 2018, 9 pages.
Notice of Allowance received for U.S. Appl. No. 15/142,661, dated Oct. 4, 2017, 22 pages.
Notice of Allowance received for U.S. Appl. No. 15/876,673, dated May 4, 2018, 27 pages.
Office Action received for Australian Patent Application No. 2015100711, dated Jul. 27, 2015, 7 pages.
Office Action Received for Australian Patent Application No. 2015100711, dated Nov. 19, 2015, 6 pages.
Office Action received for Australian Patent Application No. 2015101188, dated Apr. 14, 2016, 3 pages.
Office Action received for Australian Patent Application No. 2015267259, dated Jun. 2, 2017, 2 pages.
Office Action received for Australian Patent Application No. 2015267260, dated Jun. 2, 2017, 2 pages.
Office Action received for Australian Patent Application No. 2015312369, dated Mar. 29. 2017, 3 Pages.
Office Action received for Australian Patent Application No. 2016102028, dated Feb. 13, 2017, 4 pages.
Office Action received for Australian Patent Application No. 2016102029, dated Feb. 22, 2017, 4 pages.
Office Action received for Australian Patent Application No. 2017100197, dated Apr. 28, 2017, 4 Pages.
Office Action received for Australian Patent Application No. 2017100198, dated Apr. 20, 2017, 4 pages.
Office Action received for Australian Patent Application No. 2017100760, dated Aug. 10, 2013, 4 pages.
Office Action received for Chinese Patent Application No. 201510290133.1, dated Feb. 9, 2018, 10 pages.
Office Action Received for Chinese Patent Application No. 201510291012.9, dated Feb. 8, 2018, 10 pages.
Office Action received for Chinese Patent Application No. 201520365358.4, dated Aug. 11, 2015, 4 pages.
Office Action received for Chinese Patent Application No. 201520365843.1, dated Aug. 25, 2015, 4 pages.
Office Action Received for Chinese Patent Application No. 201520365843.1, dated Nov. 16, 2015, 2 pages.
Office Action received for Chinese Patent Application No. 201520669842.6, dated Dec. 4, 2015, 7 pages.
Office Action received for Chinese Patent Application No. 201620393549.6, dated Aug. 18, 2016, 2 pages.
Office Action received for Chinese Patent Application No. 201620393549.6, dated Jan. 13, 2017, 2 Pages.
Office Action received for Chinese Patent Application No. 201620393748.7, dated Aug. 18, 2016, 2 pages.
Office Action received for Chinese Patent Application No. 201620393748.7, dated Jan. 13, 2017, 2 Pages.
Office Action Received for Chinese Patent Application No. 201620830403.3, dated Jun. 7, 2017, 1 page.
Office Action Received for Chinese Patent Application No. 2016208304033, dated Mar. 7, 2017, 1 page.
Office Action received for Danish Patent Application No. PA201570550, dated Dec. 7, 2015, 6 pages.
Office Action received for Danish Patent Application No. PA201570550, dated Jan. 19, 2016, 2 pages.
Office Action received for Danish Patent Application No. PA201570550, dated Oct. 19, 2016, 3 pages.
Office Action received for Danish Patent Application No. PA201770089, dated Apr. 25, 2017, 10 pages.
Office Action received for Danish Patent Application No. PA201770126, dated Oct. 18, 2017, 3 pages.
Office Action received for European Patent Application No. 15729286.3, dated Feb. 7, 2018, 7 pages.
Office Action received for European Patent Application No. 15728307.8, dated Feb. 8, 2018, 7 pages.
Office Action received for German Patent Application No. 212015000194.6, dated Mar. 16, 2017, 2 pages.
Office Action received for Japanese Patent Application No. 2017-510297, dated Jul. 10, 2017, 10 pages.
Office Action received for Korean Patent Application No. 10-2017-7005628, dated May 10, 2017, 12 pages.
Office Action received for Taiwanese Patent Application No. 104128519, dated Mar. 29, 2017, 16 pages.
Office Action received for Taiwanese Patent Application No. 104128704, dated Jul. 31, 2017, 7 pages.
Office Action received for Taiwanese Patent Application No. 104128704, dated Nov. 2, 2016, 12 pages.
Patterson, Ben, "iOS 7 Tip: Alerts, Banners, and Badgesâwhats the Difference?", Available online at :—"https://web.archive.org/web/

(56) References Cited

OTHER PUBLICATIONS

20140128072440/http://heresthethingblog.com/2014/01/22/ios-7-tip-whats-difference-alert/", Jan. 22, 2014, 5 Pages.
S. Rohan, "WeChat Review—Communication Application with Screenshots", Absolute Blogger Oct. 19, 2010, Available at <http://www.absoluteblogger.com/2012/10/wechat-review-communication-application.html>, Accessed on Apr. 7, 2015, 5 pages.
"Samsung Gear 2 User manual", Available at http://www.slideshare.net/badaindonesia/samsung-gear-2-user-manual>, Apr. 8, 2014, 5 pages.
"Samsung Gear 2, User Manual", Available online at <http://www.manualslib.com/download/754923/Samsung-Gear-2.html>, 2014, pp. 1-97.
"Samsung User Manual", Available at: SM-R380_UM_EU_Eng_D13_140411.pdf, Apr. 2014, 78 pages.
Samsung, "SM-G900F User Manual", English (EU. Rev.1.0, Mar. 2014, 249 pages.
Search Report and Opinion received for Netherlands Patent Application No. 2015354, dated Jun. 22, 2017, 24 pages.
Search Report received for Danish Patent Application No. PA201770125, dated May 5, 2017, 10 pages.
Search Report received for Danish Patent Application No. PA201770126, dated Apr. 26, 2017, 8 Pages.
Tomic et al., "Emoticons", FIP—Journal of Finance and Law, vol. 1, No. 1, 2013, pp. 35-42.
Wechat Philippines, "WeChat TVC—Hold to Talk", available at <https://www.youtube.com/watch?v=E_UxteOWVSo>, May 11, 2013, 1 page.
"WeChat Wikix", available on <http://web.archive.org/web/20130514131044/http://wechat.wikia.com/wiki/WeChat_Wiki>, May 14, 2013, 12 pages.
"WhatsApp" users over 400 million people! I tried to investigate the most used messaging application in the world, Available at "http://www.appps.jp/2128786/", Jan. 24, 2014, 10 pages.

\* cited by examiner

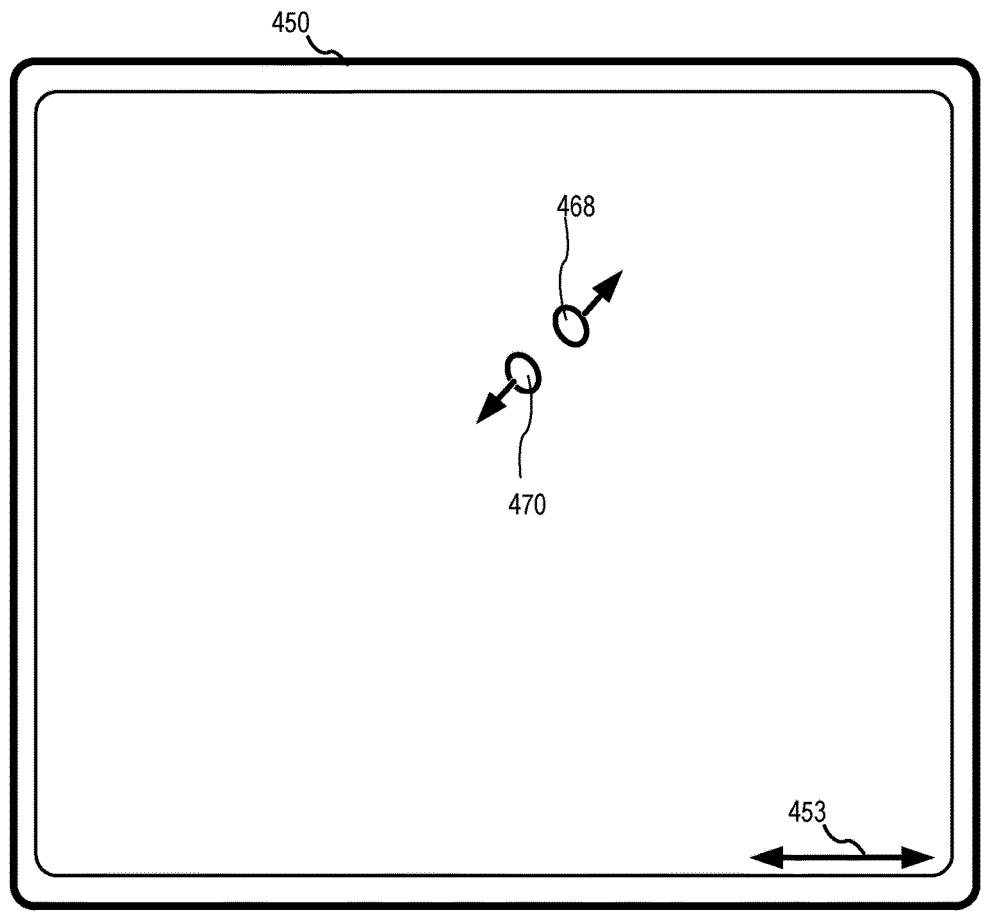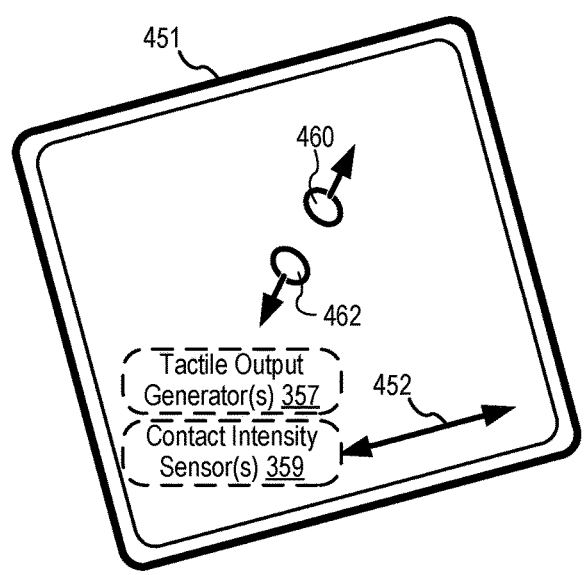
FIG. 4B

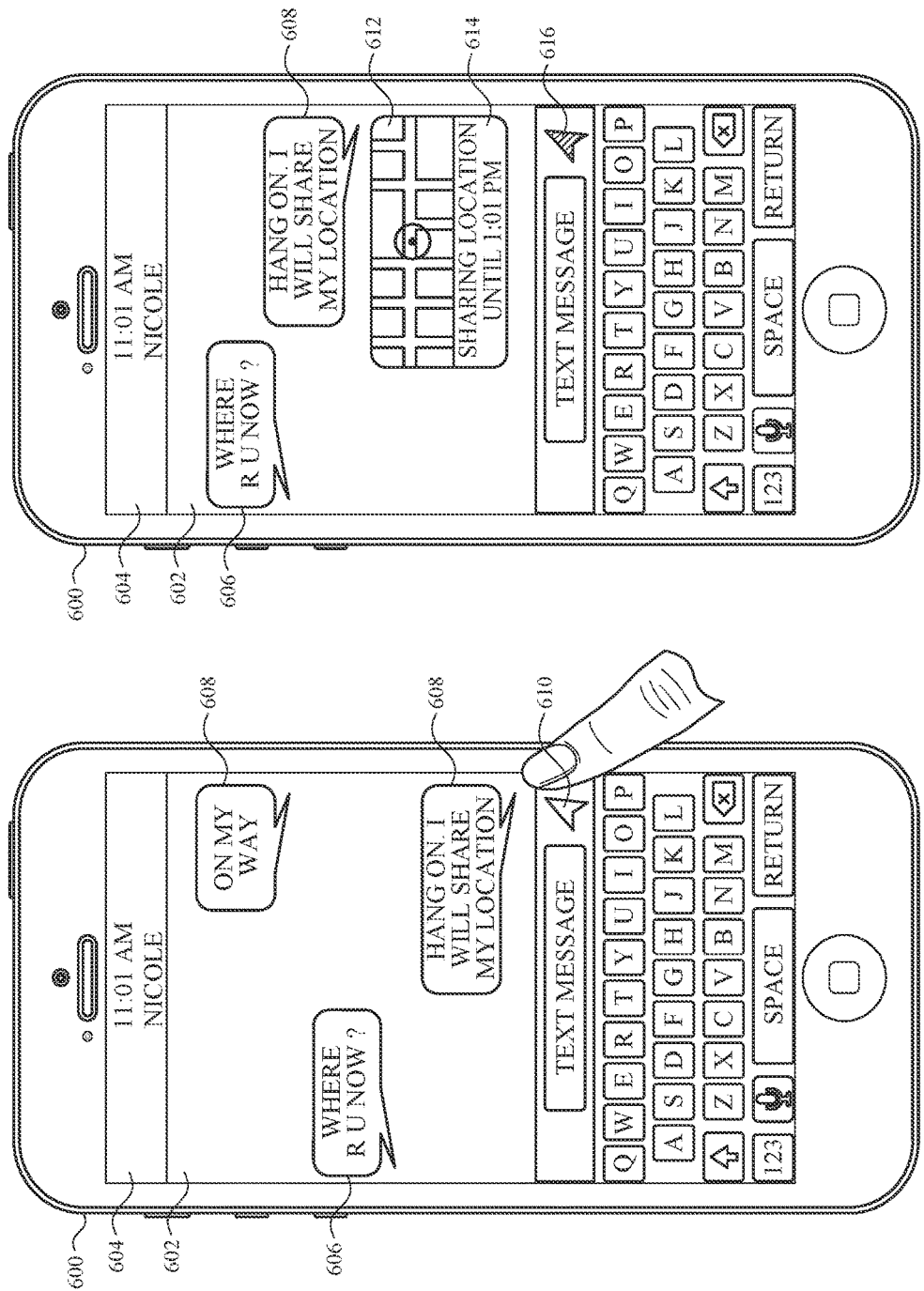

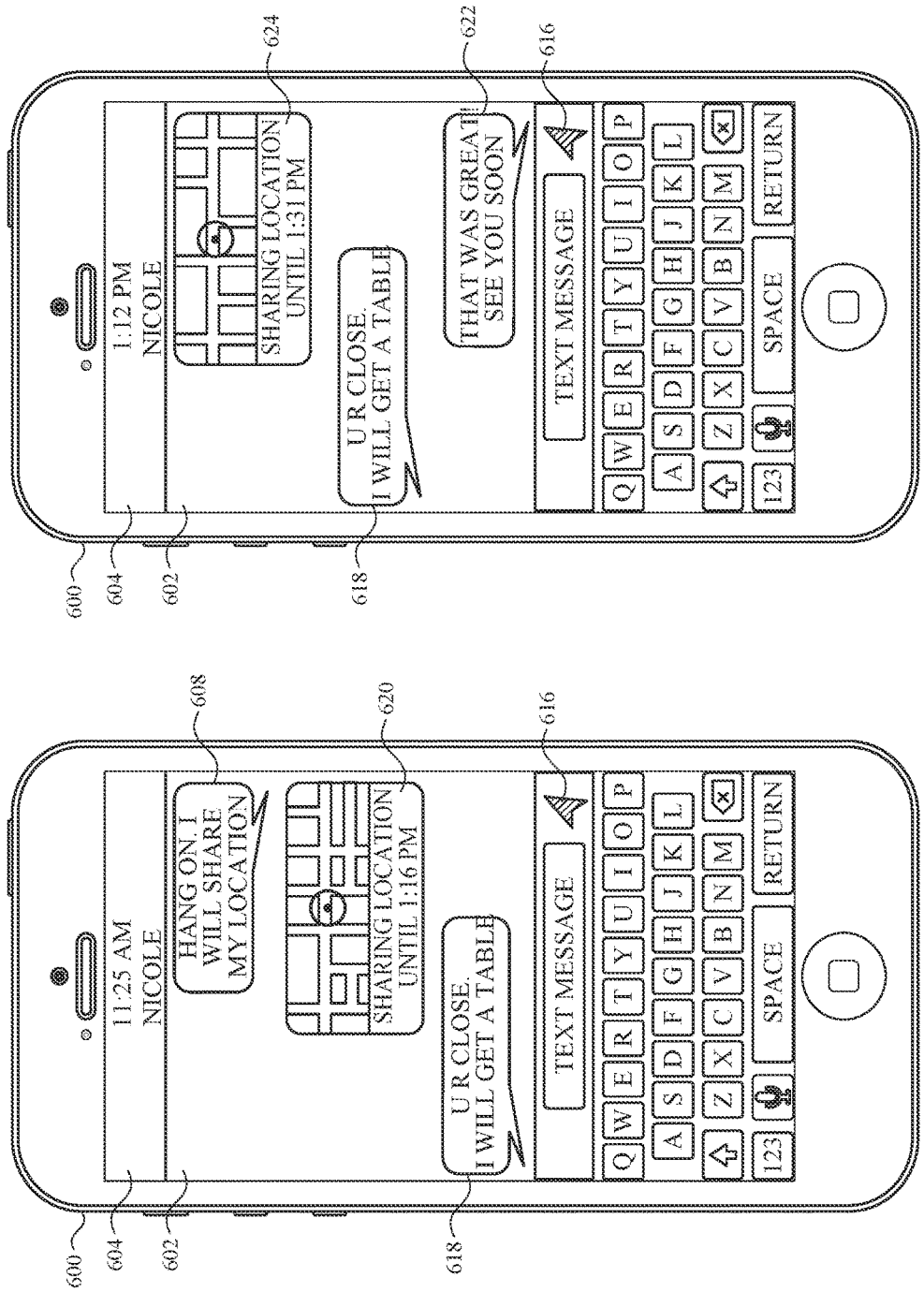

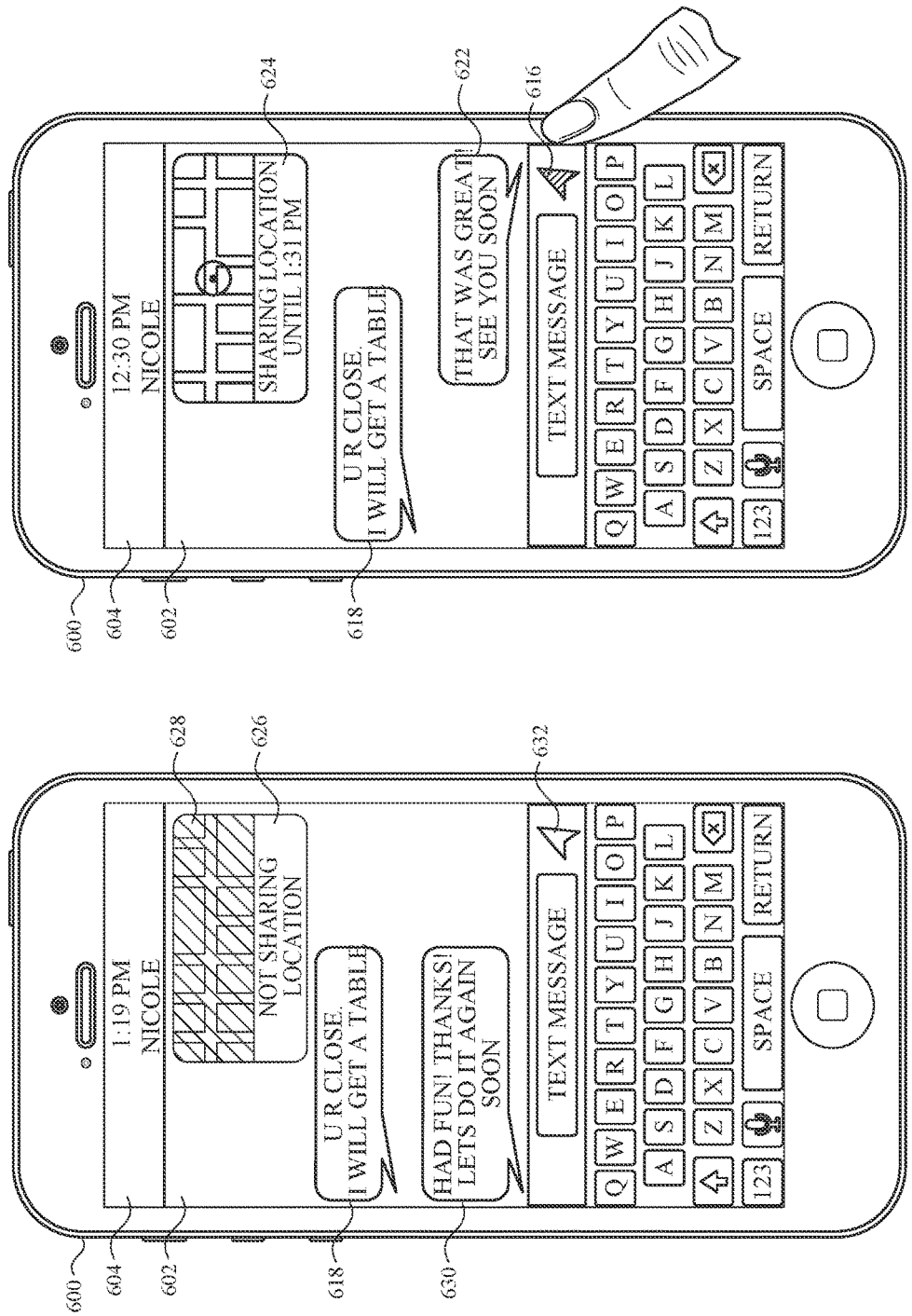

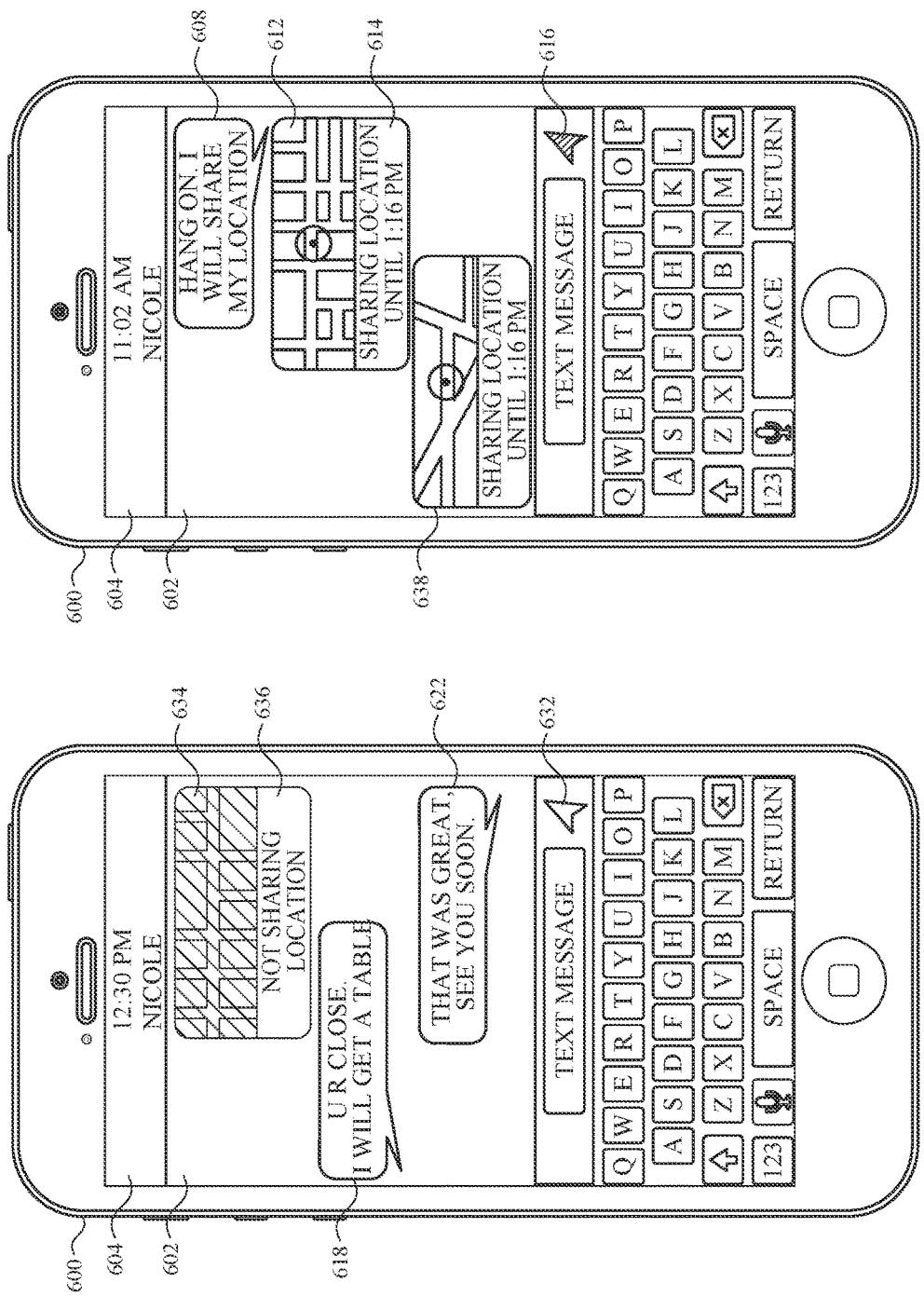

700

702
Display a message region with messages sent between a first participant and a second participant in a message conversation

704
Detect a location-sharing request from the first participant to share first participant location information with the second participant

706
Enable the second participant to obtain the first participant location information during a predetermined location-sharing time period that is scheduled to end at a first time

708
Detect interaction by one of the first participant and the second participant with the message conversation during the predetermined location-sharing time period

710
Extend the predetermined location-sharing time period to end at a second time that is after the first time

Detect a communication between the first and second participant outside of the message conversation during the predetermined location-sharing time period

736

Extend the predetermined location-sharing time period

738

740

Detect a selection of a shared location option affordance by the first participant

742

Ends the predetermined location-sharing time period

744

746

Determine that the predetermined location-sharing time period has ended

748

Display an indication in the message conversation that the location of the first participant is not being shared with the second participant

Receive second participant location information

754

Display the second participant location information

*FIG. 7G*

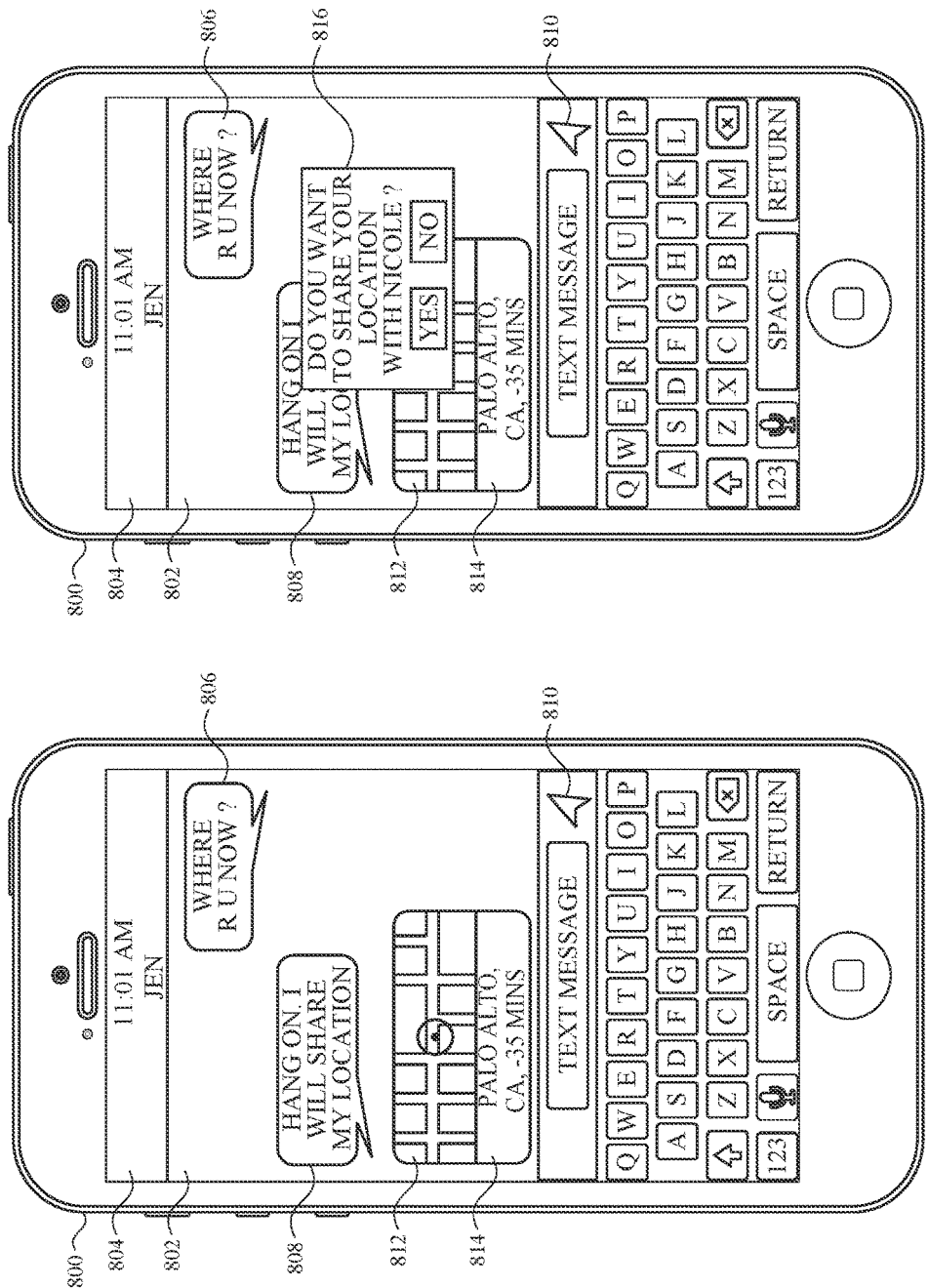

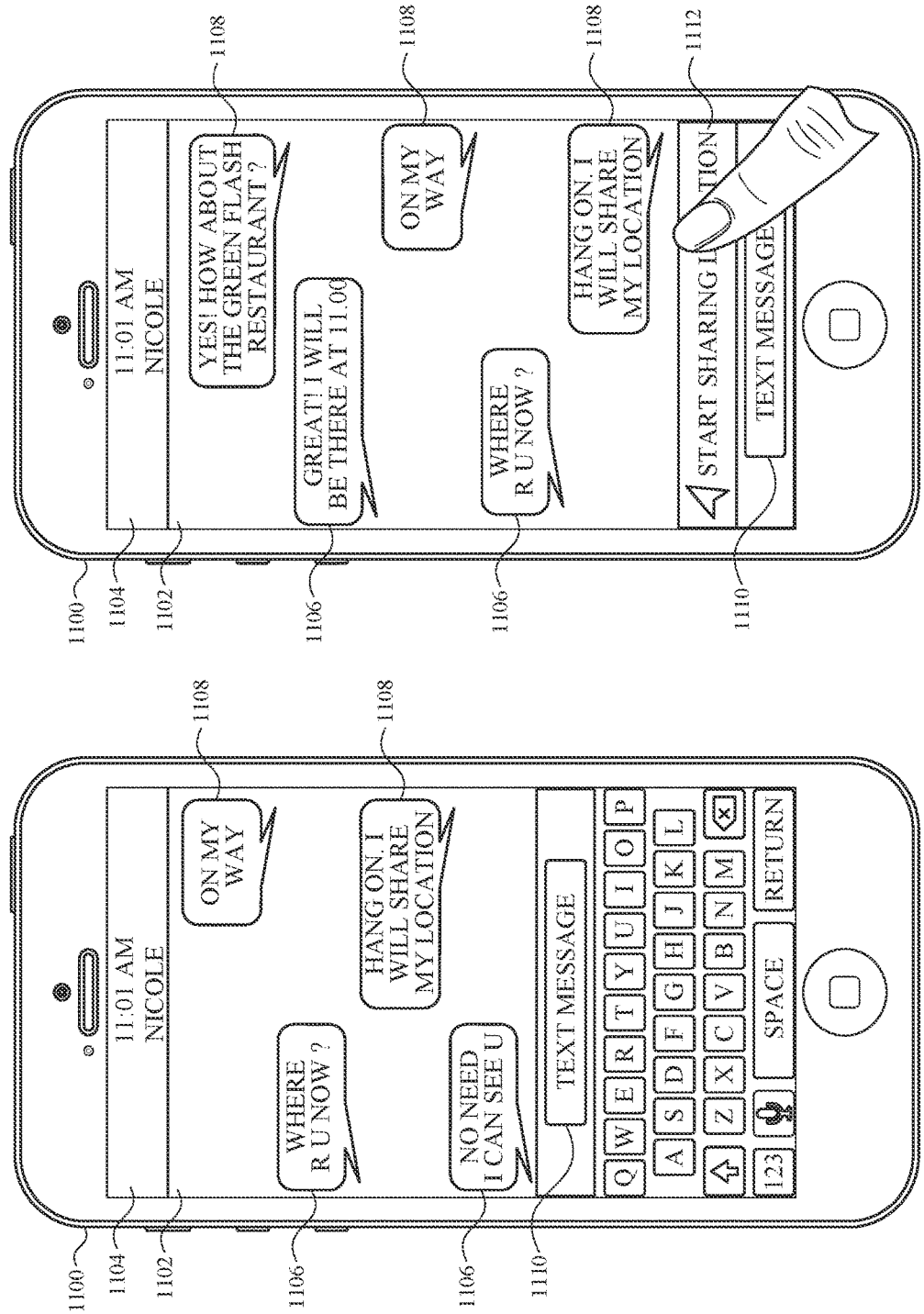

1200

1202

Display a message region and, at a first position in the message region, a bottom portion of a message transcript of messages sent between a first participant and a second participant of the message conversation

↓

1204

Detect contact on a location corresponding to the message transcript

↓

1206

Detect movement of the contact across the touch-sensitive surface and toward a top portion of the message region

↓

1208

Display the bottom portion of the message transcript at a second position in the message region above the first position

↓

1210

Display a location-sharing affordance at the first position

1232
Detect a selection of the location-sharing affordance

↓

1234
Enable the second participant to obtain the first participant location information during a predetermined location-sharing time period, wherein the predetermined location-sharing time period is scheduled to end at a first time

1242
Detect interaction by one of the first participant and the second participant with the message conversation during the predetermined location-sharing time period

↓

1244
Extend the predetermined location-sharing time period to end at a second time that is after the first time

1272
Detect interaction with the location-sharing affordance

↓

1274
Discontinue display of the location-sharing affordance

1282
Determine whether the movement of the contact meets predefined criteria Yes ↓     No ↓

1284
Display the location-sharing affordance for a predetermined time and discontinue display of the location-sharing affordance after the predetermined time lapses

1286
Display the location-sharing affordance

*FIG. 12H*

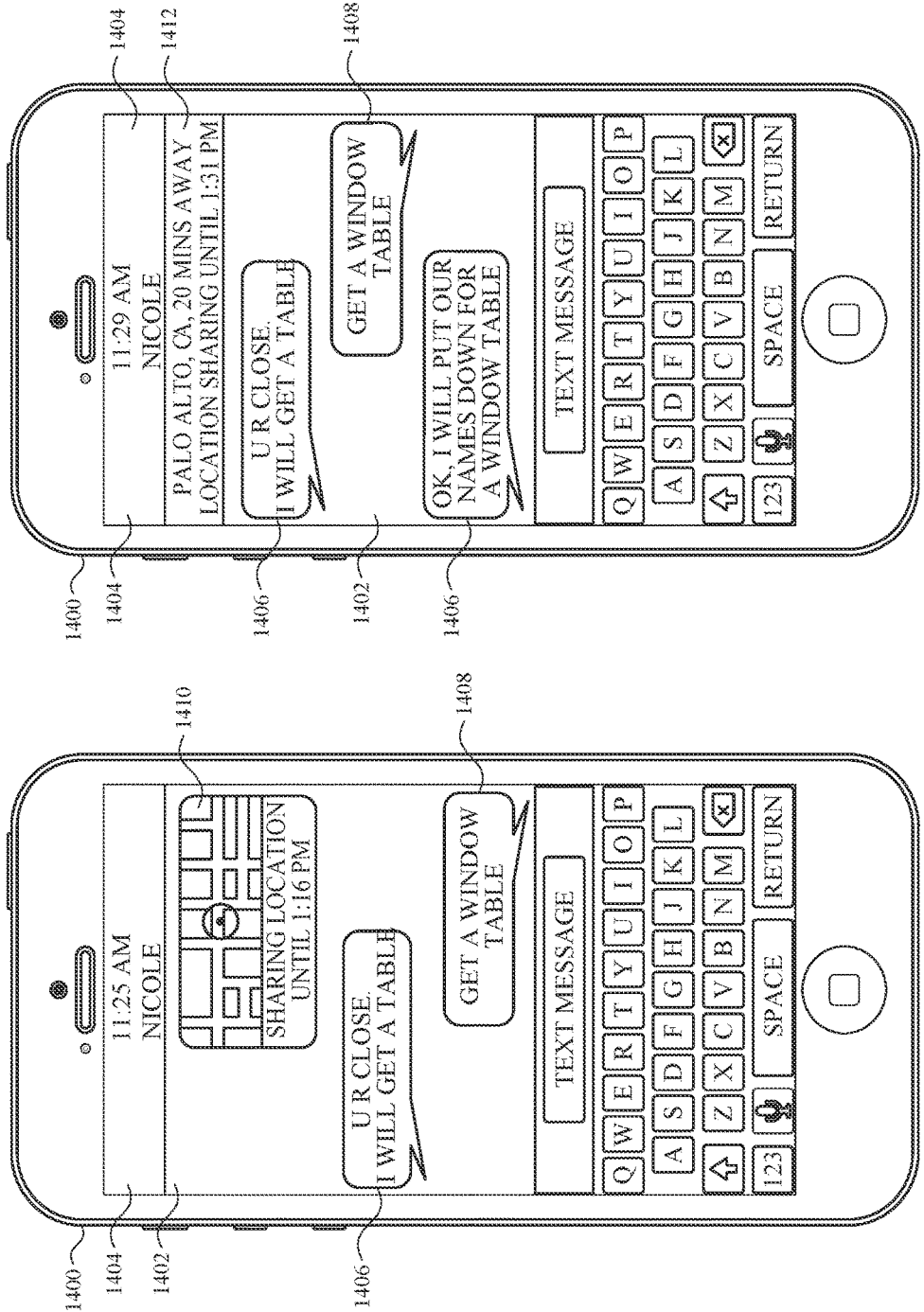

1530

1532

Detect a selection of the location-sharing status bar

1534

Launch a map view that includes a representation of a location of the first participant and a location of the second participant

*FIG. 15C*

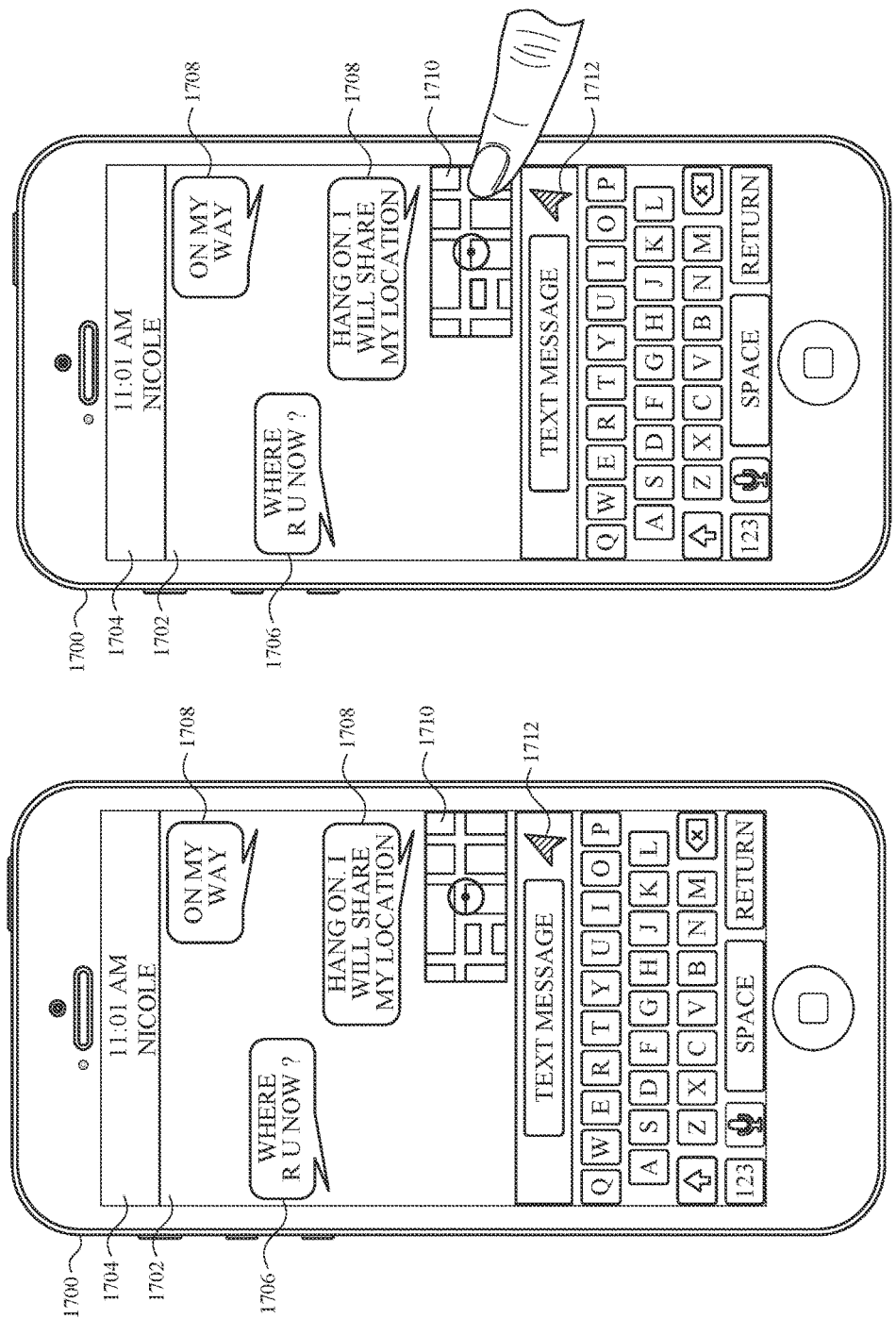

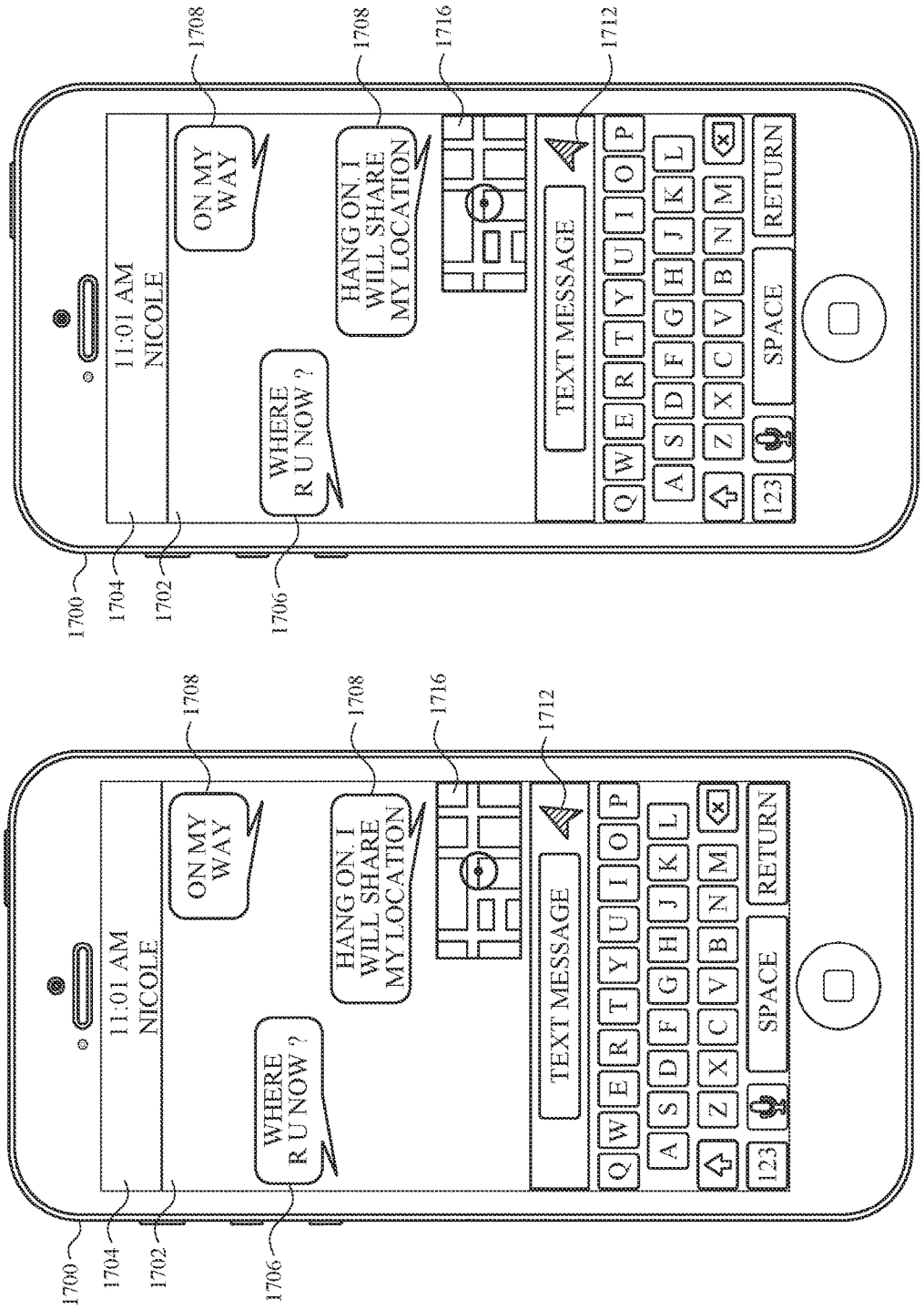

1800

1802

Display a message region with messages sent between a first participant and a second participant in a message conversation

↓

1804

Display a shared location affordance, in the message region, below and adjacent to the message transcript, wherein the shared location affordance comprises a representation of a location of the first participant

Detects a predefined gesture on a touch-sensitive surface at a position that corresponds to the shared location affordance

↓

1814

Enlarge the map view

Display a second map view in the message transcript

↓

1824

Display a representation of the second participant at a position on the second map view that corresponds to a location of the second participant

Receive an updated location of the first participant

↓

1834

Display a representation of the updated location of the first participant in the shared location affordance associated with the first participant

Display a message region with messages sent between a first participant and a second participant in a message conversation

2004

Display a location-sharing affordance

2006

Detect a selection of the location-sharing affordance consisting of a single contact by the first participant

2008

Enable the second participant to obtain the first participant location information and display a modified location-sharing affordance

Receive an updated location of the first participant

2014

Enable the second participant to obtain updated first participant location information

Detect a message composition

2024

Discontinue displaying the modified location-sharing affordance

*FIG. 20C*

EASY LOCATION SHARING

CROSS-REFERENCE TO RELATED APPLICATIONS

This application is a continuation of U.S. patent application Ser. No. 15/876,673, entitled "EASY LOCATION SHARING", filed Jan. 22, 2018, which is a continuation of U.S. patent application Ser. No. 15/142,661, entitled "EASY LOCATION SHARING", filed Apr. 29, 2016, which claims priority to U.S. Provisional Application No. 62/205,562, entitled "EASY LOCATION SHARING", filed Aug. 14, 2015. The contents of each of these applications are hereby incorporated by reference in their entireties.

FIELD

The present disclosure relate generally to user interfaces of electronic devices, and more specifically to techniques for sharing a user's location.

BACKGROUND

Text messaging is a common form of communication. Recently, text messaging has expanded to include additional functionality, including the ability to share location information between participants in a message conversation. Some methods for sharing location information can be, however, difficult and/or inefficient.

BRIEF SUMMARY

In some instances, many steps are required to share location, and these steps generally take the user away from the message transcript. In some instances, participants may want to share locations for a prolonged period of time. In such instances, the user repeats the steps to share location information each time a location update is desired, detracting from the user's messaging experience. Moreover, inefficiency, particularly on battery-powered mobile devices, may waste energy and increase the need for recharging.

Accordingly, there is a need for electronic devices with faster, more efficient methods and interfaces for sharing message participants' location information. Such methods and interfaces optionally complement or replace other methods for sharing location information. Such methods and interfaces reduce the cognitive burden on a user and produce a more efficient human-machine interface. For battery-operated computing devices, such methods and interfaces conserve power and increase the time between battery charges.

In some embodiments, a method for sharing location information during a message conversation includes: at an electronic device comprising a touch-sensitive surface and a display: displaying, on the display, a message region; displaying, in the message region, messages sent between a first participant and a second participant in a message conversation; detecting a location-sharing request from the first participant to share first participant location information with the second participant; in response to detecting the location-sharing request from the first participant: enabling the second participant to obtain the first participant location information during a predetermined location-sharing time period, wherein the predetermined location-sharing time period is scheduled to end at a first time; detecting interaction by one of the first participant and the second participant with the message conversation during the predetermined location-sharing time period; and in response to detecting interaction by one of the first participant and the second participant with the message conversation during the predetermined location-sharing time period: extending the predetermined location-sharing time period to end at a second time that is after the first time.

In some embodiments, a method for sharing location information during a message conversation includes: at an electronic device comprising a touch-sensitive surface and a display: displaying, on the display, a message region; displaying, in the message region, messages sent between a first participant and a second participant in a message conversation; receiving a first location-sharing notification that first participant location information is being shared with the second participant for a predetermined location-sharing time period, wherein the predetermined location-sharing time period is scheduled to end at a first time; sending a message to the first participant; and receiving a second location-sharing notification that first participant location information is being shared with the second participant for an extended location-sharing time period, wherein the extended location-sharing time period is scheduled to end at a second time that is after the first time.

In some embodiments, a method for sharing location information during a message conversation includes: at an electronic device comprising a touch-sensitive surface and a display: displaying, on the display, a message region; displaying, at a first position in the message region, a bottom portion of a message transcript of messages sent between a first participant and a second participant; detecting contact on a location corresponding to the message transcript; detecting movement of the contact across the touch-sensitive surface and toward a top portion of the message region; and in response to detecting movement of the contact across the touch-sensitive surface and toward a top portion of the message region: displaying the bottom portion of the message transcript at a second position in the message region above the first position; and displaying a location-sharing affordance at the first position.

In some embodiments, a method for sharing location information during a message conversation includes: at an electronic device comprising a touch-sensitive surface and a display: displaying, on the display, a message region; displaying, in the message region, a message transcript of messages sent between a first participant and a second participant; displaying, at a first position in the message transcript, a shared-location affordance; while displaying the shared-location affordance at the first position, detecting a request to scroll the message transcript; in response to detecting the request to scroll the message transcript: determining whether the request to scroll the message transcript comprises a request to scroll the shared-location affordance beyond the message region; in accordance with a determination that the request to scroll the message transcript comprises a request to scroll the shared-location affordance beyond the message region: discontinuing display of the shared location in the message transcript; and displaying a location-sharing status bar outside the message region; and in accordance with a determination that the request to scroll the message transcript does not comprise a request to scroll the shared-location affordance beyond the message region: displaying the shared-location affordance at a second location in the message transcript.

In some embodiments, a method for sharing location information during a message conversation includes: at an electronic device comprising a touch-sensitive surface and a display: displaying, on the display, a message region; displaying, in the message region, a message transcript of messages sent between a first participant and a second participant; displaying a shared-location affordance in the message region, wherein the shared-location affordance is displayed below and adjacent to the message transcript, and wherein the shared-location affordance comprises a representation of a location of the first participant.

In some embodiments, a method for sharing location information during a message conversation includes: at an electronic device comprising a touch-sensitive surface and a display: displaying, on the display, a message region for displaying a message transcript of messages sent between a first participant and a second participant in a message conversation; displaying a location-sharing affordance; detecting a selection of the location-sharing affordance, wherein detecting a selection of the location-sharing affordance by the first participant consists of detecting a single contact by the first participant; and in response to detecting a selection of the location-sharing affordance: enabling the second participant to obtain the first participant location information; and displaying a modified location-sharing affordance.

In some embodiments, a non-transitory computer-readable storage medium has stored therein instructions which when executed by an electronic device with a display, causes the device to perform any of the methods described above. In some embodiments, an electronic device includes: a display and means for performing any of the methods described above. In accordance with some embodiments, an information processing apparatus, for use in an electronic device with a display, includes means for performing any of the methods described above.

In some embodiments, a multifunction device includes one or more processors; memory; and one or more programs, wherein the one or more programs are stored in the memory and configured to be executed by the one or more processors, the one or more programs including instructions for: displaying a message region; displaying, in the message region, messages sent between a first participant and a second participant in a message conversation; detecting a location-sharing request from the first participant to share first participant location information with the second participant; in response to detecting the location-sharing request from the first participant: enabling the second participant to obtain the first participant location information during a predetermined location-sharing time period, wherein the predetermined location-sharing time period is scheduled to end at a first time; detecting interaction by one of the first participant and the second participant with the message conversation during the predetermined location-sharing time period; and in response to detecting interaction by one of the first participant and the second participant with the message conversation during the predetermined location-sharing time period: extending the predetermined location-sharing time period to end at a second time that is after the first time.

In some embodiments, a multifunction device includes one or more processors; memory; and one or more programs, wherein the one or more programs are stored in the memory and configured to be executed by the one or more processors, the one or more programs including instructions for: displaying a message region; displaying, in the message region, messages sent between a first participant and a second participant in a message conversation; receiving a first location-sharing notification that first participant location information is being shared with the second participant for a predetermined location-sharing time period, wherein the predetermined location-sharing time period is scheduled to end at a first time; sending a message to the first participant; and receiving a second location-sharing notification that first participant location information is being shared with the second participant for an extended location-sharing time period, wherein the extended location-sharing time period is scheduled to end at a second time that is after the first time.

In some embodiments, a multifunction device includes one or more processors; memory; and one or more programs, wherein the one or more programs are stored in the memory and configured to be executed by the one or more processors, the one or more programs including instructions for: displaying a message region; displaying, in the message region, messages sent between a first participant and a second participant in a message conversation; receiving a first location-sharing notification that first participant location information is being shared with the second participant for a predetermined location-sharing time period, wherein the predetermined location-sharing time period is scheduled to end at a first time; sending a message to the first participant; and receiving a second location-sharing notification that first participant location information is being shared with the second participant for an extended location-sharing time period, wherein the extended location-sharing time period is scheduled to end at a second time that is after the first time.

In some embodiments, a multifunction device includes one or more processors; memory; and one or more programs, wherein the one or more programs are stored in the memory and configured to be executed by the one or more processors, the one or more programs including instructions for: displaying a message region; displaying, at a first position in the message region, a bottom portion of a message transcript of messages sent between a first participant and a second participant; detecting contact on a location corresponding to the message transcript; detecting movement of the contact across the touch-sensitive surface and toward a top portion of the message region; and in response to detecting movement of the contact across the touch-sensitive surface and toward a top portion of the message region: displaying the bottom portion of the message transcript at a second position in the message region above the first position; and displaying a location-sharing affordance at the first position.

In some embodiments, a multifunction device includes one or more processors; memory; and one or more programs, wherein the one or more programs are stored in the memory and configured to be executed by the one or more processors, the one or more programs including instructions for: displaying a message region; displaying, in the message region, a message transcript of messages sent between a first participant and a second participant; displaying, at a first position in the message transcript, a shared-location affordance; while displaying the shared-location affordance at the first position, detecting a request to scroll the message transcript; in response to detecting the request to scroll the message transcript: determining whether the request to scroll the message transcript comprises a request to scroll the shared-location affordance beyond the message region; in accordance with a determination that the request to scroll the message transcript comprises a request to scroll the shared-location affordance beyond the message region: discontinuing display of the shared location in the message transcript; and displaying a location-sharing status bar outside the message region; and in accordance with a determination that the request to scroll the message transcript does not comprise a request to scroll the shared-location affordance beyond the message region: displaying the shared-location affordance at a second location in the message transcript.

In some embodiments, a multifunction device includes one or more processors; memory; and one or more programs, wherein the one or more programs are stored in the memory and configured to be executed by the one or more processors, the one or more programs including instructions for: displaying, on the display, a message region for displaying a message transcript of messages sent between a first participant and a second participant in a message conversation; displaying a location-sharing affordance; detecting a selection of the location-sharing affordance, wherein detecting a selection of the location-sharing affordance by the first participant consists of detecting a single contact by the first participant; and in response to detecting a selection of the location-sharing affordance: enabling the second participant to obtain the first participant location information; and displaying a modified location-sharing affordance.

Thus, electronic devices are provided for easy location sharing in message conversation, thereby increasing the effectiveness, efficiency, and user satisfaction of such devices. The methods and interfaces provided may complement or replace conventional methods and interfaces for location sharing.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 6A illustrates exemplary messaging user interfaces.
FIG. 6B illustrates exemplary messaging user interfaces.
FIG. 6C illustrates exemplary messaging user interfaces.
FIG. 6D illustrates exemplary messaging user interfaces.
FIG. 6E illustrates exemplary messaging user interfaces.
FIG. 6F illustrates exemplary messaging user interfaces.
FIG. 6G illustrates exemplary messaging user interfaces.
FIG. 6H illustrates exemplary messaging user interfaces.
FIG. 7A is a flow diagram illustrating a process for sharing location information.
FIG. 7F is a flow diagram illustrating a process for sharing location information.
FIG. 7G is a flow diagram illustrating a process for sharing location information.
FIG. 8A illustrates exemplary messaging user interfaces.
FIG. 8B illustrates exemplary messaging user interfaces.
FIG. 11E illustrates exemplary messaging user interfaces.
FIG. 11F illustrates exemplary messaging user interfaces.
FIG. 12A is a flow diagram illustrating a process for sharing location information.
FIG. 12C is a flow diagram illustrating a process for sharing location information.
FIG. 12D is a flow diagram illustrating a process for sharing location information.
FIG. 12G is a flow diagram illustrating a process for sharing location information.
FIG. 12H is a flow diagram illustrating a process for sharing location information.
FIG. 14A illustrates exemplary messaging user interfaces.
FIG. 14B illustrates exemplary messaging user interfaces.
FIG. 15C is a flow diagram illustrating a process for sharing location information.
FIG. 17A illustrates exemplary messaging user interfaces.
FIG. 17B illustrates exemplary messaging user interfaces.

FIG. 17D illustrates exemplary map user interfaces.

FIG. 17E illustrates exemplary map user interfaces.

FIG. 18A is a flow diagram illustrating a process for sharing location information.

FIG. 18B is a flow diagram illustrating a process for sharing location information.

FIG. 18C is a flow diagram illustrating a process for sharing location information.

FIG. 18D is a flow diagram illustrating a process for sharing location information.

FIG. 20A is a flow diagram illustrating a process for sharing location information FIG. 20B is a flow diagram illustrating a process for sharing location information FIG. 20C is a flow diagram illustrating a process for sharing location information

DESCRIPTION OF EMBODIMENTS

Figure 1A:
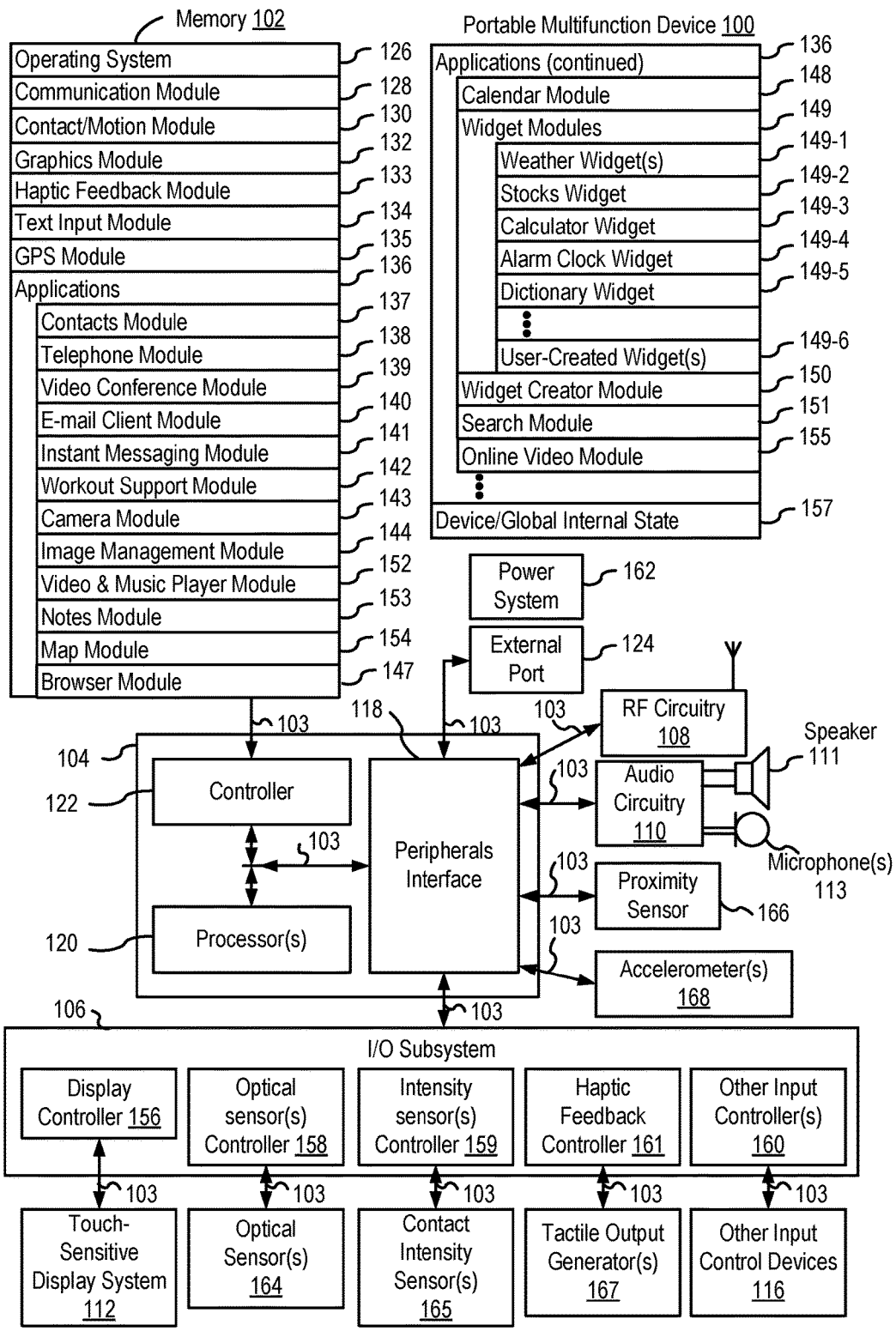
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments There is a need for electronic devices with faster, more efficient methods and interfaces for sharing location information of participants in a message conversation. Such methods and interfaces reduce the cognitive burden on a user and produce a more efficient human-machine interface. For battery-operated devices, such methods and interfaces conserve power and increase the time between battery charges.

Below, FIGS. 1A-1B, 2, 3, 4A-4B, 5A-5B, 10, 13, 16, 19, and 21 provide a description of exemplary devices for performing the techniques for sharing location information of participants in a message conversation. FIGS. 6A-6H, 8A-8B, 11A-11G, 14A-14D, and 17A-17C illustrate exemplary user message and map user interfaces for sharing location information of participants in a message conversation. FIGS. 7A-7J, 9, 12A-12H, 15A-15D, 18A-18E, and 20A-20C are flow diagrams illustrating methods of sharing location information of participants in a message conversation.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 are optionally used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HS-DPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
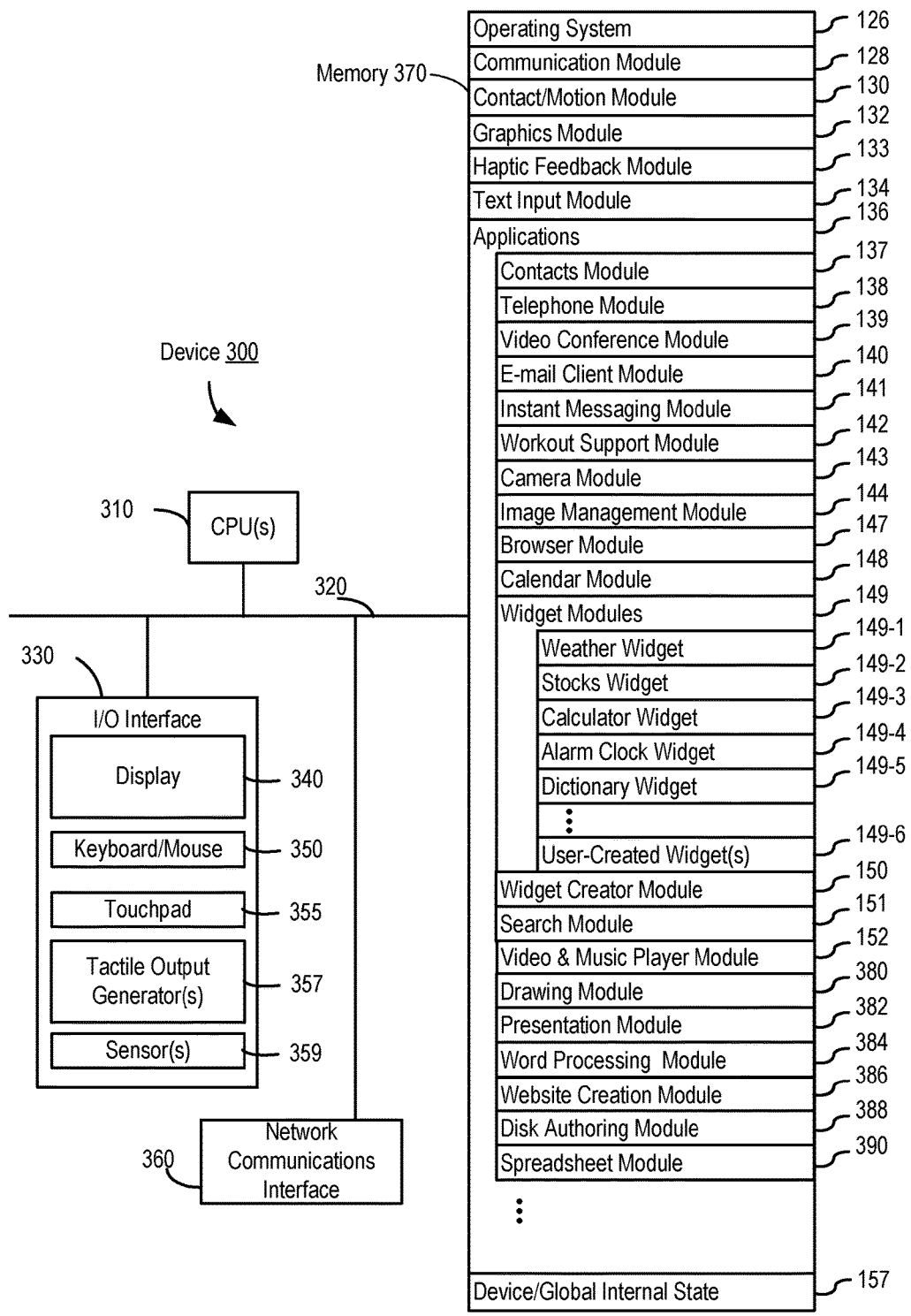
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be optionally adjusted without changing the physical hardware of device 100). For example, a mouse "click" threshold of a trackpad or touch screen display is optionally set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are, optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
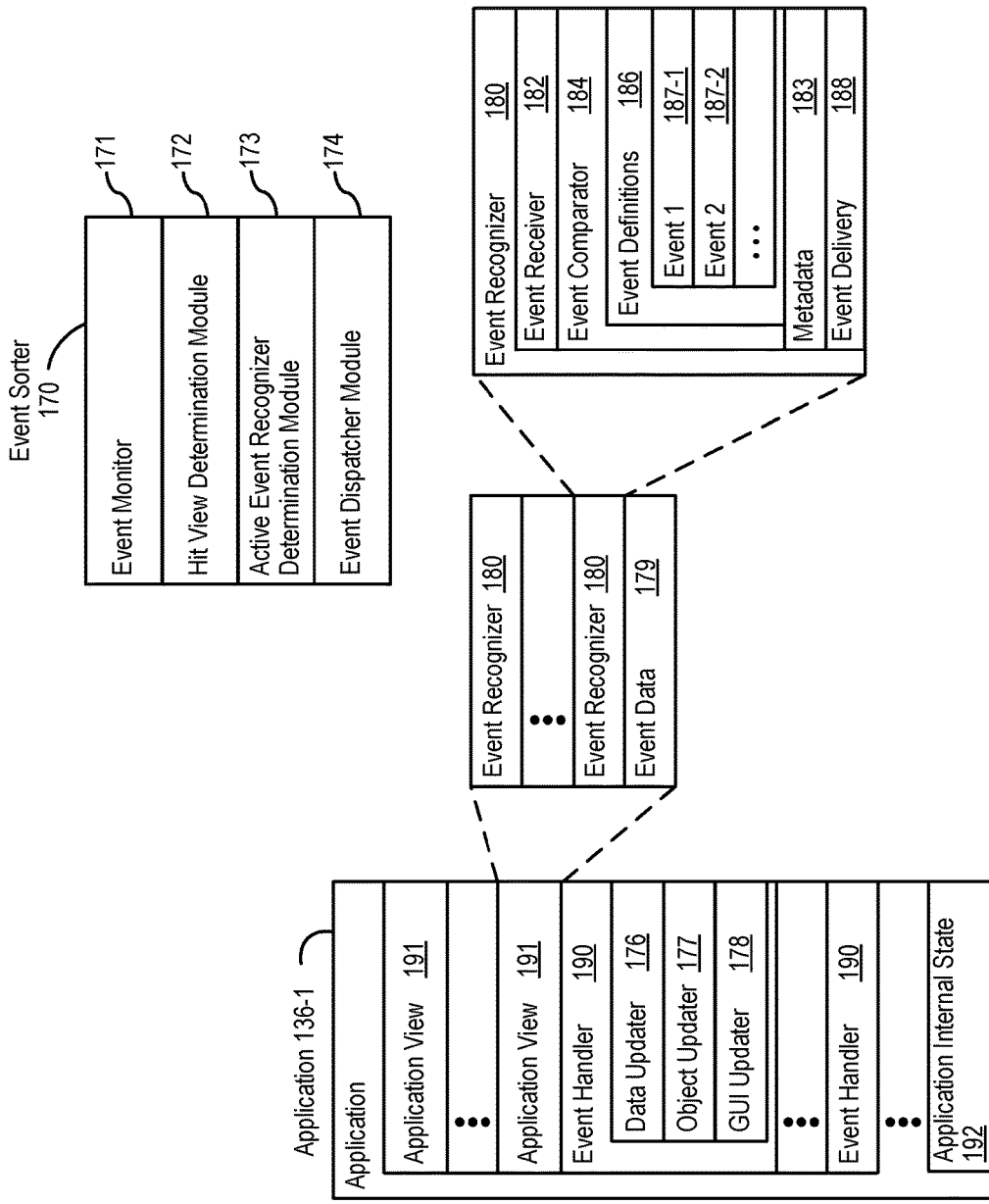
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
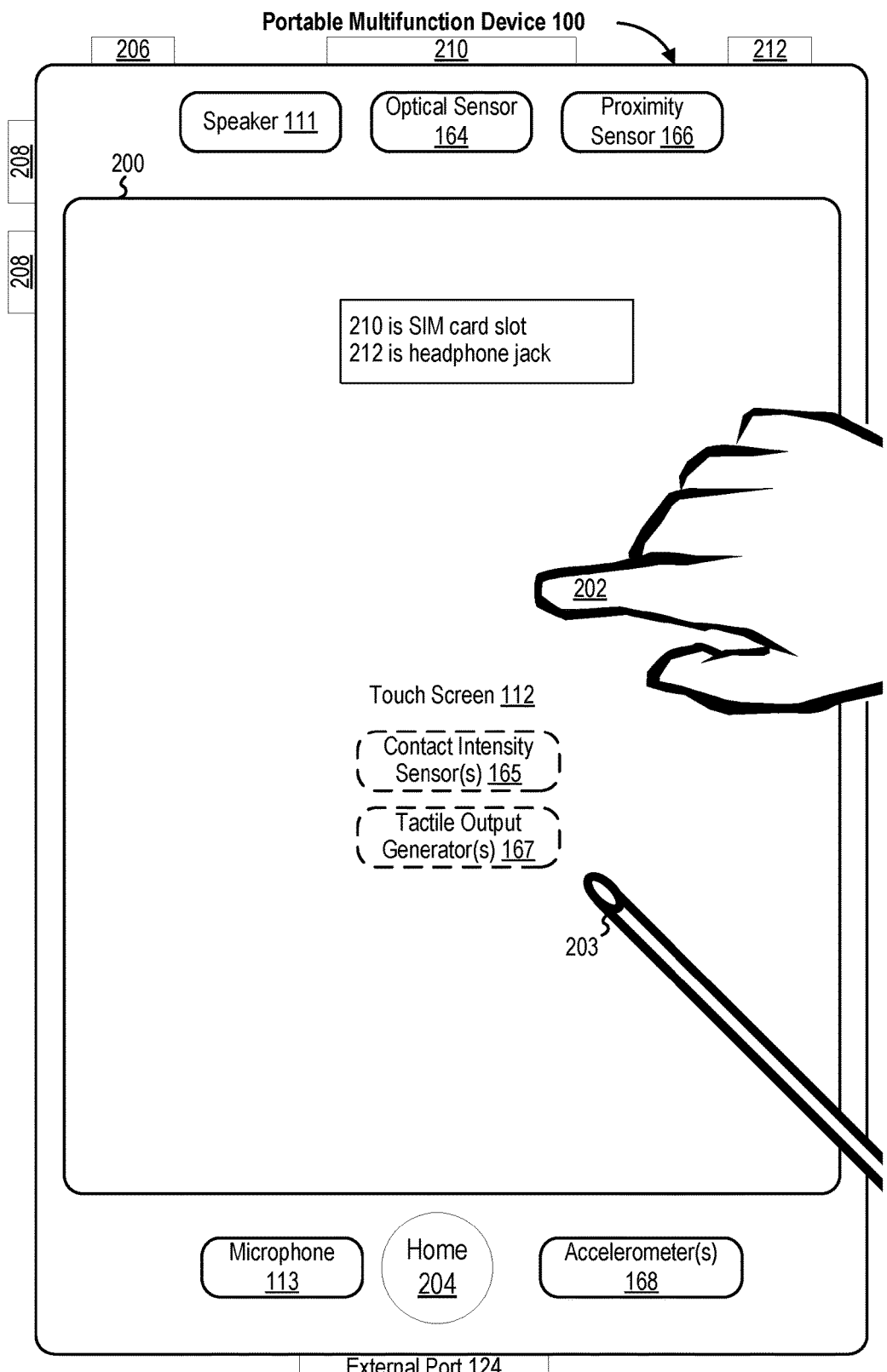
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
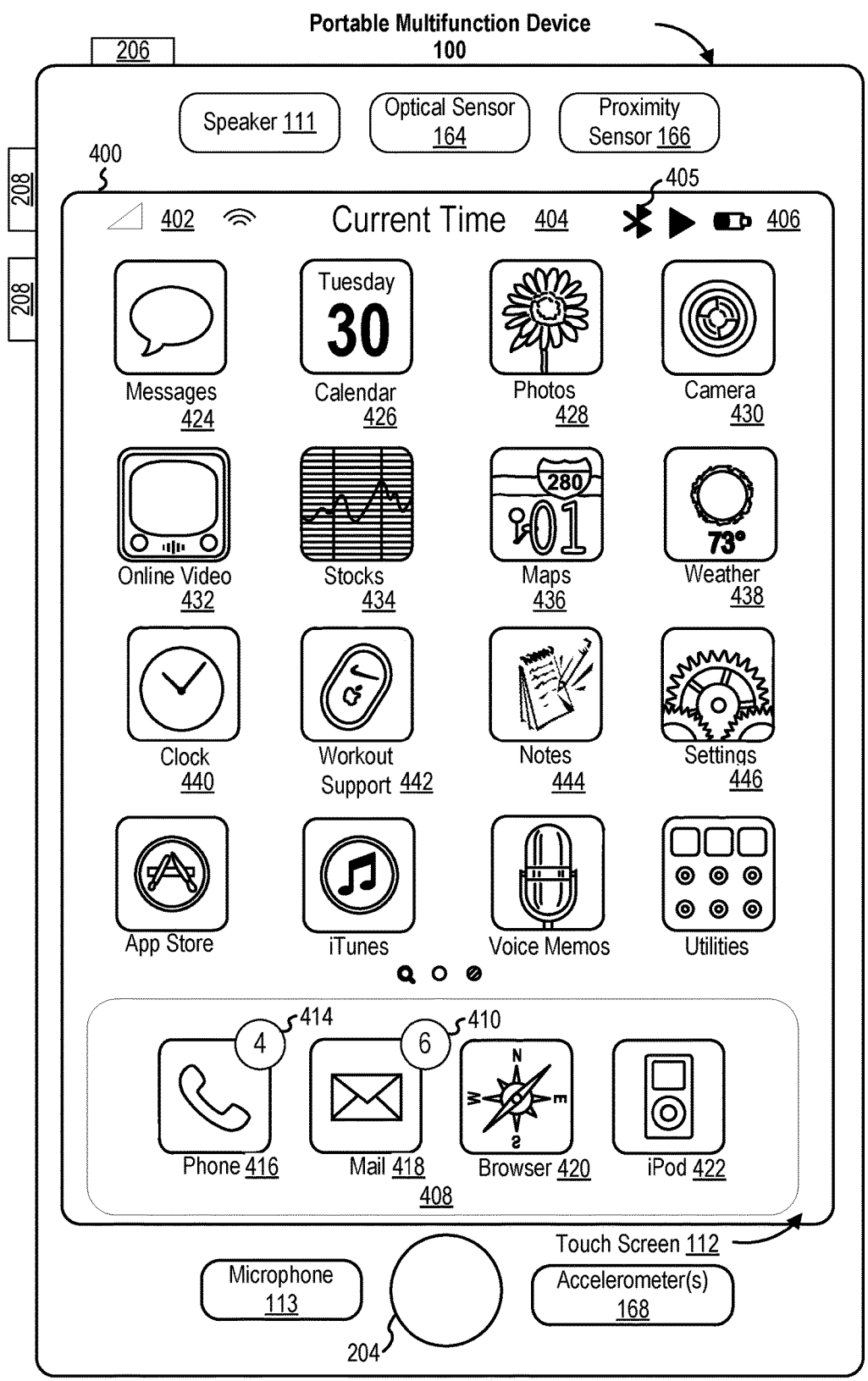
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
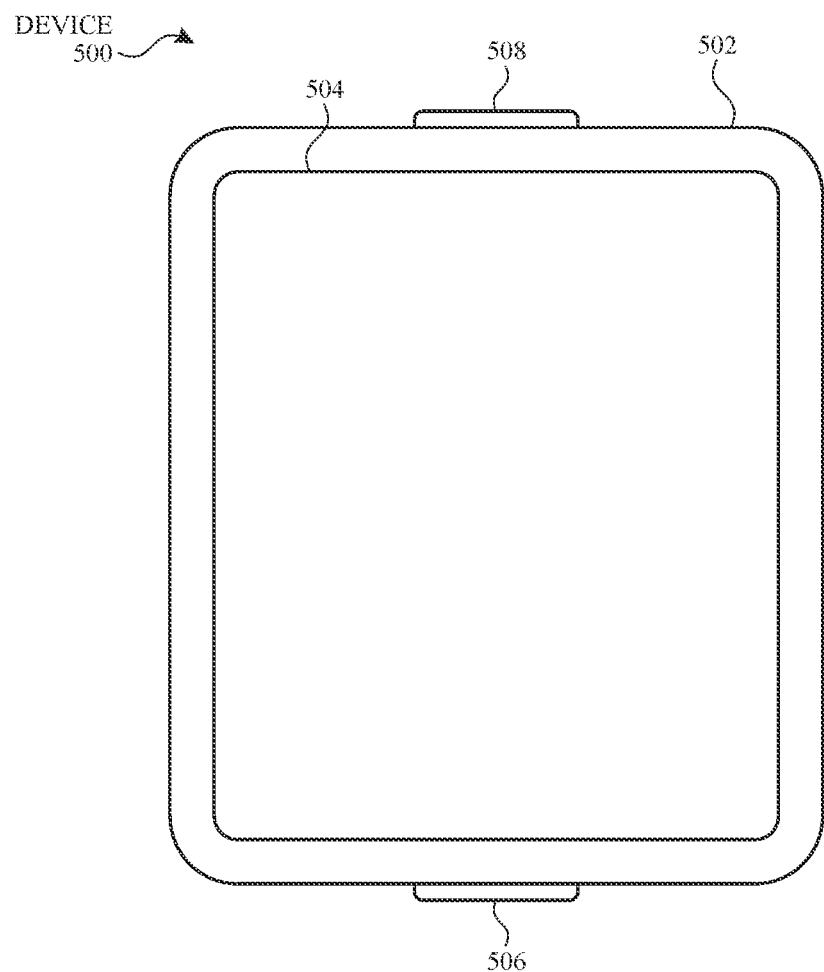
FIG. 5A illustrates a personal electronic device in accordance with some embodiments.

FIG. 5A illustrates exemplary personal electronic device 500. Device 500 includes body 502. In some embodiments, device 500 optionally includes some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) optionally provide output data that represents the intensity of touches. The user interface of device 500 optionally responds to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
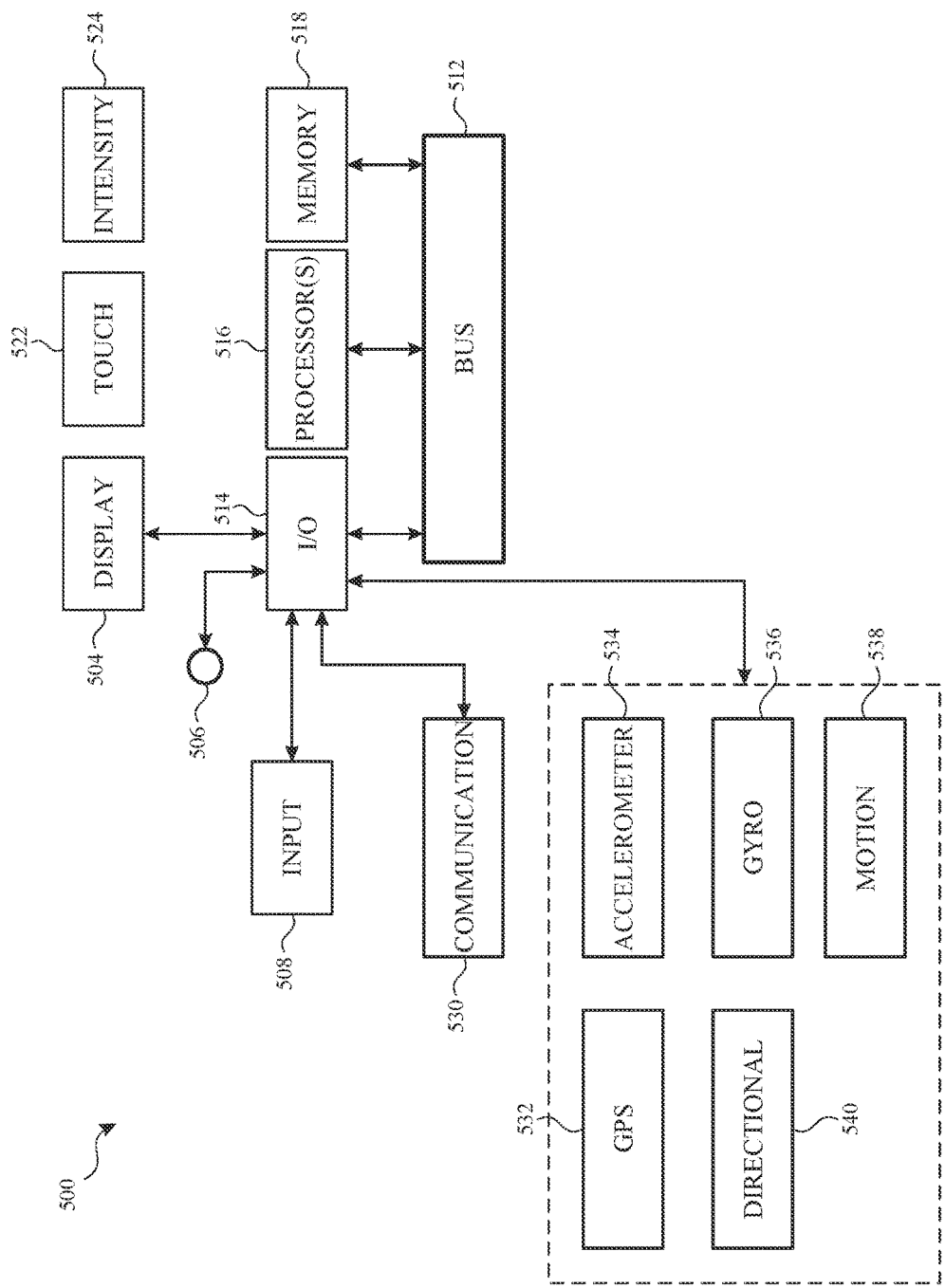
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 is optionally connected to display 504, which can have touch-sensitive component 522 and, optionally, intensity sensor 524 (e.g., contact intensity sensor). In addition, I/O section 514 is optionally connected with communication unit 530 for receiving application and operating system data, using Wi-Fi, Bluetooth, near field communication (NFC), cellular, and/or other wireless communication techniques. Device 500 optionally includes input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which is, optionally, operatively connected to I/O section 514.

Memory 518 of personal electronic device 500 optionally includes one or more non-transitory computer-readable storage mediums, for storing computer-executable instructions, which, when executed by one or more computer processors 516, for example, can cause the computer processors to perform the techniques described below, including processes 700, 900, 1200, 1500, 1800, and 2000 (FIGS. 7A-7J, 9, 12A-12H, 15A-15D, 18A-18E, and 20A-20C). Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each, optionally, constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

Attention is now directed toward embodiments of message user interfaces for sharing location information of participants in a message conversation.

FIG. 6A depicts an exemplary message user interface that is optionally displayed by device 600. In some embodiments, the user interface is displayed on device 300 or device 500. The message user interface includes a message region 602 for displaying messages 606 and 608 sent between a first participant (the user of device 600) and a second participant in a message conversation and for displaying a banner 604 including the name of the second participant and a current time of day. Messages sent between the participants are displayed inside bounded message areas. In some embodiments, a bounded message area is a contiguous region that is visually distinguished from a background of the application canvas. The message user interface also includes a location-sharing affordance 610.

FIG. 6A illustrates the first participant requesting to share first participant location information with the second participant. The first participant selects the location-sharing affordance 610 to make the location-sharing request, and the second participant receives first participant location information during a predetermined location-sharing time period (e.g., device 600 transmits the first participant location data to a device associated with the second participant for a predetermined period of time). In the embodiment of FIG. 6B, first participant location information is shared via a map 612 inserted in the message transcript of messages 606 and 608 sent between the first participant and second participant in the message conversation.

Exemplary user interfaces and processes for sharing location information between message conversation participants are disclosed in U.S. application Ser. No. 14/503,376, filed Sep. 30, 2014 and titled "Message User Interfaces for Capture and Transmittal of Media and Location Content", the contents of which are hereby incorporated by reference in their entirety.

A scheduled end 614 of the predetermined location-sharing time period is included below the map. In some embodiments, the predetermined location-sharing time period is displayed elsewhere, such as in banner 604 for example. In the embodiment of FIG. 6B, the predetermined location-sharing time period is two hours, scheduling an end at 1:01 p.m. for a location-sharing request detected at 11:01 a.m. In some embodiments, the predetermined location-sharing time period is a different period, is set by the user, or is set by a manufacturer and/or retailer.

A shared-location affordance 616 is displayed to indicate that first participant location information is currently shared with the second participant. As used herein, a location-sharing affordance can be understood to include a user-interactive graphical user interface object that permits a user to share location information by interacting with the object. As used herein, a shared-location affordance can be understood to include a user-interactive graphical user interface object that permits a user to stop sharing location information by interacting with the object.

In the embodiment of FIG. 6B, the shared-location affordance 616 is a shaded caret, to distinguish the unshaded caret of location-sharing affordance 610. In some embodiments, another visual attribute is modified to indicate location information is currently shared. In some embodiments, a visual attribute of an information bar is modified to indicate that location information is currently shared.

In some embodiments, a map view (e.g., map 612) is provided to indicate location information is currently shared. In the embodiment of FIG. 6B, the map view is displayed in the message transcript between two messages; in some embodiments, the map view is displayed above the transcript, in the banner for example, or below the transcript above a keyboard. In some embodiments, the map view is displayed behind an image (photo, avatar, etc.) of the participant currently sharing information. In some embodiments, the location of a message participant is updated over time (e.g., as the user moves around) and the device displays an updated map view as the participant's location information changes. In some embodiments, an indication of location sharing includes a location-sharing status, a current address of the first participant, a travel time between the first participant and the second participant, a distance between the first participant and the second participant, and a time when location sharing ends. In some embodiments, an indication of location sharing includes text, such as "Location Sharing Turned On" or "You Can View [first participant's] Location."

In some embodiments, the text associated with the indication of location sharing is displayed adjacent to a map within a bounded message region. In other embodiments, the text is not contained within a bounded message region. The text is optionally displayed below the most recent message received from the participant sharing the location information and aligned to that message, for example. In some embodiments, the text is displayed such that it is horizontally centered within the transcript and vertically positioned between messages in the conversation.

When one of the first participant and the second participant interact with the message conversation during the predetermined location-sharing time period, the predetermined location-sharing time period is optionally extended to end at a second time that is after the first time. FIG. 6C illustrates message transcript 602 after the second participant has sent a new message 618 after the first participant's request to share location information (illustrated in FIG. 6A). In response to the second participant's interaction with the message conversation, the predetermined location-sharing time period is extended, as depicted by the second end time 620 below the map. In FIG. 6C, the predetermined location-sharing time period has been extended by 15 minutes (from 1:01 PM to 1:16 PM). In some embodiments, the period is extended by 5 minutes, 10 minutes, 20 minutes, 30 minutes, and so forth.

Advantageously, this allows users to continue sharing location during a single conversation but ends location sharing after the conversation has ended to preserve privacy without requiring a user to explicitly indicate that the conversation has ended. At the same time, in embodiments in which a participant's location is updated periodically, users receive up-to-date location information for one or more participants, which may be preferable to static location information. This also improves the user's experience when the user is not required to remember to stop sharing indefinitely-shared location information when first participant information is no longer necessary for the second participant. The user is also not required to repeatedly share one-off location information when first participant information is necessary for the second participant. This reduces battery usage as users are not required to repeatedly access and select location-sharing via the user interface.

In some embodiments, the predetermined location-sharing time period is extended only when one of the participants adds content to the conversation (e.g., by sending a new message). In some embodiments, the extended time period is shorter than the predetermined location-sharing time period. In the examples displayed in FIGS. 6A-6H, the predetermined location-sharing time period is two hours and each extension is 15 minutes. In some embodiments, different location-sharing time periods and different extensions are used.

In some embodiments, the location-sharing time period is further extended after one of the first and second participant interacts with the message conversation during the already extended location-sharing time period. FIG. 6D illustrates message transcript 602 after the first participant has sent a new message 622 after the location-sharing time period has been extended (illustrated in FIG. 6C) to share location information. In response to the first participant's interaction with the message conversation, the predetermined location-sharing time period is extended, as depicted by the second end time 624 below the map.

The process of further extending the location-sharing time period is optionally repeated any number of times. This optionally allows users to continue sharing location during a single conversation but ends location sharing after the conversation has ended to preserve privacy without requiring a user to explicitly indicate that the conversation has ended. FIG. 6E illustrates the first participant adding a message 630 to the message conversation subsequent to second participant message 618 (see FIG. 6C) and after the location-sharing time period has ended. In this embodiment, message 618 (FIG. 6C) was added at 11:25 AM and the next message (message 630 sent by the first participant) was added at 1:31 PM, after the location-sharing time period ended at 1:16 PM (see FIG. 6C, 620). Because a participant interacts with the message conversation after the extended predetermined location-sharing time period has ended, the predetermined location-sharing time period is not extended.

Advantageously, this allows users to continue sharing location during a single conversation but ends location sharing after the conversation has ended to preserve privacy without requiring a user to explicitly indicate that the conversation has ended. This also improves the user's experience when the user is not required to remember to stop sharing indefinitely-shared location information when first participant information is no longer necessary for the second participant. The user is also not required to repeatedly share one-off location information when first participant information is necessary for the second participant. This reduces battery usage as users are not required to repeatedly access and select location-sharing via the user interface.

In some embodiments, device 600 determines whether or not to extend the location-sharing time period based on whether the interaction occurred after the location-sharing time period has ended.

In the embodiment of FIG. 6E, the ended location-sharing time period is depicted by shading a map 628, displaying text 626, and unshaded caret 632. In embodiments where location sharing is indicated by a modified visual attribute of a sharing location affordance or an information bar, the device optionally discontinues the modification to indicate location sharing has ended. In some embodiments, an ended location-sharing time period is indicated with one of these attributes, with a combination of two or more of these attributes, or with other attributes.

In some embodiments, device 600 determines that the predetermined location-sharing time period has ended and, in response to the determination, displays an indication in the message conversation that the location of the first participant is not being shared with the second participant. In some embodiments, the indication includes a greyed out map (such as 628) or an empty caret (such as 632). In some embodiments, if an indication of a user's location was displayed in a message transcript when the user shared their location, redisplaying the portion of the transcript that includes the indication of the user's location still shows the previously displayed indication but its appearance is modified so as to indicate that the location information in the indication is stale (e.g., because the location-sharing time period had expired without being extended).

In some embodiments, a depiction, on device 600, of an ended location-sharing time period is provided at the moment the time period ends. In some embodiments, a depiction, on device 600, of an ended location-sharing time period is provided at the moment of the next interaction by one of the first participant and the second participant with the message conversation.

In some embodiments, interacting with the message conversation includes a participant viewing at least a portion of the message conversation and/or a participant adding a message to the message conversation. In some embodiments, a location-sharing time period is extended when an outside communication between the first and second participants is detected. Such outside communications optionally include a phone call or video call or other form of direct communication between the two participants outside of the message conversation.

FIG. 6F illustrates another option for ending a location-sharing time period. In the embodiment of FIG. 6F, the first participant selects the shared-location affordance 616 before the location-sharing time period has expired, which ends location sharing, as shown in FIG. 6G.

In some embodiments, second participant location information is automatically shared when the first participant requests to share information. FIG. 6H illustrates a message transcript after the first participant requested (see, e.g., FIG. 6A) to share location information. A map 638 of the second participant's location is received and displayed. In some embodiments, a request is transmitted for second participant location information (see, e.g., FIG. 8B).

In some embodiments, a location-sharing instruction is transmitted to an external device, wherein the location-sharing instruction permits the external device to share first participant location information with the second participant. For example, where an application tracks the first participant's location (e.g., Maps, location sharing applications, etc.), a server associated with that application is instructed to provide the first participant's location information. In some embodiments, the first participant location information is transmitted to an external device, such as a personal electronic device of the second participant.

In some embodiments, first participant location information is a location of device 600. In some embodiments, the first participant has multiple devices and first participant location information is the device that is determined to be most representative of the first participant's location. In such an embodiment, device 600 determines whether device 600 is representative of the first participant's location. If device 600 determines that it is representative of the first participant's location, a location of the device is transmitted. If device 600 determines that it is not representative of the first participant's location, a location of the device is not transmitted.

In some embodiments, location-sharing is extended only when a message interaction occurs within a window at the end of current location-sharing time period. For example, only interactions within the last fifteen minutes of a two-hour location-sharing time period extend the location-sharing time period. An interaction within the two-hour location-sharing time period but before the last fifteen minutes does not extend the location-sharing time period.

In some embodiments, a buffer time is provided after the location-sharing time period for extending location sharing. For example, if device 600 detects interaction with the message conversation after first participant location information sharing has stopped and device 600 determines that less than a buffer time period has elapsed since the time first participant location information sharing was stopped, device 600 re-enables the second participant to obtain the first participant location information. In some embodiments, device 600 re-enables only when the location-sharing time period expired and not when the first participant actively ends location-sharing (see, e.g., FIG. 6F). In some embodiments, the first participant is notified that the second participant has been re-enabled to obtain the first participant location information.

In some embodiments, a message conversation includes a third participant. Upon receiving a request from the first participant to share location information with the third participant, device 600 enables both the second and third participants to obtain first participant location information during a predetermined location-sharing time period. In some embodiments, the location-sharing request to share the first participant's location with the third participant is the same as the location-sharing request to share the first participant's location with the second participant (e.g., a single location-sharing request to share location in the message conversation causes the first participant's location to be shared with multiple other participants in the conversation or, optionally, all other participants in the conversation).

FIG. 7A is a flow diagram illustrating process 700 for sharing a message participant's location information using an electronic device in accordance with some embodiments. Process 700 is performed at an electronic device (e.g., device 100, 300, 500) with a display and a touch-sensitive surface. Some operations in process 700 are optionally combined, the order of some operations is optionally changed, and some operations are optionally omitted.

As described below, process 700 provides an intuitive way for sharing location information. The method reduces the cognitive burden on a user for sharing location information, thereby creating a more efficient human-machine interface. For battery-operated computing devices, enabling a user to share location information faster and more efficiently conserves power and increases the time between battery charges.

At block 702, the device displays, on the display, a message region (e.g., message region 602 in FIG. 6A) with messages sent (e.g., messages 606 and 608 in FIG. 6A) between a first participant and a second participant in a message conversation. At block 704, the device detects a location-sharing request from the first participant to share first participant location information with the second participant (e.g., detecting selection of affordance 610). In response to detecting the location-sharing request from the first participant, at block 706 the device enables the second participant to obtain the first participant location information during a predetermined location-sharing time period that is scheduled to end at a first time (e.g., enabling location sharing until scheduled end 614 below map 612 in FIG. 6B). At block 708, the device detects interaction by one of the first participant and the second participant with the message conversation during the predetermined location-sharing time period (e.g., additional message 618 in FIG. 6C). In response to detecting interaction by one of the first participant and the second participant with the message conversation during the predetermined location-sharing time period, at block 710 the device extends the predetermined location-sharing time period to end at a second time that is after the first time (e.g., second end time 620 is 15 minutes later than first end time 614 in FIGS. 6C and 6B, respectively).

Advantageously, this allows users to continue sharing location during a single conversation but ends location sharing after the conversation has ended to preserve privacy without requiring a user to explicitly indicate that the conversation has ended. This also improves the user's experience when the user is not required to remember to stop sharing indefinitely-shared location information when first participant information is no longer necessary for the second participant. The user is also not required to repeatedly share one-off location information when first participant information is necessary for the second participant. This reduces battery usage as users are not required to repeatedly access and select location-sharing via the user interface.

Figure 7B:
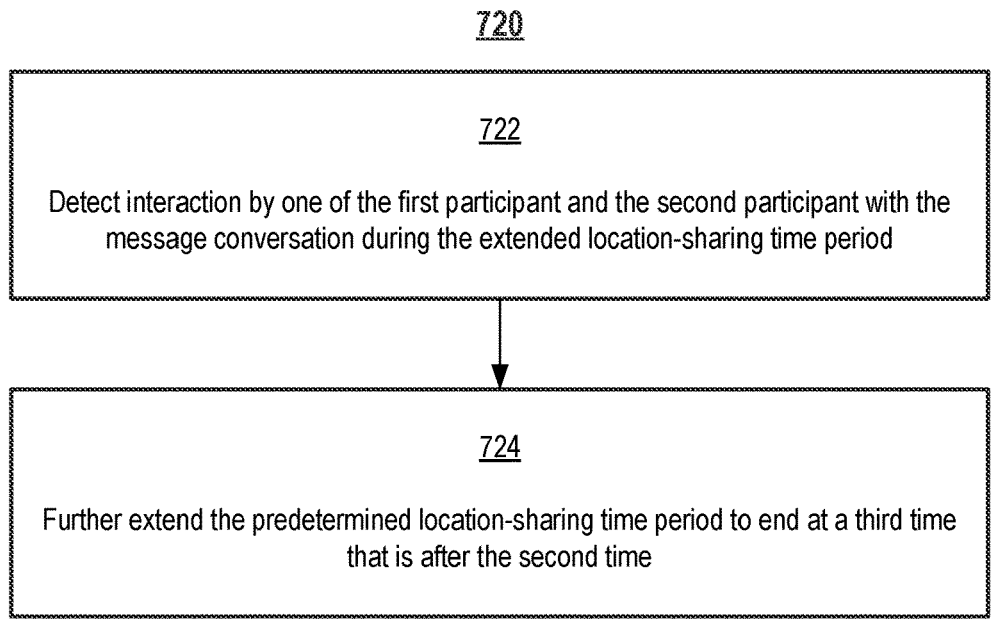
FIG. 7B is a flow diagram illustrating a process for sharing location information.
Figure 7C:
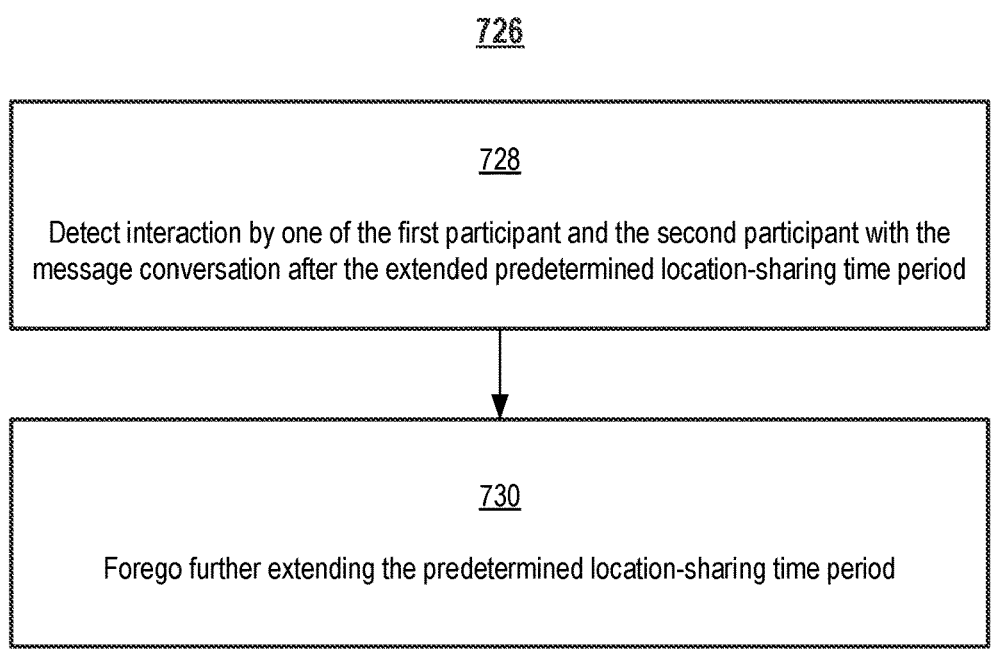
FIG. 7C is a flow diagram illustrating a process for sharing location information.

FIGS. 7B and 7C are flow diagrams illustrating sub-processes 720 and 726 which are optionally performed after block 710 and during process 700 (FIG. 7A). In some embodiments, one or more of optional blocks 722-724 illustrated in FIG. 7B are performed after block 710 (FIG. 7A). At block 722, the device detects interaction by one of the first participant and the second participant with the message conversation during the extended location-sharing time period (e.g., typing of additional message 622 in FIG. 6D). In response to detecting interaction by one of the first participant and the second participant with the message conversation during the extended location-sharing time period, the device at block 724 further extends the predetermined location-sharing time period to end at a third time that is after the second time (e.g., enabling location sharing until scheduled end 624 in FIG. 6D). The process of further extending the location-sharing time period is, optionally, repeated any number of times. This enables users to continue sharing location during a single conversation but ends location sharing after the conversation has ended to preserve privacy without requiring a user to explicitly indicate that the conversation has ended.

Turning to FIG. 7C, in some embodiments one or more of optional blocks 728-730 illustrated in FIG. 7C are performed after block 710 (FIG. 7A). At block 728, the device detects interaction by one of the first participant and the second participant with the message conversation after the extended predetermined location-sharing time period (e.g., receiving new message 630 in FIG. 6E). In response to detecting interaction by one of the first participant and the second participant with the message conversation after the extended predetermined location-sharing time period, the device at block 730 forgoes further extending the predetermined location-sharing time period (e.g., does not extend the location sharing to a new time such as new time 624 in FIG. 6D). Because a participant interacts with the message conversation after the extended predetermined location-sharing time period has ended, the predetermined location-sharing time period is not extended. Advantageously, this allows users to continuously share location during a single conversation but ends location sharing after the conversation has ended to preserve privacy without requiring a user to explicitly indicate that the conversation has ended. This also improves the user's experience when the user is not required to remember to stop sharing indefinitely-shared location information when first participant information is no longer necessary for the second participant. The user is also not required to repeatedly share one-off location information when first participant information is necessary for the second participant. This also reduces battery usage, as users are not required to repeatedly access and select location-sharing.

In some embodiments, detecting interaction by one of the first participant and the second participant with the message conversation comprises detecting at least one criteria selected from the group consisting of: the first participant viewing at least a portion of the message conversation (e.g., viewing message region 602), the second participant viewing at least a portion of the message conversation, the first participant adding a message to the message conversation (e.g., adding message 622), and the second participant adding a message to the message conversation (e.g., adding message 618).

Figure 7D:
FIG. 7D is a flow diagram illustrating a process for sharing location information.

FIG. 7D is a flow diagram illustrating sub-process 732 which is optionally performed during process 700 (FIG. 7A). In some embodiments, blocks 734-736 are performed instead of blocks 708-710. In some embodiments, blocks 734-736 are performed after block 710. In some embodiments, blocks 734-736 are performed before block 710. At block 734, the device detects a communication between the first and second participant outside of the message conversation during the predetermined location-sharing time period. Such outside communications optionally include a phone call or video call (e.g., a phone or video call, received on device 600, from a device of the second participant) or other form of direct communication between the two participants outside of the message conversation. In response to detecting a communication between the first and second participant outside of the message conversation during the predetermined location-sharing time period, the device at block 736 extends the predetermined location-sharing time period (e.g., extends time 624 to a new time later than 1:31 pm).

In some embodiments, the device displays an indication (e.g., modifying a visual attribute of a caret 616, an information bar 614, a map 612, or any other indication described herein) in the message conversation that the location of the first participant is being shared with the second participant. In some embodiments, when the location-sharing time period ends (e.g., without being extended), the device ceases to display the indication. In some embodiments, the indication is a map view (e.g., map view 614 in FIG. 6B). In some embodiments, the map-view is displayed behind an image of the first participant. In some embodiments, the map-view is displayed between two messages (e.g., messages 608 and 618 in FIG. 6C) of the message conversation. In some embodiments, the indication is a map view (e.g., map view 614 in FIG. 6B) and the device updates the map view (e.g., map view 620 in FIG. 6C) when the first participant location information changes. In some embodiments, the indication includes one or more of a location-sharing status (e.g., text "sharing location until 1:01 pm" in 614 in FIG. 6B), the first time (e.g., text "1:01 pm" in 614 in FIG. 6B), the second time (e.g., text "1:16 pm" in 620 in FIG. 6C), a current address of the first participant, a travel time between the first participant and the second participant, and a distance between the first participant and the second participant.

Figure 7E:
FIG. 7E is a flow diagram illustrating a process for sharing location information.

In some embodiments, the indication is a shared-location affordance (e.g., shared location affordance 616 in FIG. 6F). FIG. 7E is a flow diagram illustrating sub-process 738 which is optionally performed during process 700 (FIG. 7A) when the device displays a shared-location affordance. At block 740, the device detects a selection of the shared-location affordance by the first participant (e.g., selection of caret 616 in FIG. 6F). In response to detecting the selection of the shared-location affordance by the first participant, the device at block 742 ends the predetermined location-sharing time period (e.g., as represented by empty caret 632 in FIG. 6G).

FIG. 7F is a flow diagram illustrating sub-process 744, which is optionally performed during process 700 (FIG. 7A). At block 746, the device determines that the predetermined location-sharing time period has ended (e.g., determines second time 620 in FIG. 6C has passed). In accordance with the determination that the predetermined location-sharing time period has ended, the device displays at block 748 an indication (e.g., grey out map 628, empty navigation caret 632, and text 620 in FIG. 6E) in the message conversation that the location of the first participant is not being shared with the second participant. In some embodiments, if an indication of a user's location was displayed in a message transcript when the user shared their location, redisplaying the portion of the transcript that includes the indication of the user's location still shows the previously displayed indication but its appearance is modified so as to indicate that the location information in the indication is stale (e.g., because the location-sharing time period had expired without being extended).

FIG. 7G is a flow diagram illustrating sub-process 750 which is optionally performed during block 706 of process 700 (FIG. 7A). At block 752, the device receives second participant location information. At block 754, the device displays (e.g., map 638 in FIG. 6H) the second participant location information. In this embodiment, the device automatically shares second participant location information with the first participant after the first participant enables sharing of first participant location information. In some embodiments, location sharing is unilateral (e.g., second participant location information is not automatically shared with the first participant after the first participant enables sharing of first participant location information). In some such embodiments, the device transmits a request for second participant location information.

Figure 7H:
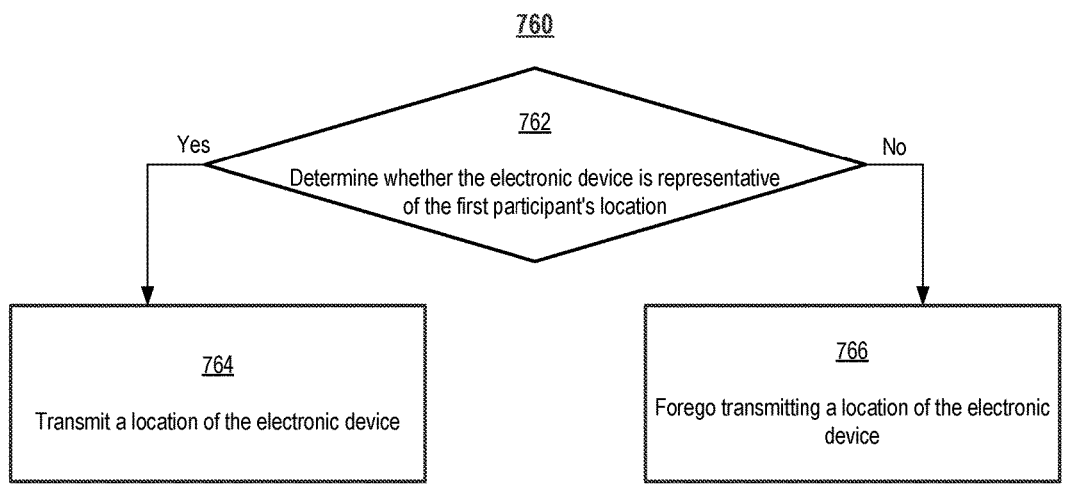
FIG. 7H is a flow diagram illustrating a process for sharing location information.

FIG. 7H is a flow diagram illustrating sub-process 760 which is optionally performed during process 700 (FIG. 7A). At block 762, the device determines whether the electronic device is representative of the first participant's location (e.g., device 600 is determined to be in possession of the first participant). In some embodiments, the device determines whether it is representative of the first participant's location. In accordance with a determination that the electronic device is representative of the first participant's location, the device at block 764 transmits a location of the electronic device (e.g., transmits the location illustrated in map view 612 of FIG. 6B). In accordance with a determination that the electronic device is not representative of the first participant's location, the device at block 766 forgoes transmitting a location of the electronic device (e.g., does not transmit the location in map view 612 of FIG. 6B).

Figure 7I:
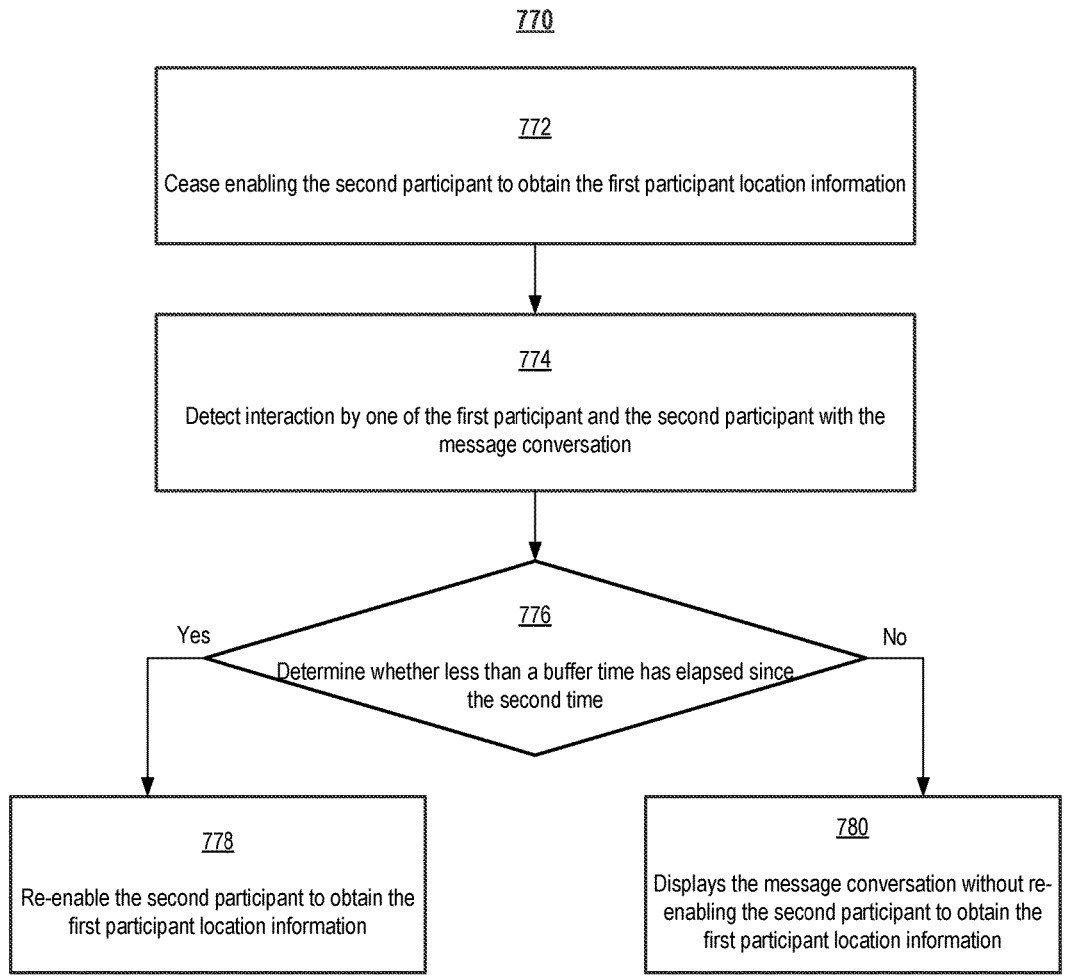
FIG. 7I is a flow diagram illustrating a process for sharing location information.

FIG. 7I is a flow diagram illustrating sub-process 770, which is optionally performed after the second time described above in process 700 (FIG. 7A). At block 772, the device ceases enabling the second participant to obtain the first participant location information (e.g., device 600 does not transmit an updated location). At block 774, the device detects interaction by one of the first participant and the second participant with the message conversation (e.g., new message 630 in FIG. 6E). In response to detecting interaction by one of the first participant and the second participant with the message conversation after the second time, the device at block 776 determines whether less than a buffer time period has elapsed since the second time (e.g., within 5 minutes of second time 620). In accordance with a determination that less than a buffer time period has elapsed since the second time, the device at block 778 re-enables the second participant to obtain the first participant location information (e.g., enabling location sharing until an end time after second time 620). In some embodiments, the first participant is notified that the second participant has been re-enabled to obtain the first participant location information. In accordance with a determination that more than the buffer time period has elapsed since the second time, the device at block 780, displays the message conversation without re-enabling the second participant to obtain the first participant location information.

Figure 7J:
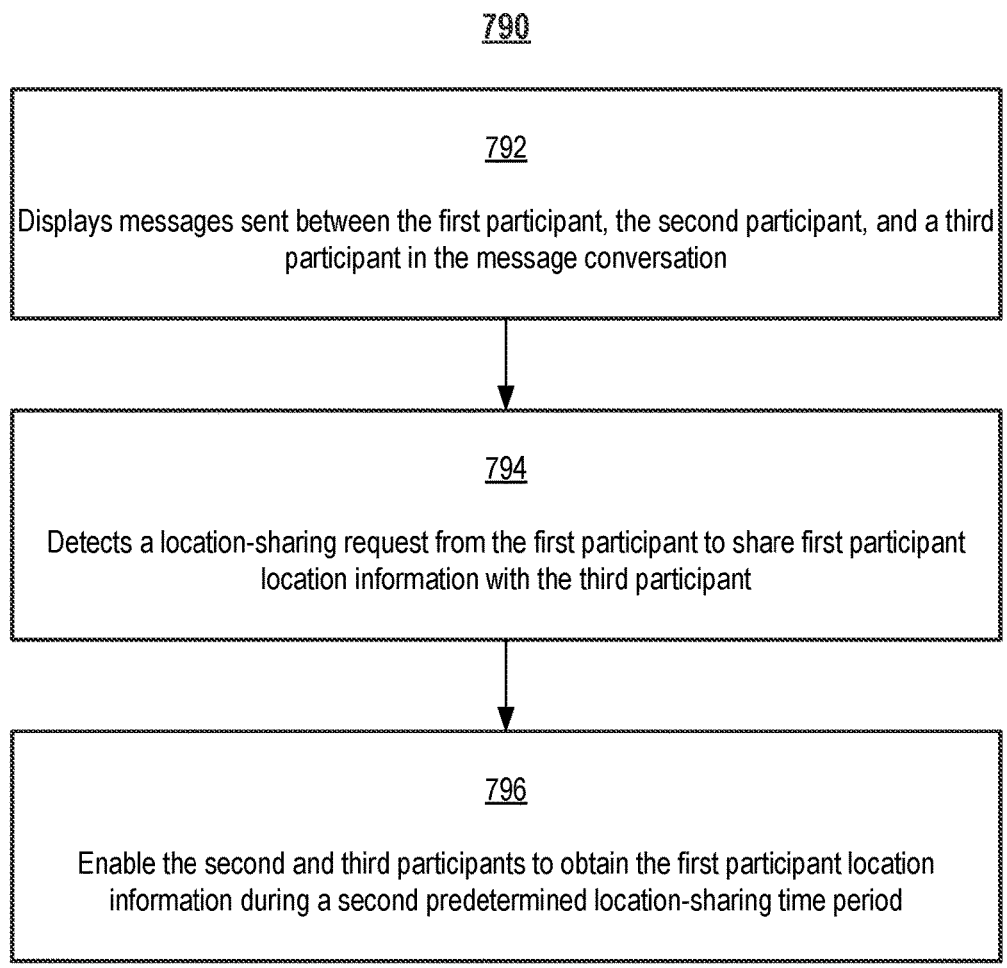
FIG. 7J is a flow diagram illustrating a process for sharing location information.

FIG. 7J is a flow diagram illustrating sub-process 790 which is optionally performed during process 700 (FIG. 7A) when the conversation includes a third participant. At block 792, the device displays messages sent between the first participant, the second participant, and a third participant in the message conversation. At block 794, the device detects a location-sharing request from the first participant to share first participant location information with the third participant. In some embodiments, the location-sharing request to share the first participant's location with the third participant is the same as the location-sharing request to share the first participant's location with the second participant (e.g., a single location-sharing request to share location in the message conversation causes the first participant's location to be shared with multiple other participants in the conversation or, optionally, all other participants in the conversation). In response to detecting the location-sharing request from the first participant to share first participant location information with the third participant, the device at block 796 enables the second and third participants to obtain the first participant location information during a second predetermined location-sharing time period.

In some embodiments, the extended time period is shorter than the predetermined location-sharing time period. In some embodiments, the predetermined location-sharing time period is two hours and each extension is 15 minutes. In some embodiments, different location-sharing time periods and different extensions are used.

In some embodiments, a location-sharing instruction is received from an external device, wherein the location-sharing instruction permits the external device to share first participant location information with the second participant. For example, where an application tracks the first participant's location (e.g., Maps, location sharing applications, etc.), a server associated with that application is instructed to provide the first participant's location information. In some embodiments, the first participant location information is received from an external device, such as a mobile phone of the first participant. In some embodiments, first participant location information is a location of a device of the first participant.

Note that details of the processes described above with respect to process 700 (e.g., FIGS. 7A-7J) are also applicable in an analogous manner to the processes described herein. For example, processes 900, 1200, 1500, 1800, and 2000 optionally include one or more of the characteristics of the various processes described above with reference to process 700. For example, extending block 710 is optionally incorporated in any of processes 900, 1200, 1500, 1800, and/or 2000. Additionally, the conversations, location sharing affordances, shared location affordances, location-sharing time periods, participants, participant location information, location sharing extensions, interactions with a message conversation, communications outside a message conversation, and indications described above with reference to process 700, or sub-processes 720, 726, 732, 738, 744, 750, 760, 770, and/or 790, optionally share some or all of the characteristics with the conversations, location sharing affordances, shared location affordances, location-sharing time periods, participants, participant location information, location sharing extensions, interactions with a message conversation, communications outside a message conversation, and indications described with reference to processes 900, 1200, 1500, 1800, and/or 2000, or sub-processes 1220, 1230, 1240, 1250, 1260, 1270, 1280, 1520, 1530, 1540, 1810, 1820, 1830, 1840, 2010, and/or 2020. For brevity, these details are not repeated in the descriptions of the other processes. The various methods and techniques described above with reference to method 700, or sub-processes 720, 726, 732, 738, 744, 750, 760, 770, and/or 790, are optionally implemented as one or more units, such as those described with regard to FIG. 10.

FIG. 8A illustrates an exemplary message user interface that is optionally displayed by a device of the second participant in the message conversation between the first and second participant described above with respect to FIGS. 6A-6H. The message user interface includes a message region 802 for displaying messages sent 806 and 808 between the first participant and the second participant. The message user interface also includes a banner 804 including the name of the first participant and a current time of day. Messages sent between the participants are displayed inside bounded message areas. The message user interface also includes a location-sharing affordance 810.

When the first participant requests to share location information (FIG. 6A), device 800 receives a location-sharing notification that first participant location information is being shared for a predetermined location-sharing time period. In the embodiment of FIG. 8A, device 800 displays a map 812 and an information bar 814. 814 includes a location of the first participant and a travel time between the first and second participants. In some embodiments, the information bar includes only one of the location and the travel time. In some embodiments, the information bar alternates between a display of a location of the first participant and a travel time between the first and second participants.

Map 812 is displayed in the message transcript between two messages; in some embodiments, the map view is displayed above the transcript, in the banner for example, or below the transcript above a keyboard. In some embodiments, the map view is displayed behind an image (photo, avatar, etc.) of the participant currently sharing information. In some embodiments, the location of a message participant is updated over time (e.g., as the user moves around) and the device displays an updated map view as the participant's location information changes. In some embodiments, an indication of location sharing includes a location-sharing status, a current address of the first participant, a travel time between the first participant and the second participant, a distance between the first participant and the second participant, and a time when location sharing ends.

In some embodiments, the scheduled end of the predetermined location-sharing time period could also be displayed on device 800.

When one of the first participant and the second participant interact with the message conversation during the predetermined location-sharing time period, the predetermined location-sharing time period is extended to end at a second time that is after the first time. For example, if a message is sent from device 800 to device 600, the predetermined location-sharing time period is extended to end at a second time. Device 800 receives a second location-sharing notification that first participant location information is being shared for an extended location-sharing time period.

In some embodiments, the predetermined location-sharing time period is extended only when one of the participants adds content to the conversation (e.g., by sending a new message). In some embodiments, the extended time period is shorter than the predetermined location-sharing time period.

In some embodiments, the location-sharing time period is further extended after the second participant interacts with the message conversation during the already extended location-sharing time period. In response, a notification of the second participant's interaction is sent from device 800 to device 600. After sending this notification, device 800 receives a notification that the extended location-sharing time period is further extended.

The process of further extending the location-sharing time period is optionally repeated any number of times. This optionally allows users to continue sharing location during a single conversation but ends location sharing after the conversation has ended to preserve privacy without requiring a user to explicitly indicate that the conversation has ended. In some embodiments, if the second participant interacts with the message conversation after the extended predetermined location-sharing time period has ended, the predetermined location-sharing time period is not extended. Advantageously, this allows users to continue sharing location during a single conversation but ends location sharing after the conversation has ended to preserve privacy without requiring a user to explicitly indicate that the conversation has ended. This also improves the user's experience when the user is not required to remember to stop sharing indefinitely-shared location information when first participant information is no longer necessary for the second participant. The user is also not required to repeatedly share one-off location information when first participant information is necessary for the second participant. This reduces battery usage as users are not required to repeatedly access and select location-sharing via the user interface.

In some embodiments, an ended location-sharing time period is depicted by shading a map, displaying text, and/or displaying a symbol. In such embodiments, device 800 determines that the predetermined location-sharing time period has ended and, in response to the determination, displays an indication in the message conversation that the location of the first participant is not being shared with the second participant. In some embodiments, if an indication of a user's location was displayed in a message transcript when the user shared their location, redisplaying the portion of the transcript that includes the indication of the user's location would still show the previously displayed indication but it's appearance would be modified so as to indicate that the location information in the indication is stale (e.g., because the location-sharing time period had expired without being extended).

In some embodiments, a depiction, on device 800, of an ended location-sharing time period is provided at the moment the time period ends. In some embodiments, a depiction, on device 800, of an ended location-sharing time period is provided at the moment of the next interaction by one of the first participant and the second participant with the message conversation.

FIG. 8B illustrates an exemplary message user interface after device 800 receives a notification of first location-sharing. In response to receiving the notification, device 800 displays a request 816 for second participant location information. In some embodiments, second participant location information is automatically shared when the first participant requests to share information. In such embodiments, when a notification of first location-sharing is received, device 800 shares second participant location information with the first participant.

In some embodiments, a location-sharing instruction is received from an external device, wherein the location-sharing instruction permits the external device to share first participant location information with the second participant. For example, where an application tracks the first participant's location (e.g., Maps, location sharing applications, etc.), a server associated with that application is instructed to provide the first participant's location information. In some embodiments, the first participant location information is received from an external device, such as a mobile phone of the first participant. In some embodiments, first participant location information is a location of a device of the first participant.

Figure 9:
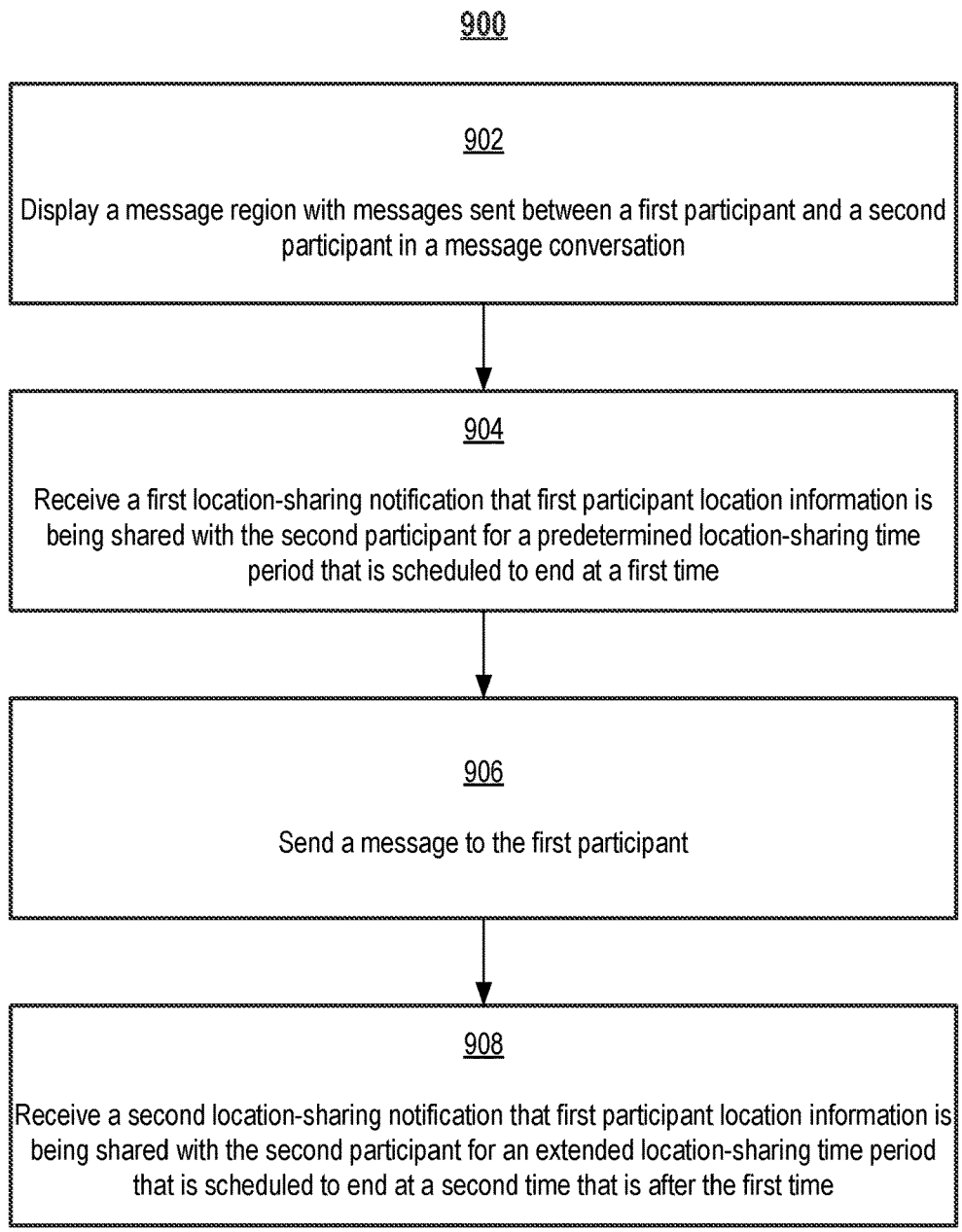
FIG. 9 is a flow diagram illustrating a process for sharing location information.

FIG. 9 is a flow diagram illustrating process 900 for sharing a message participant's location information using an electronic device in accordance with some embodiments. Process 900 is performed at an electronic device (e.g., device 100, 300, 500) with a display and a touch-sensitive surface. Some operations in process 900 are optionally combined, the order of some operations is optionally changed, and some operations are optionally omitted.

As described below, process 900 provides an intuitive way for sharing location information. The method reduces the cognitive burden on a user for sharing location information, thereby creating a more efficient human-machine interface. For battery-operated computing devices, enabling a user to share location information faster and more efficiently conserves power and increases the time between battery charges.

At block 902, the device displays, on the display, a message region (e.g., message region 802 in FIG. 8A) with messages sent (e.g., messages 806 and 808 in FIG. 8A) between a first participant and a second participant in a message conversation. At block 904, the device receives a first location-sharing notification that first participant location information is being shared with the second participant for a predetermined location-sharing time period that is scheduled to end at a first time (e.g., enabling location sharing until scheduled end 614 below map 612 in FIG. 6B). At block 906, the device sends a message to the first participant (e.g., message 618 in FIG. 6C). At block 908, the device receives a second location-sharing notification that first participant location information is being shared with the second participant for an extended location-sharing time period that is scheduled to end at a second time that is after the first time (e.g., text 620 illustrating second end time "1:16 PM" in FIG. 6C).

Advantageously, this allows users to continue sharing location during a single conversation but ends location sharing after the conversation has ended to preserve privacy without requiring a user to explicitly indicate that the conversation has ended. This also improves the user's experience when the user is not required to remember to stop sharing indefinitely-shared location information when first participant information is no longer necessary for the second participant. The user is also not required to repeatedly share one-off location information when first participant information is necessary for the second participant. This reduces battery usage as users are not required to repeatedly access and select location-sharing via the user interface.

In some embodiments, process 900 includes: detecting interaction by the second participant with the message conversation during the extended location-sharing time period and, in response to detecting interaction by the second participant with the message conversation during the extended location-sharing time period, sending a notification to the first participant; and, after sending the notification to the first participant, receiving a notification that extended location-sharing time period is further extended to end at a third time that is after the second time.

In some embodiments, process 900 includes detecting interaction by the second participant with the message conversation after the extended location-sharing time period and, in response to detecting interaction by the second participant with the message conversation after the extended location-sharing time period, forgoing sending a notification to the first participant.

In some embodiments, process 900 includes detecting interaction by the second participant with the message conversation comprises detecting at least one criteria selected from the group consisting of: the first participant viewing at least a portion of the message conversation, the second participant viewing at least a portion of the message conversation (e.g., viewing message region 802), the first participant adding a message to the message conversation, and the second participant adding a message to the message conversation.

In some embodiments, process 900 includes displaying an indication (e.g., map view 812 and text 814 in FIG. 8A) in the message conversation that the location of the first participant is being shared with the second participant. In some embodiments, the indication comprises a map-view (e.g., map view 812 in FIG. 8A). In some embodiments, the map-view is displayed behind an image of the first participant. In some embodiments, the map-view is displayed between two messages of the message conversation.

In some embodiments, process 900 includes receiving updated first participant location information and updating the map view with the updated first participant location information. In some embodiments, the indication comprises one or more of a location-sharing status, the first time, the second time, a current address of the first participant (e.g., address "Palo Alto" in information bar 814 in FIG. 8A), a travel time between the first participant and the second participant (e.g., travel time "35 MINS" in information bar 814 in FIG. 8A), and a distance between the first participant and the second participant.

In some embodiments, process 900 includes determining that the predetermined location-sharing time period has ended and, in accordance with a determination that the predetermined location-sharing time period has ended, displaying an indication in the message conversation that the location of the first participant is not being shared with the second participant.

In some embodiments, the extended predetermined location-sharing time period is shorter than the predetermined location-sharing time period.

In some embodiments, process 900 includes, further in response to receiving the first location-sharing notification, sharing second participant location information with the first participant.

In some embodiments, process 900 includes, further in response to receiving the first location-sharing notification, displaying a request (e.g., request 816 in FIG. 8B) to share second participant location information with the first participant.

In some embodiments, process 900 includes receiving the first location-sharing notification comprises receiving first participant location information from an external device. In some embodiments, receiving the first location-sharing notification comprises receiving the first participant location information from an electronic device of the first participant.

In some embodiments, first participant location information comprises a location of the electronic device of the first participant.

Note that details of the processes described above with respect to process 900 (e.g., FIG. 9) are also applicable in an analogous manner to the processes described herein. For example, processes 700, 1200, 1500, 1800, and 2000 optionally include one or more of the characteristics of the various processes described above with reference to process 900. For example, sending block 906 is optionally incorporated in any of processes 700, 1200, 1500, 1800, and/or 2000. Additionally, the conversations, location sharing affordances, shared location affordances, location-sharing time periods, participants, participant location information, location sharing extensions, interactions with a message conversation, communications outside a message conversation, and indications described above with reference to process 900 optionally share some or all of the characteristics with the conversations, location sharing affordances, shared location affordances, location-sharing time periods, participants, participant location information, location sharing extensions, interactions with a message conversation, communications outside a message conversation, and indications described with reference to processes 700, 1200, 1500, 1800, and/or 2000. For brevity, these details are not repeated in the descriptions of the other processes. The various methods and techniques described above with reference to method 900 are optionally implemented as one or more units, such as those described with regard to FIG. 10.

Figure 10:
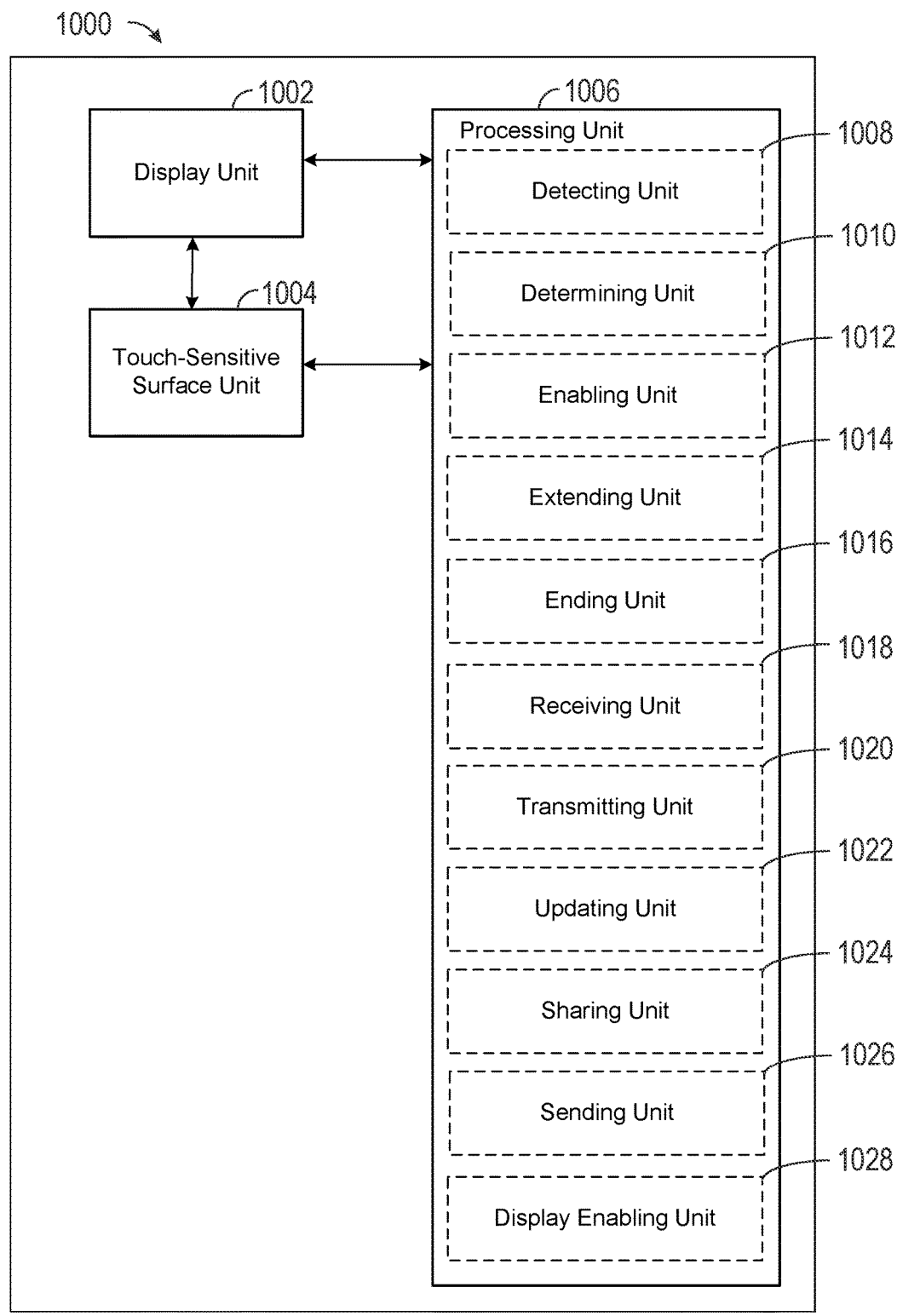
FIG. 10 illustrates an exemplary functional block diagram of an electronic device configured for sharing location information.

In accordance with some embodiments, FIG. 10 shows an exemplary functional block diagram of an electronic device 1000 configured in accordance with the principles of the various described embodiments. In accordance with some embodiments, the functional blocks of electronic device 1000 are configured to perform the techniques described above. The functional blocks of the device 1000 are, optionally, implemented by hardware, software, or a combination of hardware and software to carry out the principles of the various described examples. It is understood by persons of skill in the art that the functional blocks described in FIG. 10 are, optionally, combined or separated into sub-blocks to implement the principles of the various described examples. Therefore, the description herein optionally supports any possible combination or separation or further definition of the functional blocks described herein.

As shown in FIG. 10, an electronic device 1000 includes a display unit 1002 configured to display a graphic user interface, optionally, a touch-sensitive surface unit 1004 configured to receive contacts, and a processing unit 1006 coupled to the display unit 1002 and, optionally, the touch-sensitive surface unit 1004. In some embodiments, the processing unit 1006 includes a detecting unit 1008, a determining unit 1010, an enabling unit 1012, an extending unit 1014, an ending unit 1016, a receiving unit 1018, a transmitting unit 1020, an updating unit 1022, a sharing unit 1024, a sending unit 1026, and a display enabling unit 1028.

The processing unit 1006 is configured to: enable display (e.g., with display enabling unit 1028), on display unit 1002, of a message region; enable display (e.g., with display enabling unit 1028), in the message region, of messages sent between a first participant and a second participant in a message conversation; detect (e.g., with detecting unit 1008) a location-sharing request from the first participant to share first participant location information with the second participant; in response to detecting the location-sharing request from the first participant: enable (e.g., with enabling unit 1012) the second participant to obtain the first participant location information during a predetermined location-sharing time period, wherein the predetermined location-sharing time period is scheduled to end at a first time; detect (e.g., with detecting unit 1008) interaction by one of the first participant and the second participant with the message conversation during the predetermined location-sharing time period; and in response to detecting interaction by one of the first participant and the second participant with the message conversation during the predetermined location-sharing time period: extend (e.g., with extending unit 1014) the predetermined location-sharing time period to end at a second time that is after the first time.

In some embodiments, the processing unit is further configured to: detect (e.g., with detecting unit 1008) interaction by one of the first participant and the second participant with the message conversation during the extended location-sharing time period; and in response to detecting interaction by one of the first participant and the second participant with the message conversation during the extended location-sharing time period: further extend (e.g., with extending unit 1014) the predetermined location-sharing time period to end at a third time that is after the second time.

In some embodiments, the processing unit is further configured to: detect (e.g., with detecting unit 1008) interaction by one of the first participant and the second participant with the message conversation after the extended predetermined location-sharing time period; and in response to detecting interaction by one of the first participant and the second participant with the message conversation after the extended predetermined location-sharing time period: forgo further extending (e.g., with extending unit 1014) the predetermined location-sharing time period.

In some embodiments, an interaction by one of the first participant and the second participant with the message conversation comprises at least one criteria selected from the group consisting of: the first participant viewing at least a portion of the message conversation, the second participant viewing at least a portion of the message conversation, the first participant adding a message to the message conversation, and the second participant adding a message to the message conversation.

In some embodiments, the processing unit is further configured to: detect (e.g., with detecting unit 1008) a communication between the first and second participant outside of the message conversation during the predetermined location-sharing time period; and in response to detecting a communication between the first and second participant outside of the message conversation during the predetermined location-sharing time period: extend (e.g., with extending unit 1014) the predetermined location-sharing time period.

In some embodiments, the processing unit is further configured to: enable display (e.g., with display enabling unit 1028), on the display unit 1002, of an indication in the message conversation that the location of the first participant is being shared with the second participant. In some embodiments, the indication comprises a map-view. In some embodiments, the map-view is displayed behind an image of the first participant. In some embodiments, the map-view is displayed between two messages of the message conversation.

In some embodiments, the processing unit is further configured to update (e.g., with updating unit 1022) the map view when the first participant location information changes.

In some embodiments, the indication comprises one or more of a location-sharing status, the first time, the second time, a current address of the first participant, a travel time between the first participant and the second participant, and a distance between the first participant and the second participant. In some embodiments, the indication is a shared-location affordance, and the processing unit is further configured to: detect (e.g., with detecting unit 1008) a selection of the shared-location affordance by the first participant; and in response to detecting the selection of the shared-location affordance by the first participant: end (e.g., with ending unit 1016) the predetermined location-sharing time period.

In some embodiments, the processing unit is further configured to: determine (e.g., with determining unit 1010) that the predetermined location-sharing time period has ended; and in accordance with a determination that the predetermined location-sharing time period has ended: enable display (e.g., with display enabling unit 1028), on the display unit 1002, of an indication in the message conversation that the location of the first participant is not being shared with the second participant.

In some embodiments, extending the predetermined location-sharing time period to end at a second time that is after the first time comprises extending the predetermined location-sharing time period for an amount of time that is shorter than the predetermined location-sharing time period.

In some embodiments, the processing unit is further configured to: further in response to detecting the location-sharing request from the first participant: receive (e.g., with receiving unit 1018) second participant location information; and enable display (e.g., with enabling unit 1028), on the display unit 1002, of the second participant location information.

In some embodiments, the processing unit is further configured to: further in response to detecting the location-sharing request from the first participant: transmit (e.g., with transmitting unit 1020) a request for second participant location information.

In some embodiments, enablement of the second participant to obtain the first participant location information during a predetermined location-sharing time period comprises transmission of a location-sharing instruction to an external device, and the location-sharing instruction permits the external device to share first participant location information with the second participant.

In some embodiments, enabling the second participant to obtain the first participant location information during a predetermined location-sharing time period comprises enabling the transmission of the first participant location information to an external device.

In some embodiments, the first participant location information comprises a location of the electronic device.

In some embodiments, the processing unit is further configured to: determine (e.g., with determining unit 1010) whether the electronic device is representative of the first participant's location; in accordance with a determination that the electronic device is representative of the first participant's location: transmit (e.g., with transmitting unit 1020) a location of the electronic device; and in accordance with a determination that the electronic device is not representative of the first participant's location: forgo transmitting (e.g., with transmitting unit 1020) a location of the electronic device.

In some embodiments, the processing unit is further configured to: after the second time: cease to enable (e.g., with enabling unit 1012) the second participant to obtain the first participant location information; and detect (e.g., with detecting unit 1008) interaction by one of the first participant and the second participant with the message conversation; and in response to detecting interaction by one of the first participant and the second participant with the message conversation after the second time: in accordance with a determination that less than a buffer time period has elapsed since the second time, re-enable (e.g., with enabling unit 1012) the second participant to obtain the first participant location information; and in accordance with a determination that more than the buffer time period has elapsed since the second time, enable (e.g., with enabling unit 1012) display, on the display unit 1002, of the message conversation without re-enabling the second participant to obtain the first participant location information.

In some embodiments, the processing unit is further configured to: enable display (e.g., with display enabling unit 1028), in the message region, of messages sent between the first participant, the second participant, and a third participant in the message conversation; detect (e.g., with detecting unit 1008) a location-sharing request from the first participant to share first participant location information with the third participant; and in response to detecting the location-sharing request from the first participant to share first participant location information with the third participant: enable (e.g., with enabling unit 1012) the second and third participants to obtain the first participant location information during a second predetermined location-sharing time period.

The processing unit 1006 is configured to: enable display (e.g., with display enabling unit 1028), on the display unit 1002, of a message region; enable display (e.g., with display enabling unit 1028), in the message region, messages sent between a first participant and a second participant in a message conversation; receive (e.g., with receiving unit 1018) a first location-sharing notification that first participant location information is being shared with the second participant for a predetermined location-sharing time period, wherein the predetermined location-sharing time period is scheduled to end at a first time; send (e.g., with sending unit 1026) a message to the first participant; and receive (e.g., with receiving unit 1018) a second location-sharing notification that first participant location information is being shared with the second participant for an extended location-sharing time period, wherein the extended location-sharing time period is scheduled to end at a second time that is after the first time.

In some embodiments, the processing unit is further configured to: detect (e.g., with detecting unit 1008) interaction by the second participant with the message conversation during the extended location-sharing time period; and in response to detecting interaction by the second participant with the message conversation during the extended location-sharing time period: send (e.g., with sending unit 1026) a notification to the first participant; and after sending the notification to the first participant, receive (e.g., with receiving unit 1018) a notification that extended location-sharing time period is further extended to end at a third time that is after the second time.

In some embodiments, the processing unit is further configured to: detect (e.g., with detecting unit 1008) interaction by the second participant with the message conversation after the extended location-sharing time period; and in response to detecting interaction by the second participant with the message conversation after the extended location-sharing time period: forgo sending (e.g., with sending unit 1026) a notification to the first participant.

In some embodiments, detecting interaction by the second participant with the message conversation comprises detecting at least one criteria selected from the group consisting of: the first participant viewing at least a portion of the message conversation, the second participant viewing at least a portion of the message conversation, the first participant adding a message to the message conversation, and the second participant adding a message to the message conversation.

In some embodiments, the processing unit is further configured to: enable display (e.g., with display enabling unit 1028), on the display unit 1002, of an indication in the message conversation that the location of the first participant is being shared with the second participant.

In some embodiments, the indication comprises a map-view. In some embodiments, the map-view is displayed behind an image of the first participant. In some embodiments, the map-view is displayed between two messages of the message conversation.

In some embodiments, the processing unit is further configured to: receive (e.g., with receiving unit 1018) updated first participant location information; and update (e.g., with updating unit 1022) the map view with the updated first participant location information.

In some embodiments, the indication comprises one or more of a location-sharing status, the first time, the second time, a current address of the first participant, a travel time between the first participant and the second participant, and a distance between the first participant and the second participant.

In some embodiments, the processing unit is further configured to: determine (e.g., with detecting unit 1010) that the predetermined location-sharing time period has ended; and in accordance with a determination that the predetermined location-sharing time period has ended: enable display (e.g., with display enabling unit 1028), on the display unit 1002, of an indication in the message conversation that the location of the first participant is not being shared with the second participant.

In some embodiments, the extended predetermined location-sharing time period is shorter than the predetermined location-sharing time period.

In some embodiments, the processing unit is further configured to: further in response to receiving the first location-sharing notification: share (e.g., with sharing unit 1024) second participant location information with the first participant.

In some embodiments, the processing unit is further configured to: further in response to receiving the first location-sharing notification: enable display (e.g., with display enabling unit 1028), on the display unit 1002, of a request to share second participant location information with the first participant.

In some embodiments, receiving the first location-sharing notification comprises receiving first participant location information from an external device.

In some embodiments, receiving the first location-sharing notification comprises receiving the first participant location information from an electronic device of the first participant.

In some embodiments, first participant location information comprises a location of the electronic device of the first participant.

The operations described above with reference to FIGS. 7A-7J and 9 are, optionally, implemented by components depicted in FIG. 1A-1B, 3, 5B, or 10. For example, display operation 702, detecting operation 704, enabling operation 706, detecting operation 708, extending operation 710, display operation 902, receiving operation 904, sending operation 906, and receiving operation 908 is implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIG. 1A-1B, 3, 5B, or 10.

Figure 11B:
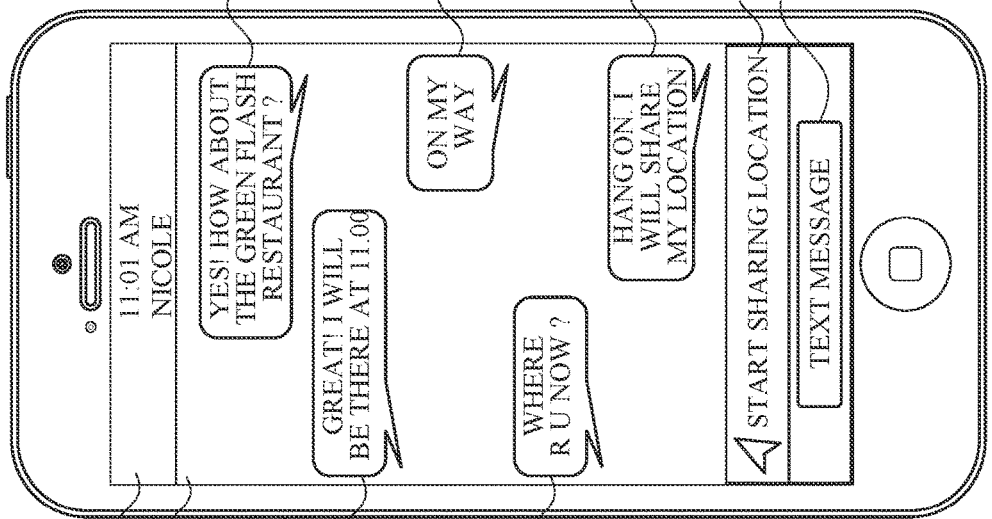
FIG. 11B illustrates exemplary messaging user interfaces.
Figure 11A:
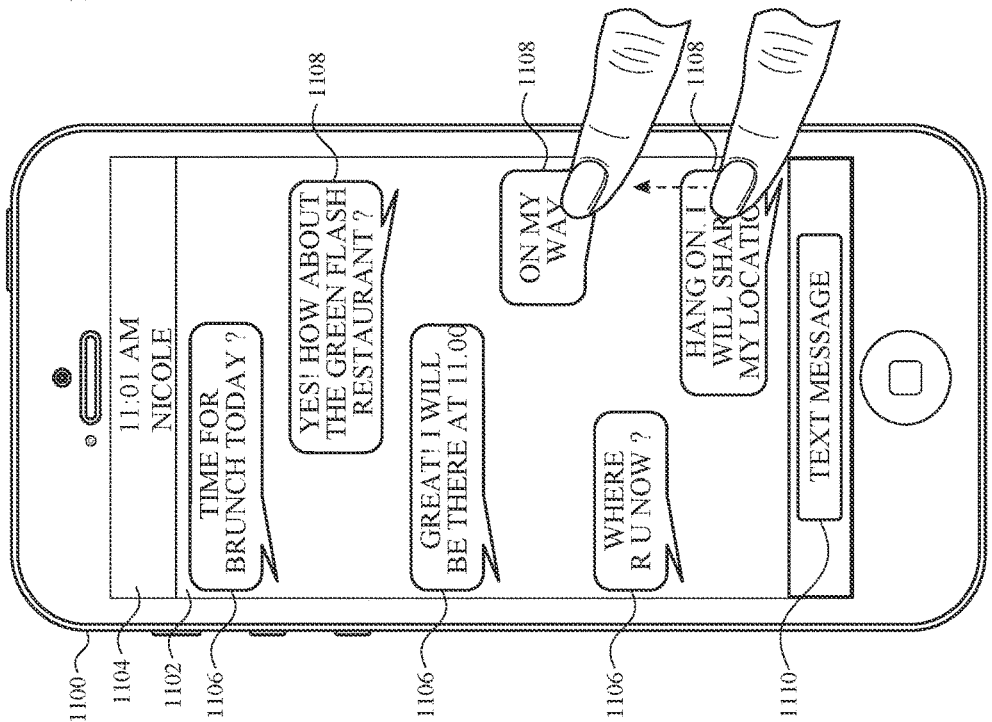
FIG. 11A illustrates exemplary messaging user interfaces.

FIG. 11A illustrates an exemplary message user interface that is optionally displayed by device 1100. In some embodiments, the user interface is displayed on device 300 or device 500. The message user interface includes a message region 1102 for displaying messages 1106 and 1108 sent between a first participant (the user of device 1100) and a second participant in a message conversation and for displaying a banner 1104 including the name of the second participant and a current time of day. Messages sent between the participants are displayed inside bounded message areas. A bottom portion of the message transcript is displayed at a first position in the message region 1102. The message user interface also includes text message entry affordance 1110.

FIG. 11A illustrates a user dragging up on the message transcript. As a result, device 1100 detects contact on a location corresponding to the message transcript and detects movement of contact across the touch-sensitive surface of device 1100 and toward a top portion of the message region 1102. In response to detecting movement of the contact across the touch-sensitive surface and toward a top portion of the message region, device 1100 displays a location-sharing affordance 1112 at the first position in the message transcript (see FIG. 11B). The bottom portion of the message transcript is now displayed at a second position above the first position.

Advantageously, this improves the user's experience because the user can quickly access location-sharing. This reduces battery usage as users are not required to make multiple selections on the user interface in order to activate location sharing.

Figure 11D:
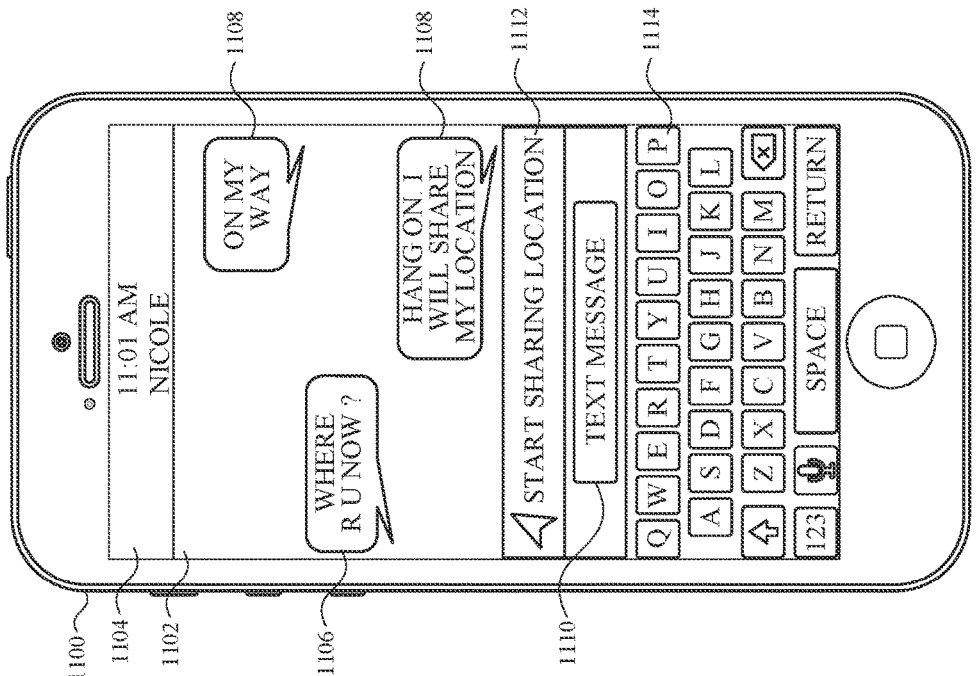
FIG. 11D illustrates exemplary messaging user interfaces.

FIG. 11B illustrates location-sharing affordance 1112 in a message user interface without a keyboard. Location-sharing affordance 1112 could also be displayed on a message user interface with a keyboard, as shown in FIG. 11D. The display of FIG. 11D could be arrived at by performing a drag gesture (such as the drag gesture described above with respect to FIG. 11A) on the message user interface of FIG. 6A.

Figure 11C:
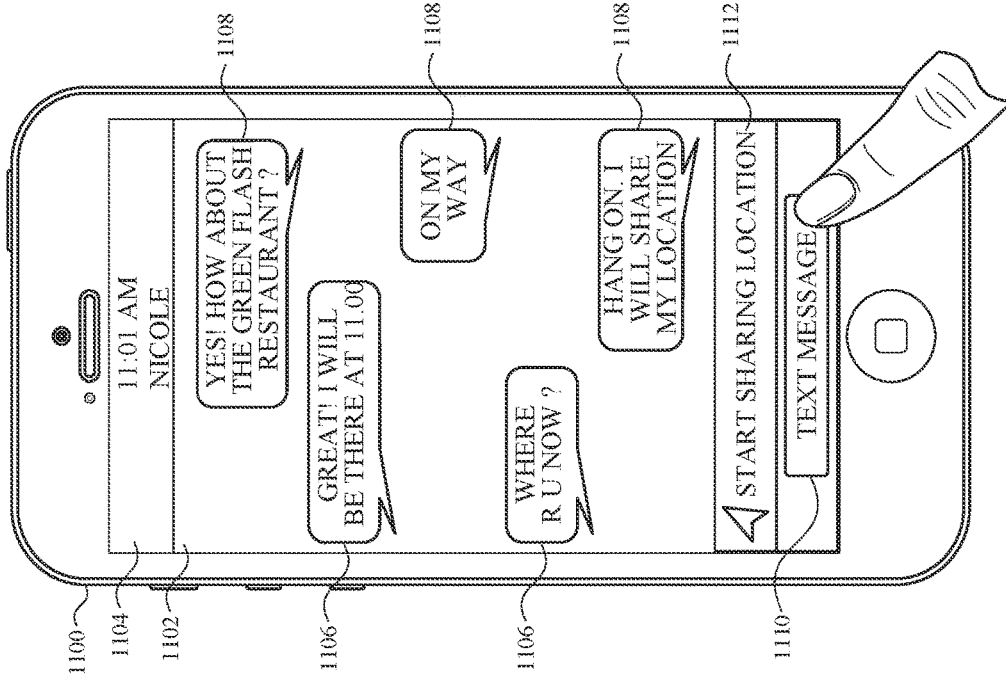
FIG. 11C illustrates exemplary messaging user interfaces.

FIG. 11C illustrates a user selecting text message entry affordance 1110. In response, device 1100 displays a keyboard 1114 below the message region and displays location-sharing affordance 1112 at a third position above the first position (FIG. 11D). In some embodiments, location-sharing affordance is no longer displayed when a user selects a text message entry affordance.

FIG. 11E illustrates message region 1102 after a new message is received at device 1100. In response to receiving the new message, device 1100 displays the message at the bottom of the message transcript and ceases to display location-sharing affordance 1112. In some embodiments, the new message is displayed above the location-sharing affordance in conjunction with displaying an animation of the location-sharing affordance sliding underneath the keyboard. In some embodiments, when a keyboard is not displayed and a new message arrives, the location-sharing affordance 1112 is no longer displayed. In some such embodiments, device 1100 displays an animation of the location-sharing affordance sliding underneath the text message entry affordance 1110.

Figure 11G:
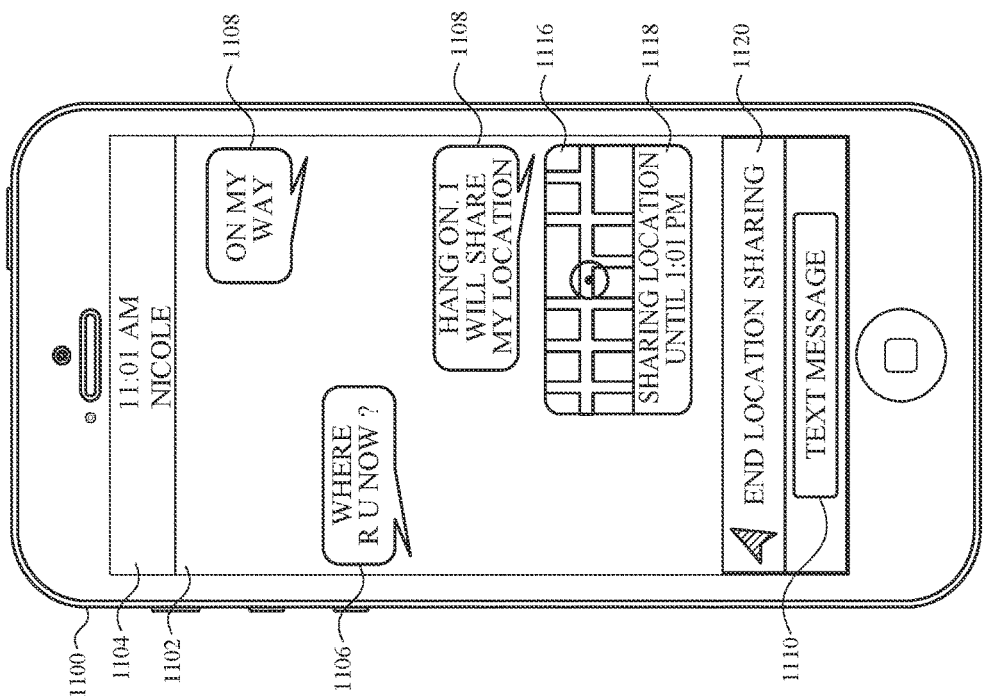
FIG. 11G illustrates exemplary messaging user interfaces.

FIG. 11F illustrates a user selecting location-sharing affordance 1112. In response to detecting a selection of the location-sharing affordance, device 1100 enables the second participant to obtain first participant location information during a predetermined location-sharing time period, wherein the predetermined location-sharing time period is scheduled to end at a first time. In the embodiment of FIG. 11G, first participant location information is shared via a map 1116 inserted in the message transcript of messages 1106 and 1108 sent between the first participant and second participant in the message conversation. An end time 1118 of the predetermined location-sharing time period is also displayed.

In like manner to other embodiments disclosed herein, in response to detecting interaction by one of the first participant and the second participant with the message conversation during the predetermined location-sharing time period, device 1100 will extend the predetermined location-sharing time period (see description of FIGS. 6A-6H, for example).

As illustrated in FIG. 11G, location-sharing affordance 1112 is replaced by shared-location affordance 1120. Shared-location affordance 1120 allows the first participant to end location sharing before the location-sharing time period has expired.

In some embodiments, shared-location affordance 1120 is continuously displayed while location information is shared. For example, while displaying shared-location affordance 1120, device 1100 detects an event that will cause a change in appearance of the transcript (e.g., with the receipt of a new message or a scrolling operation that will scroll the message conversation downward). In response to detecting the event, device 1100 determines whether location-sharing is enabled. If location-sharing is enabled, device 1100 changes the appearance of the transcript in accordance with the event and maintains the display of shared-location affordance 1120. If location-sharing is not enabled, device 1100 changes the appearance of the transcript in accordance with the event and ceases the display of shared-location affordance 1120.

In some embodiments, location-sharing affordance 1112 is no longer displayed after a user interacts with it (e.g., FIG. 11F). Interaction with a location-sharing affordance includes, but is not limited to, activation or deactivation of location sharing based on a selection/deselection of the location-sharing affordance.

In some embodiments, device 1100 determines whether the movement of the contact (FIG. 11A) across the touch-sensitive surface meets predefined criteria. The criteria is, for example, whether a speed, duration or length of the gesture comprises a speed, duration, or length below a predetermined threshold. If device 1100 determines that the movement meets the predefined criteria, device 1100 displays the location-sharing affordance for a predetermined time and discontinues the location-sharing affordance after the predetermined time period lapses. The predetermined time period is optionally short, on the order of one second, to allow the user to "peek" at the location-sharing affordance. If device 1100 determines that the movement does not meet the predefined criteria, device 1100 displays the location-sharing affordance. In some embodiments, the movement comprises a release of the contact and the predetermined criteria comprises a predetermined velocity of the movement at release.

FIG. 12A is a flow diagram illustrating process 1200 for sharing a message participant's location information using an electronic device in accordance with some embodiments. Process 1200 is performed at an electronic device (e.g., device 100, 300, 500) with a display and a touch-sensitive surface. Some operations in process 1200 are optionally combined, the order of some operations is optionally changed, and some operations are optionally omitted.

As described below, process 1200 provides an intuitive way for sharing location information. The method reduces the cognitive burden on a user for sharing location information, thereby creating a more efficient human-machine interface. For battery-operated computing devices, enabling a user to share location information faster and more efficiently conserves power and increases the time between battery charges.

At block 1202, the device displays, on the display, a message region (e.g., message region 1102 in FIG. 11A) and, at a first position in the message region, a bottom portion of a message transcript of messages sent (e.g., messages 1106 and 1108 in FIG. 11A) between a first participant and a second participant of the message conversation. At block 1204, the device detects contact on a location corresponding to the message transcript (e.g., contact by the finger illustrated in FIG. 11A). At block 1206, the device detects movement of the contact across the touch-sensitive surface and toward a top portion of the message region (e.g., movement of the finger in the direction of the arrow in FIG. 11A). In response to detecting movement of the contact across the touch-sensitive surface and toward a top portion of the message region, at block 1208 the device displays the bottom portion of the message transcript at a second position in the message region above the first position (e.g., message 1108 is displayed at a higher position in the message transcript 1102 in FIG. 11B then the position of message 1108 in FIG. 11A). Also in response to detecting movement of the contact across the touch-sensitive surface and toward a top portion of the message region, at block 1210 the device displays a location-sharing affordance (e.g., location-sharing affordance 1112 in FIG. 11B) at the first position.

Advantageously, this improves the user's experience because the user can quickly access location-sharing. This reduces battery usage as users are not required to make multiple selections on the user interface in order to activate location sharing.

Figure 12B:
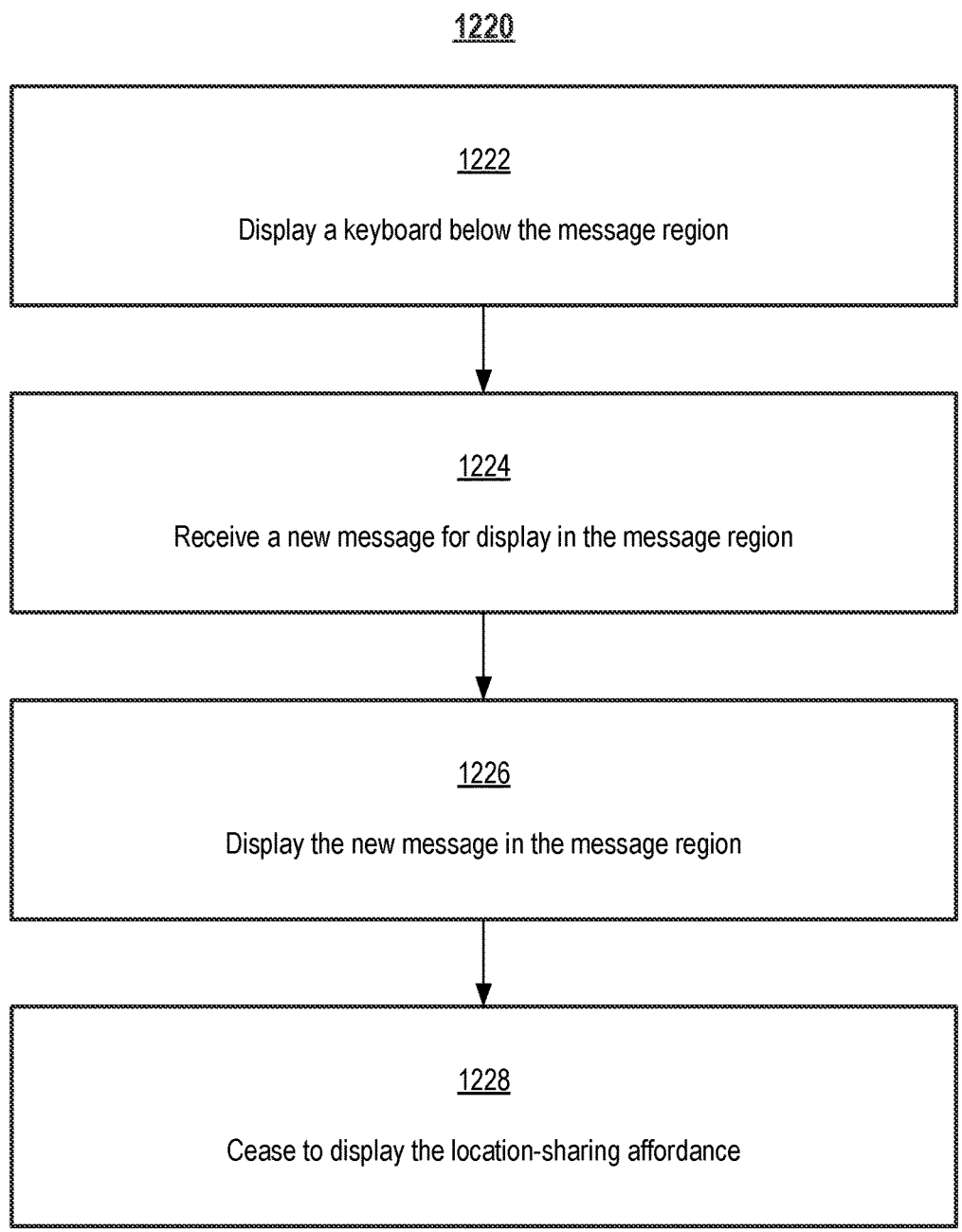
FIG. 12B is a flow diagram illustrating a process for sharing location information.

FIG. 12B is a flow diagram illustrating sub-process 1220 which is optionally performed during process 1200 (FIG. 12A). At block 1222, the device displays a keyboard (e.g., keyboard 1114 in FIG. 11D) below the message region. While displaying the location-sharing affordance at the first position, the device at block 1224 receives a new message for display in the message region (e.g., receipt of a message 1106 in FIG. 11E). In response to receiving the new message, the device at block 1226 displays the new message in the message region (e.g., display of message 1106 in FIG. 11E). Also in response to receiving the new message, the device at block 1228 ceases to display the location-sharing affordance (e.g., the device displays location-sharing affordance 1112 in FIG. 11D and does not display a location-sharing affordance in FIG. 11E). In some embodiments, the new message is displayed above the location-sharing affordance in conjunction with displaying an animation of the location-sharing affordance sliding underneath the keyboard.

FIG. 12C is a flow diagram illustrating sub-process 1230 which is optionally performed during process 1200 (FIG. 12A). At block 1232, the device detects a selection of the location-sharing affordance (e.g., selection of location sharing affordance 1112 in FIG. 11F). In response to detecting a selection of the location-sharing affordance, the device at block 1234 enables the second participant to obtain the first participant location information during a predetermined location-sharing time period (e.g., by displaying map view 1116 in FIG. 11G), wherein the predetermined location-sharing time period is scheduled to end at a first time (e.g., first time "1:01 PM" displayed in FIG. 11G).

FIG. 12D is a flow diagram illustrating sub-process 1240 which is optionally performed during process 1200 (FIG. 12A). At block 1242, the device detects interaction by one of the first participant and the second participant with the message conversation during the predetermined location-sharing time period (e.g., addition of a new message to message transcript 1102 in FIG. 11G). In response to detecting interaction by one of the first participant and the second participant with the message conversation during the predetermined location-sharing time period, the device at block 1244 extends the predetermined location-sharing time period to end at a second time that is after the first time (e.g., extending the location sharing time period to end at a time later than first time "1:01 PM" displayed in FIG. 11G).

Figure 12E:
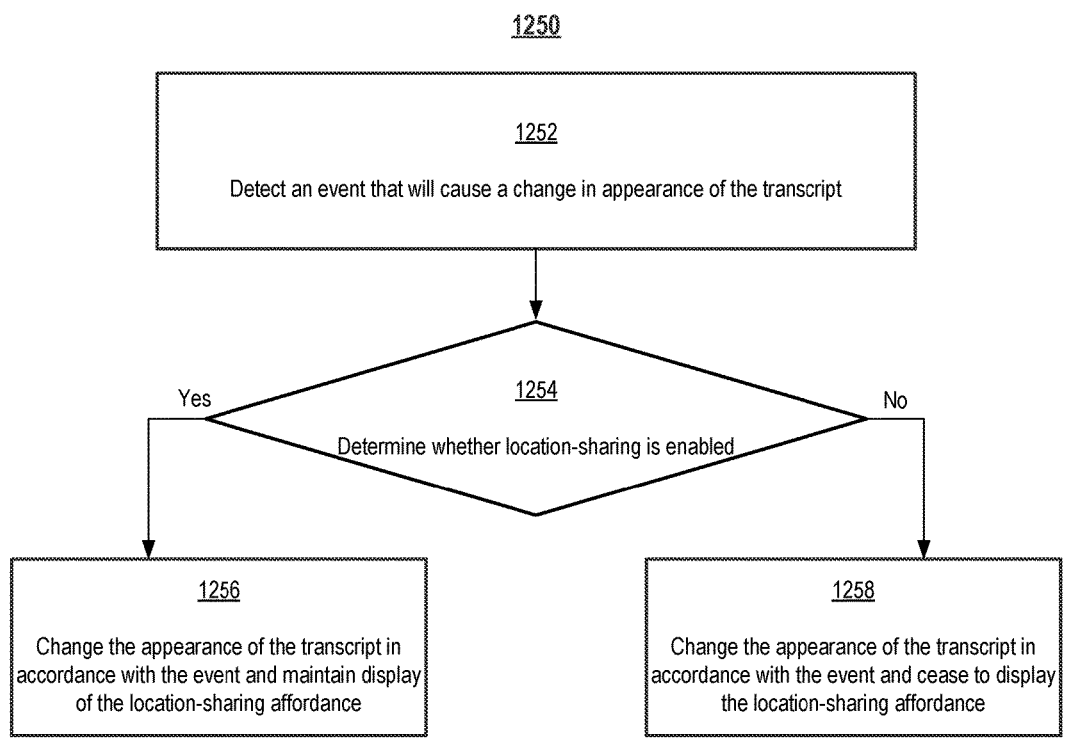
FIG. 12E is a flow diagram illustrating a process for sharing location information.

FIG. 12E is a flow diagram illustrating sub-process 1250 which is optionally performed during process 1200 (FIG. 12A). At block 1252, the device, while displaying the location-sharing affordance, detects an event that will cause a change in appearance of the transcript (e.g., with the receipt of a new message or a scrolling operation that will scroll the message conversation downward). In response to detecting an event that will cause a change in appearance of the transcript, the device at block 1254 determines whether the location-sharing is enabled (e.g., a location-sharing time period has not expired). In accordance with a determination that the location-sharing is enabled, the device at block 1256 changes the appearance of the transcript in accordance with the event and maintains display of a shared location affordance (e.g., shared-location affordance 1120 in FIG. 11G). In accordance with a determination that the location-sharing is disabled, the device at block 1258 changes the appearance of the transcript in accordance with the event and ceases to display the location-sharing affordance.

Figure 12F:
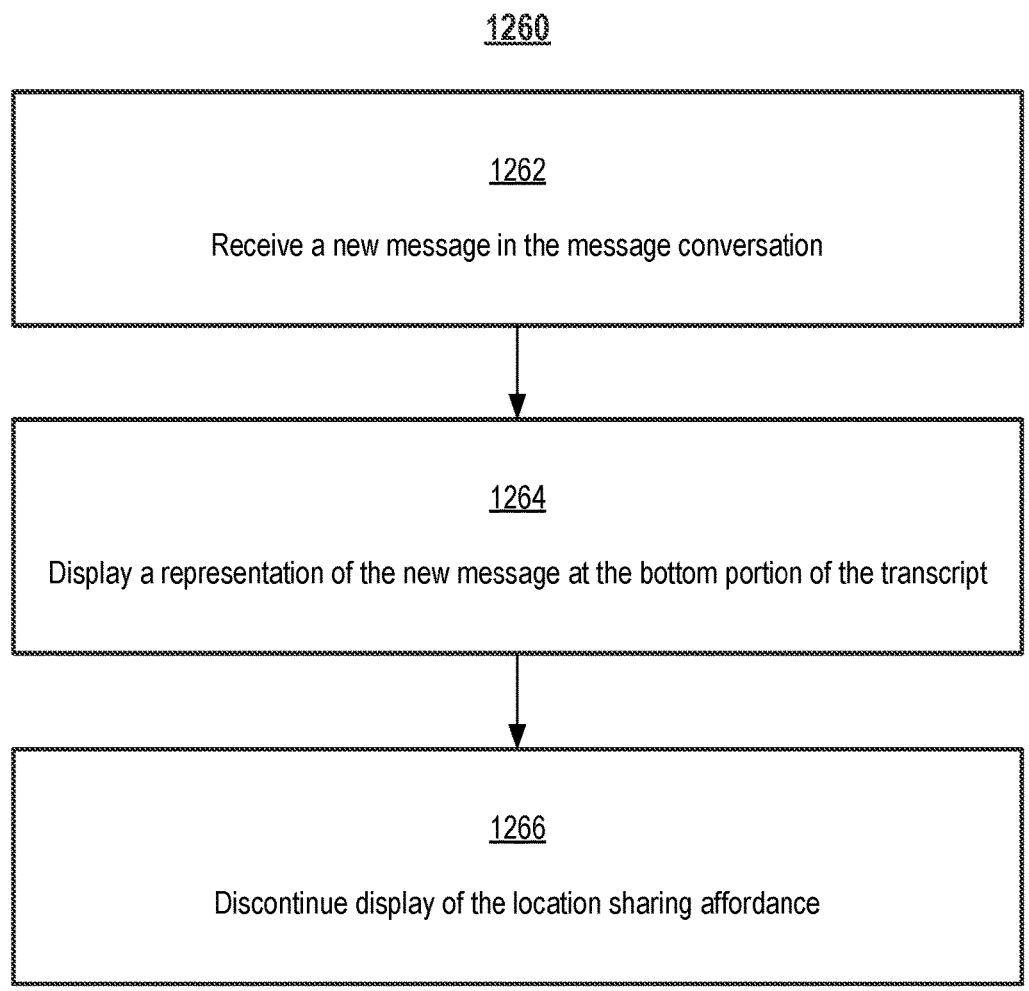
FIG. 12F is a flow diagram illustrating a process for sharing location information.

FIG. 12F is a flow diagram illustrating sub-process 1260 which is optionally performed during process 1200 (FIG. 12A). At block 1262, the device receives a new message in the message conversation. In response to receiving the new message, the device at block 1264 displays a representation of the new message at the bottom portion of the transcript (e.g., display of message 1106 in FIG. 11E). Also in response to receiving the new message, the device at block 1266 discontinues display of the location-sharing affordance (e.g., the device displays location sharing affordance 1112 in FIG. 11D and does not display a location sharing affordance in FIG. 11E).

FIG. 12G is a flow diagram illustrating sub-process 1270 which is optionally performed during process 1200 (FIG. 12A). At block 1272, the device detects interaction with the location-sharing affordance (e.g., selection of location-sharing affordance 1112 in FIG. 11F). Interaction with a location-sharing affordance includes, but is not limited to, activation or deactivation of location sharing based on a selection/deselection of the location-sharing affordance. In response to detecting interaction with the location-sharing affordance, the device at block 1274 discontinues display of the location-sharing affordance (e.g., by replacing with shared-location affordance 1120).

FIG. 12H is a flow diagram illustrating sub-process 1280 which is optionally performed during process 1200 (FIG. 12A). At block 1282, the device determines whether the movement of the contact across the touch-sensitive surface meets predefined criteria. The criteria is, for example, whether a speed, duration or length of the gesture comprises a speed, duration, or length below a predetermined threshold. In some embodiments, the movement comprises a release of the contact and wherein the predetermined criteria comprises a predetermined velocity of the movement at release. In accordance with a determination that the movement meets the predetermined criteria, the device at block 1284 displays the location-sharing affordance for a predetermined time and discontinues display of the location-sharing affordance after the predetermined time lapses (e.g., the device displays location-sharing affordance 1112 in FIG. 11B for the predetermined time). In accordance with a determination that the movement does not meet the predetermined criteria, the device at block 1286 displays the location-sharing affordance (e.g., the device displays location-sharing affordance 1112 in FIG. 11B until the user interacts with it).

Note that details of the processes described above with respect to process 1200 (e.g., FIGS. 12A-12H) are also applicable in an analogous manner to the processes described herein. For example, processes 700, 900, 1500, 1800, and 2000 optionally include one or more of the characteristics of the various processes described above with reference to process 1200. For example, display block 1210 is optionally incorporated in any of processes 700, 900, 1500, 1800, and/or 2000. Additionally, the conversations, location sharing affordances, shared location affordances, location-sharing time periods, participants, participant location information, location sharing extensions, contact and movement detection, display of bottom portions of the message transcript, and display of keyboards described above with reference to process 1200, or sub-processes 1220, 1230, 1240, 1250, 1260, 1270, and 1280, optionally share some or all of the characteristics with the conversations, location sharing affordances, shared location affordances, location-sharing time periods, participants, participant location information, location sharing extensions, contact and movement detection, display of bottom portions of the message transcript, and display of keyboards described with reference to processes 700, 900, 1500, 1800, and/or 2000, or sub-processes 720, 726, 732, 738, 744, 750, 760, 770, 790, 1520, 1530, 1540, 1810, 1820, 1830, 1840, 2010, and/or 2020. For brevity, these details are not repeated in the descriptions of the other processes. The various methods and techniques described above with reference to method 1200, or sub-processes 1220, 1230, 1240, 1250, 1260, 1270, and 1280, are optionally implemented as one or more units, such as those described with regard to FIG. 13.

Figure 13:
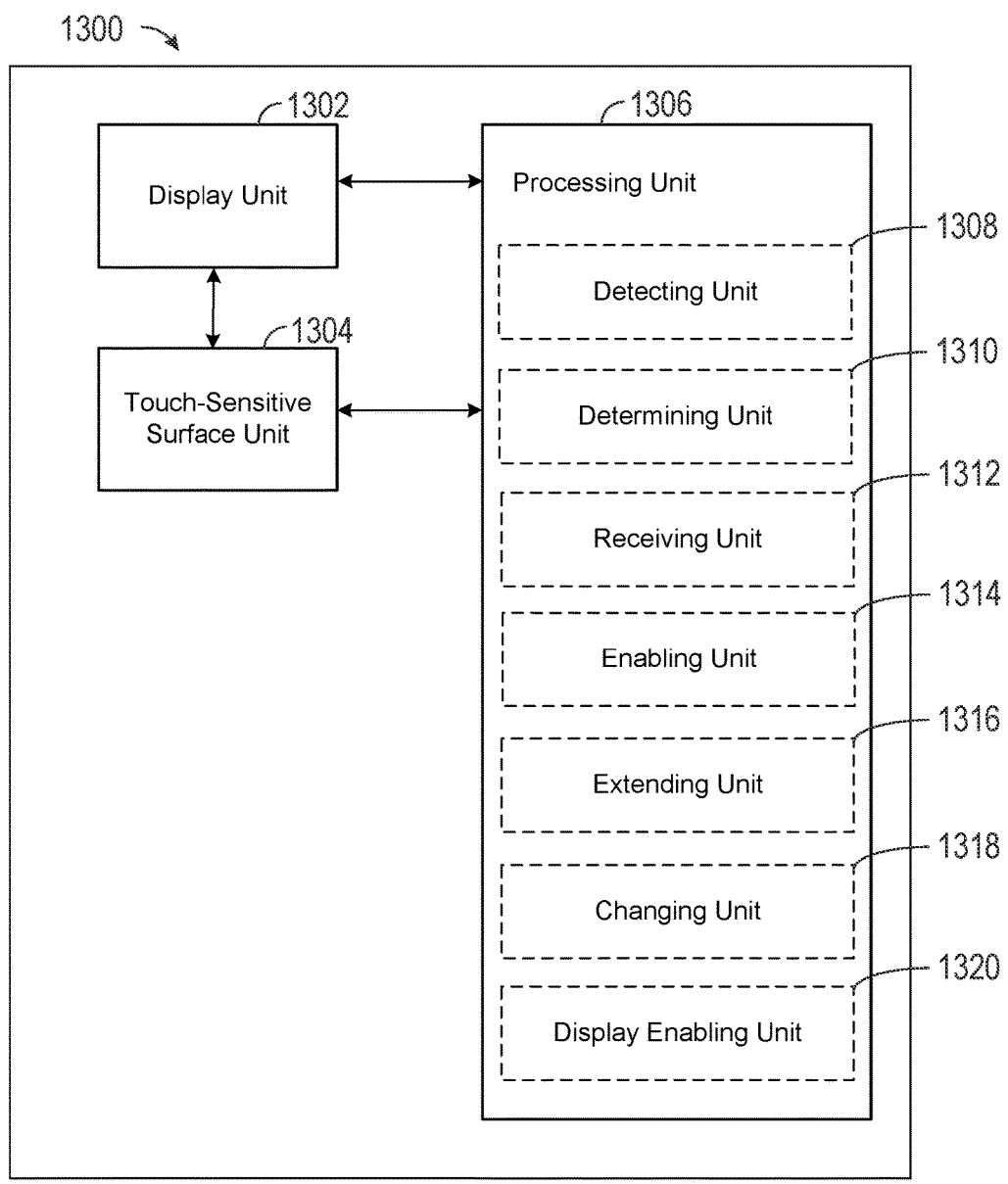
FIG. 13 illustrates an exemplary functional block diagram of an electronic device configured for sharing location information.

In accordance with some embodiments, FIG. 13 shows an exemplary functional block diagram of an electronic device 1300 configured in accordance with the principles of the various described embodiments. In accordance with some embodiments, the functional blocks of electronic device 1300 are configured to perform the techniques described above. The functional blocks of the device 1300 are, optionally, implemented by hardware, software, or a combination of hardware and software to carry out the principles of the various described examples. It is understood by persons of skill in the art that the functional blocks described in FIG. 13 are, optionally, combined or separated into sub-blocks to implement the principles of the various described examples. Therefore, the description herein optionally supports any possible combination or separation or further definition of the functional blocks described herein.

As shown in FIG. 13, an electronic device 1300 includes a display unit 1302 configured to display a graphic user interface, optionally, a touch-sensitive surface unit 1304 configured to receive contacts, and a processing unit 1306 coupled to the display unit 1302 and, optionally, the touch-sensitive surface unit 1304. In some embodiments, the processing unit 1306 includes a detecting unit 1308, a determining unit 1310, a receiving unit 1312, an enabling unit 1314, an extending unit 1316, a changing unit 1318, and a display enabling unit 1320.

The processing unit 1306 is configured to: enable display (e.g., with display enabling unit 1320), on the display unit 1302, of a message region; enable display (e.g., with display enabling unit 1320), at a first position in the message region, of a bottom portion of a message transcript of messages sent between a first participant and a second participant; detect (e.g., with detecting unit 1308) contact on a location corresponding to the message transcript; detect (e.g., with detecting unit 1308) movement of the contact across the touch-sensitive surface and toward a top portion of the message region; and in response to detecting movement of the contact across the touch-sensitive surface and toward a top portion of the message region: enable display (e.g., with display enabling unit 1320), on the display unit 1302, of the bottom portion of the message transcript at a second position in the message region above the first position; and enable display (e.g., with display enabling unit 1320), on the display unit 1302, of a location-sharing affordance at the first position.

In some embodiments, the processing unit is further configured to: enable display (e.g., with display enabling unit 1320), on the display unit 1302, of a keyboard below the message region; and while displaying the location-sharing affordance at the first position, receive a new message for display in the message region; and in response to receiving the new message: enable display (e.g., with display enabling unit 1320), on the display unit 1302, of the new message in the message region; and cease display the location-sharing affordance.

In some embodiments, the processing unit is further configured to: detect (e.g., with detecting unit 1308) a selection of the location-sharing affordance; in response to detecting a selection of the location-sharing affordance: enable (e.g., with enabling unit 1314) the second participant to obtain the first participant location information during a predetermined location-sharing time period, wherein the predetermined location-sharing time period is scheduled to end at a first time.

In some embodiments, the processing unit is further configured to: detect (e.g., with detecting unit 1308) interaction by one of the first participant and the second participant with the message conversation during the predetermined location-sharing time period; and in response to detecting interaction by one of the first participant and the second participant with the message conversation during the predetermined location-sharing time period: extend (e.g., with extending unit 1316) the predetermined location-sharing time period to end at a second time that is after the first time.

In some embodiments, the processing unit is further configured to: while displaying the location-sharing affordance, detect (e.g., with detecting unit 1308) an event that will cause a change in appearance of the transcript; in response to detecting the event: in accordance with a determination that the location-sharing is enabled: change (e.g., with changing unit 1318) the appearance of the transcript in accordance with the event; and maintain display (e.g., with display unit 1302) of the location-sharing affordance; and in accordance with a determination that the location-sharing is disabled: change (e.g., with changing unit 1318) the appearance of the transcript in accordance with the event; and cease to display the location-sharing affordance.

In some embodiments, the processing unit is further configured to: receive (e.g., with receiving unit 1312) a new message in the message conversation; and in response to receiving the new message: enable (e.g., enabling unit 1314) display, on the display unit 1302, of a representation of the new message at the bottom portion of the transcript; and discontinue display of the location-sharing affordance.

In some embodiments, the processing unit is further configured to: detect (e.g., with detecting unit 1308) interaction with the location-sharing affordance; and in response to detecting interaction with the location-sharing affordance: discontinue display (e.g., with display unit 1302) of the location-sharing affordance.

In some embodiments, the processing unit is further configured to: determine (e.g., with detecting unit 1008) whether the movement of the contact across the touch-sensitive surface meets predefined criteria; in accordance with a determination that the movement meets the predetermined criteria: enable (e.g., enabling unit 1314) display, on the display unit 1302, of the location-sharing affordance for a predetermined time; and discontinue display (e.g., with display unit 1302) of the location-sharing affordance after the predetermined time lapses; and in accordance with a determination that the movement does not meet the predetermined criteria: enable display (e.g., with display enabling unit 1320), on the display unit 1302, of the location-sharing affordance.

In some embodiments, the movement comprises a release of the contact and wherein the predetermined criteria comprises a predetermined velocity of the movement at release.

The operations described above with reference to FIGS. 12A-12H are, optionally, implemented by components depicted in FIG. 1A-1B, 3, 5B, or 13. For example, display operation 1202, detecting operation 1204, detecting operation 1206, display operation 1208, and display operation 1210 is implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIG. 1A-1B, 3, 5B, or 13.

FIG. 14A illustrates an exemplary message user interface that is optionally displayed by device 1400. In some embodiments, the user interface is displayed on device 300 or device 500. The message user interface includes a message region 1402 for displaying messages 1406 and 1408 sent between a first participant (the user of device 1400) and a second participant in a message conversation and for displaying a banner 1404 including the name of the second participant and a current time of day. Messages sent between the participants are displayed inside bounded message areas. A bottom portion of the message transcript is displayed at a first position in the message region 1402. The message region also includes a shared location affordance, map view 1410, indicating that location information is currently shared, at the top of the message transcript.

FIG. 14B illustrates the message region after device 1400 has detected a request to scroll the message transcript. In some embodiments, a request to scroll results from a user scrolling the transcript or a new message arriving to push messages and map view 1410 up in the transcript. In response to the request to scroll, device 1400 determines whether the request to scroll the message transcript is a request to scroll the shared-location affordance 1410 beyond the message region 1402. If the request is a request to scroll the shared-location affordance 1410 beyond the message region 1402, then device 1400 discontinues displaying the shared-location affordance 1410 in the message region 1402 and displays a location-sharing status bar 1412 outside the message region. In the embodiment of FIG. 14B, the status bar is a banner above and adjacent to the message region and below banner 1404.

Advantageously, this allows an indication of location sharing to remain on the user interface, while continuing a message conversation. Optionally, the user is reminded of location sharing, even as new messages in the message conversation cause the transcript to scroll out of view. Further, the user can receive updates on the location of the other participant or the travel time to the other participant, for example, even as new messages are continuously added to the transcript.

In some embodiments, discontinuing displaying the shared-location affordance 1410 and displaying the location-sharing status bar 1412 includes displaying an animated transition of the shared-location affordance 1410 turning into the location-sharing status bar 1412.

Figures 14C, 14D:
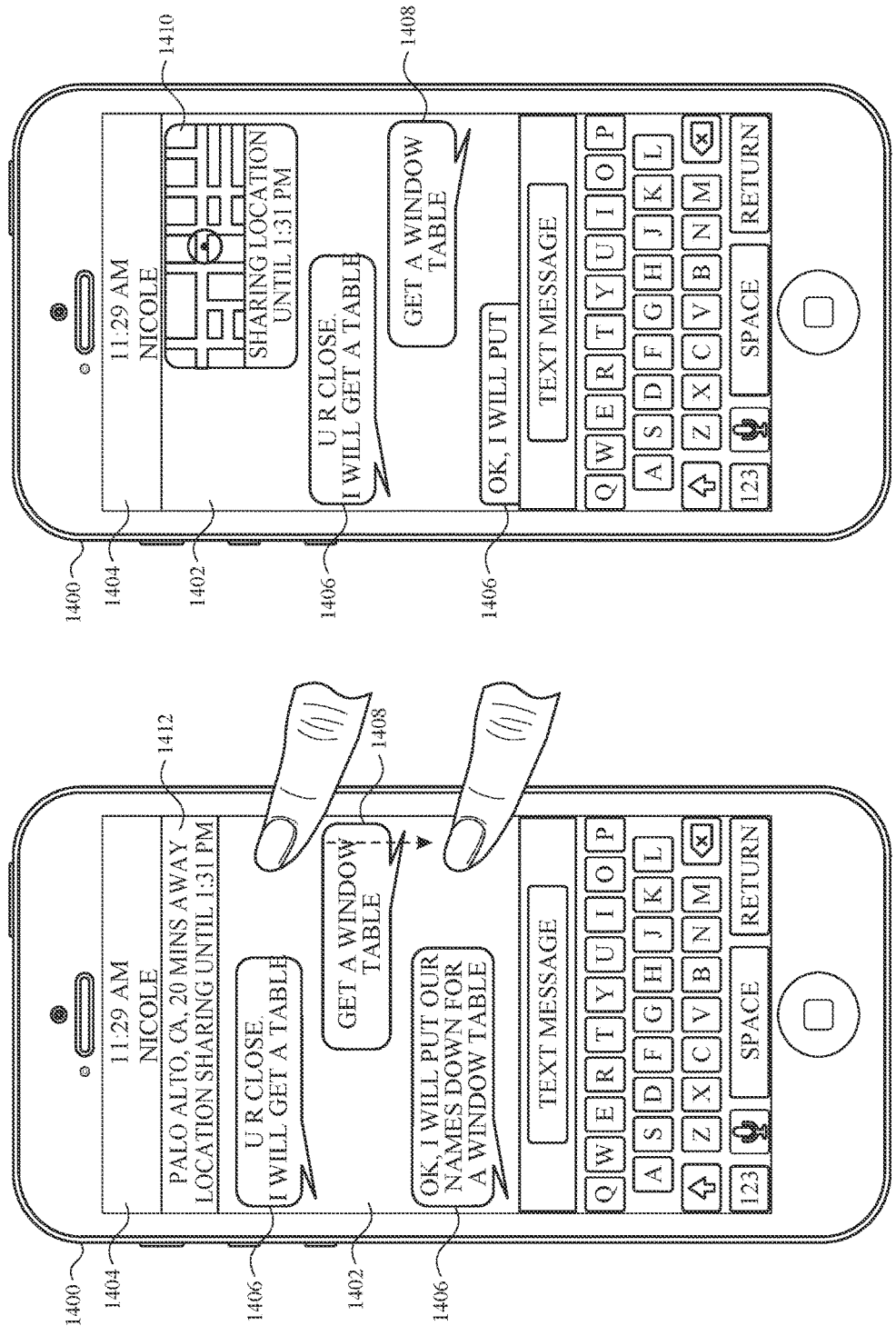
FIG. 14C illustrates exemplary messaging user interfaces.
FIG. 14D illustrates exemplary messaging user interfaces.

FIG. 14C illustrates a user scrolling down the message transcript of the message user interface with the location-sharing status bar 1412 outside the message region. In response to detecting the request to scroll the message transcript, device 1400 determines whether the request to scroll the message transcript comprises a request to display the shared-location affordance 1410 in the message region 1402. If the detected request is a request to scroll the shared-location affordance 1410 in the message region 1402, then device 1400 discontinues displaying the location-sharing status bar 1412 outside the message region and displays the shared-location affordance 1410 in the message region 1402 (see FIG. 14D).

In some embodiments, discontinuing displaying the location-sharing status bar 1412 and displaying the shared-location affordance 1410 includes displaying an animated transition of the location-sharing status bar 1412 turning into the shared-location affordance 1410.

In some embodiments, a location-sharing status bar includes an indication of a distance between the first participant and the second participant. In some embodiments, a location-sharing status bar includes an indication of a travel time between the first participant and the second participant. In some embodiments, a location-sharing status bar alternates from the indication of a distance between the first participant and the second participant to the indication of the travel time between the first participant and the second participant. In some embodiments, the travel time between the first participant and the second participant is determined by the distance between the first participant and the second participant and a mode of transport. In some embodiments, the location-sharing status bar includes a representation of at least one of a period of time until location sharing will end and a time of day until location sharing will end. In some embodiments, the location-sharing status bar includes one of a current location of the first participant and a map view depicting the current location of the first participant.

In some embodiments, selection of the location-sharing status bar results in launching a map view (e.g., a map displayed in a location sharing application) with a representation of a location of the first participant and the second participant.

In some embodiments, selection of a map view affordance results in display of an enlarged map view. In some embodiments, the map view affordance indicates that multiple message conversation participants are sharing their respective locations (for example, text stating multiple view locations are available). In such embodiments, in response to detecting a section of the map view affordance, device 1400 displays a map view comprising representations of the multiple message conversation participants.

Figure 14E:
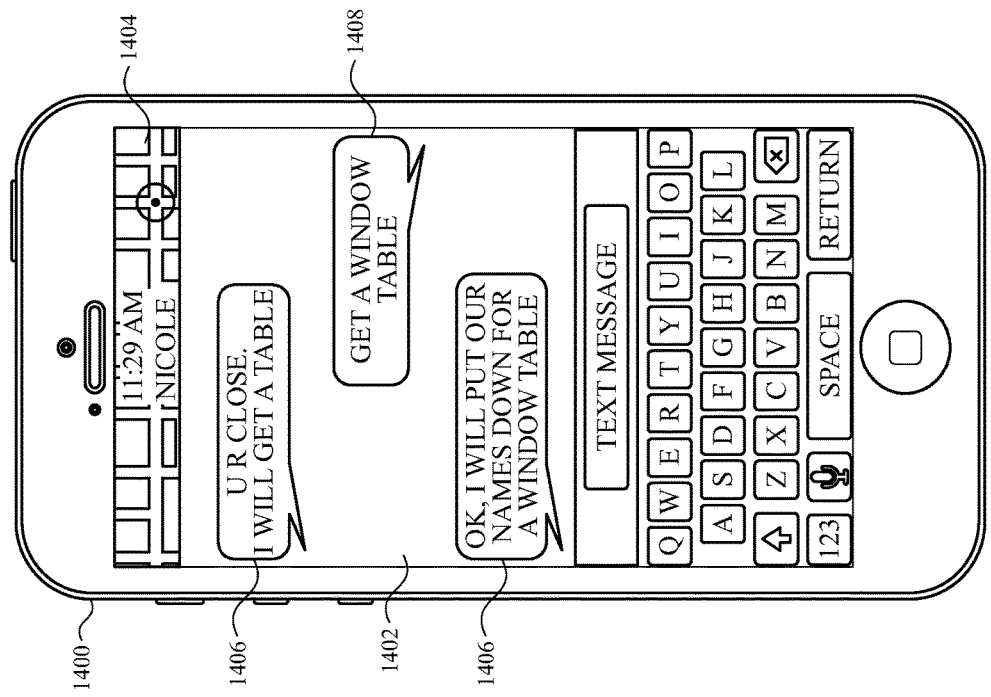
FIG. 14E illustrates exemplary messaging user interfaces.

FIG. 14E illustrates the message region after device 1400 has detected a request to scroll the message transcript of FIG. 14A. In the example of FIG. 14E, a message 1406 is added to the conversation. In response to detecting a request to scroll the message transcript such that the map 1410 is no longer displayed in the transcript 1402, the map view is displayed in the banner 1404 behind the name of the second participant and the current time of day. In the embodiment of the FIG. 14E, the location-sharing status bar comprises the banner 1404, which includes the name of the second participant and the current time of day, and the map view.

Advantageously, this allows an indication of location sharing to remain on the user interface, while continuing a message conversation. Optionally, the user is reminded of location sharing, even as new messages in the message conversation cause the transcript to scroll out of view. Further, the user can receive updates on the location of the other participant or the travel time to the other participant, for example, even as new messages are continuously added to the transcript. Further, by including the map view in the banner 1404, space in the message transcript 1402 is not occupied by information related to location sharing. This feature may improve the user's experience by allowing more messages in the message conversation to be displayed in the message transcript 1402.

In some embodiments, text of the banner (such as the time and name of the message participant in FIG. 14E) is also displayed. In some embodiments, text is not displayed in the banner when the map view is also displayed. In some embodiments, the location of the participant is displayed in the center of the banner. In some embodiments, the location of the participant is displayed off-center of the banner so that the text and location is optionally displayed without interference (as in FIG. 14E).

Figure 15A:
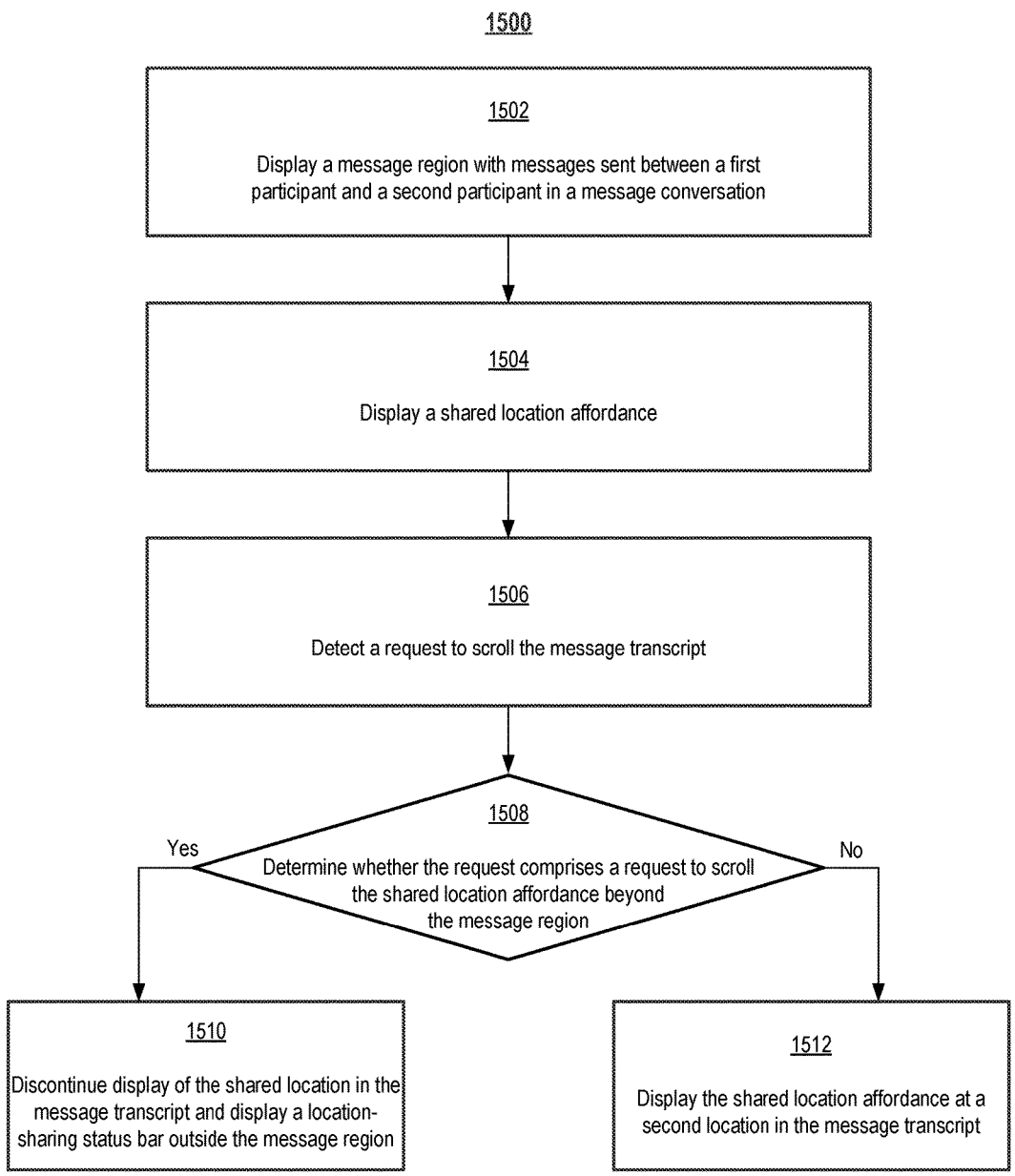
FIG. 15A is a flow diagram illustrating a process for sharing location information.

FIG. 15A is a flow diagram illustrating process 1500 for sharing a message participant's location information using an electronic device in accordance with some embodiments. Process 1500 is performed at an electronic device (e.g., device 100, 300, 500) with a display and a touch-sensitive surface. Some operations in process 1500 are optionally combined, the order of some operations is optionally changed, and some operations are optionally omitted.

As described below, process 1500 provides an intuitive way for sharing location information. The method reduces the cognitive burden on a user for sharing location information, thereby creating a more efficient human-machine interface. For battery-operated computing devices, enabling a user to share location information faster and more efficiently conserves power and increases the time between battery charges.

At block 1502, the device displays, on the display, a message region (e.g., message region 1402 in FIG. 14A) with messages sent (e.g., messages 1406 and 1408 in FIG. 14A) between a first participant and a second participant in a message conversation. At block 1504, the device displays at a first position in the message transcript, a shared location affordance (e.g., shared location affordance 1410 in FIG. 14A). While displaying the shared location affordance at the first position, at block 1506 detects a request to scroll the message transcript (e.g., receiving new message 1406 in FIG. 14B). In some embodiments, a request to scroll results from a user scrolling a transcript or a new message to push messages and map views up in the transcript. In response to detecting the request to scroll the message transcript, at block 1508 the device determines whether the request to scroll the message transcript comprises a request to scroll the shared location affordance beyond the message region (e.g., a request to scroll shared location affordance 1410 outside message region 1402 in FIG. 14B). In accordance with a determination that the request to scroll the message transcript comprises a request to scroll the shared location affordance beyond the message region, at block 1510 the device discontinues display of the shared location in the message transcript and displays a location-sharing status bar (e.g., location-sharing status bar 1412 in FIG. 14B) outside the message region. In some embodiments, discontinuing displaying the shared location affordance and displaying the location-sharing status bar includes displaying an animated transition of the shared location affordance turning into the location-sharing status bar. In accordance with a determination that the request to scroll the message transcript does not comprise a request to scroll the shared location affordance beyond the message region, at block 1512 the device displays the shared location affordance at a second location in the message transcript (e.g., a shared location affordance is displayed above its previous position in a message transcript).

Advantageously, this allows an indication of location sharing to remain on the user interface, while continuing a message conversation. Optionally, the user is reminded of location sharing, even as new messages in the message conversation cause the transcript to scroll out of view. Further, the user can receive updates on the location of the other participant or the travel time to the other participant, for example, even as new messages are continuously added to the transcript.

Figure 15B:
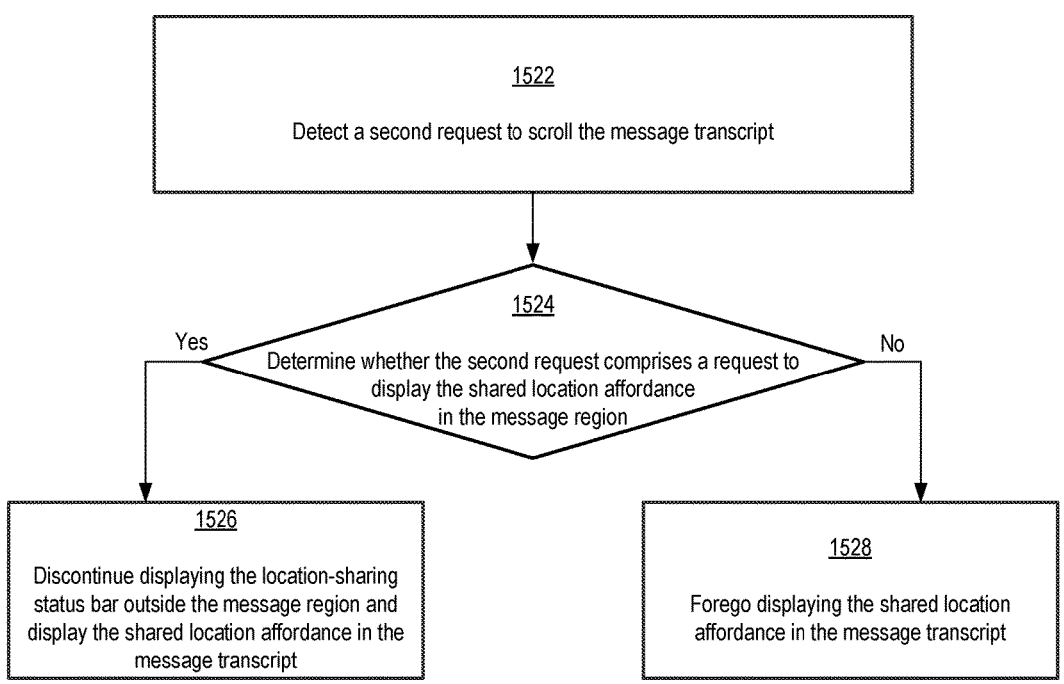
FIG. 15B is a flow diagram illustrating a process for sharing location information.

FIG. 15B is a flow diagram illustrating sub-process 1520 which is optionally performed during process 1500 (FIG. 15A). While displaying a location-sharing status bar outside the message region, at block 1522 the device detects a second request to scroll the message transcript (e.g., contact of the finger on the display of device 1400 in FIG. 14C, followed by movement of the finger in the direction of the arrow in FIG. 14C). In response to detecting the second request to scroll the message transcript, at block 1524 the device determines whether the second request to scroll the message transcript comprises a request to display the shared location affordance in the message region (e.g., display of shared-location affordance 1410 in FIG. 14D). In accordance with a determination that the second request to scroll the message transcript comprises a request to display the shared location affordance in the message region, at block 1526 the device discontinues displaying the location-sharing status bar outside the message region and displays the shared location affordance in the message transcript (e.g., display of shared location affordance 1410 in message transcript 1402 in FIG. 14D). In some embodiments, discontinuing displaying the location-sharing status bar and displaying the shared location affordance includes displaying an animated transition of the location-sharing status bar turning into the shared location affordance. In accordance with a determination that the second request to scroll the message transcript does not comprise a request to display the shared location affordance in the message region, at block 1528 the device forgoes displaying the shared location affordance in the message transcript.

In some embodiments, the location-sharing status bar comprises an indication of a distance between the first participant and the second participant. In some embodiments, the location-sharing status bar comprises an indication of a travel time between the first participant and the second participant (e.g., "20 mins away" in location-sharing status bar 1412 in FIG. 14B). In some embodiments, the location-sharing status bar alternates from the indication of a distance between the first participant and the second participant to the indication of the travel time between the first participant and the second participant. In some embodiments, the travel time between the first participant and the second participant is determined by the distance between the first participant and the second participant and a mode of transport. In some embodiments, the location-sharing status bar comprises a map view in a banner (e.g., the map view in banner 1404 in FIG. 14E) that includes the name of the second participant and a current time of day, where the map view is displayed behind the name of the second participant and a current time of day.

FIG. 15C is a flow diagram illustrating sub-process 1530 which is optionally performed during process 1500 (FIG. 15A). In the embodiment of FIG. 15C, the location-sharing status bar is selectable. At block 1532, the device detects a selection of the location-sharing status bar (e.g., detecting contact on device 1400 at point corresponding to location-sharing status bar 1412). In response to detecting a selection of the location-sharing status bar, at block 1534 the device launches a map view (e.g., a map displayed in a location sharing application), wherein the map view includes a representation of a location of the first participant and a location of the second participant.

In some embodiments, the location-sharing status bar comprises a representation of at least one of a period of time until location sharing will end and a time of day until location sharing will end. In some embodiments, the location-sharing status bar comprises one selected from the group consisting of a current location of the first participant and a map view depicting the current location of the first participant.

Figure 15D:
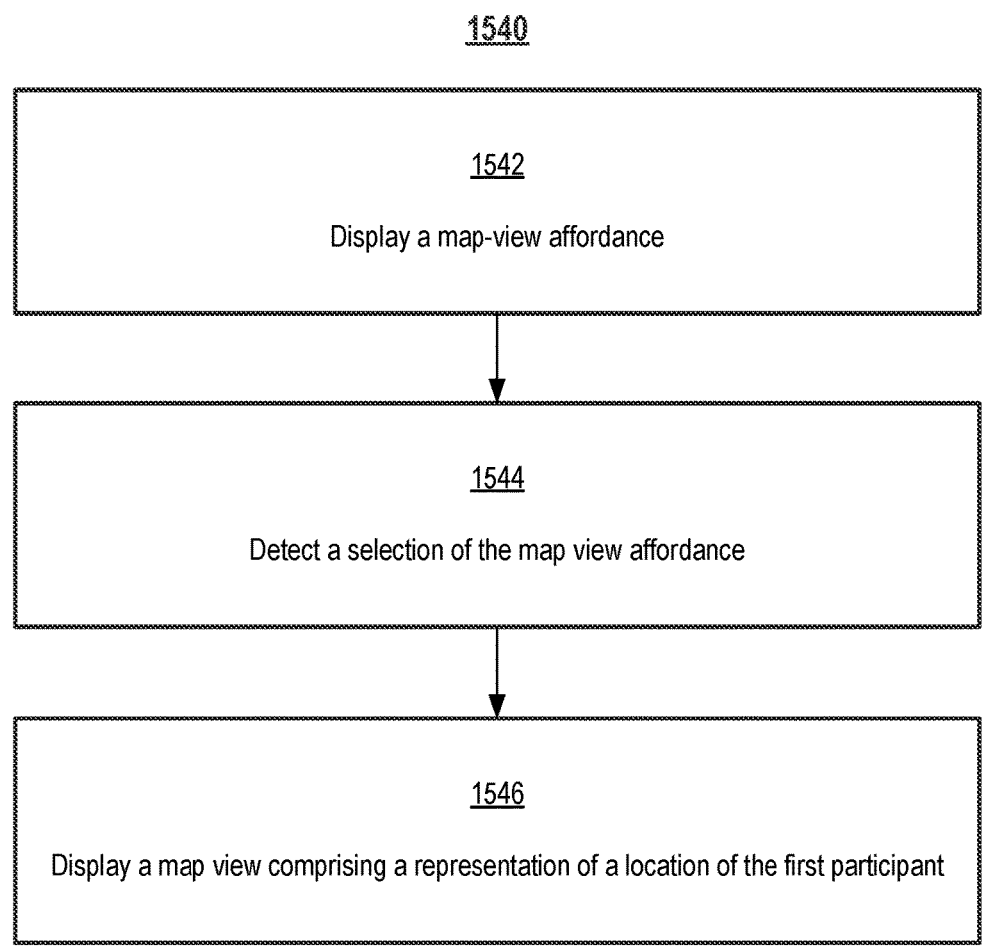
FIG. 15D is a flow diagram illustrating a process for sharing location information.

FIG. 15D is a flow diagram illustrating sub-process 1540, which is optionally performed during process 1500 (FIG. 15A). At block 1542, the device displays a map-view affordance (e.g., map-view affordance 1410 in FIG. 14A). At block 1544, the device detects a selection of the map view affordance. In response to detecting a selection of the map view affordance, at block 1546 displays a map view comprising a representation of a location of the first participant. In some embodiments, the map view affordance indicates that multiple message conversation participants are sharing their respective locations (for example, text stating that multiple view locations are available) and further in response to detecting a selection of the map view affordance, the device displaying a map view comprising representations of respective locations of the multiple message conversation participants.

In some embodiments, displaying a location-sharing status bar outside of the message region comprises displaying the location-sharing status bar above and adjacent to the message region.

Note that details of the processes described above with respect to process 1500 (e.g., FIGS. 15A-15D) are also applicable in an analogous manner to the processes described herein. For example, processes 700, 900, 1200, 1800, and 2000 optionally include one or more of the characteristics of the various processes described above with reference to process 1500. For example, determine block 1508 is optionally incorporated in any of processes 700, 900, 1200, 1800, and/or 2000. Additionally, the conversations, location sharing affordances, shared location affordances, location-sharing time periods, participants, participant location information, location sharing extensions, scroll detection, display of shared location affordances, map views, and location-sharing status bars described above with reference to process 1500, or sub-processes 1520, 1530, and 1540, optionally share some or all of the characteristics with the conversations, location sharing affordances, shared location affordances, location-sharing time periods, participants, participant location information, location sharing extensions, scroll detection, display of shared location affordances, map views, and location-sharing status bars described with reference to processes 700, 900, 1200, 1800, and/or 2000, or sub-processes 720, 726, 732, 738, 744, 750, 760, 770, 790, 1220, 1230, 1240, 1250, 1260, 1270, 1280, 1810, 1820, 1830, 1840, 2010, and/or 2020. For brevity, these details are not repeated in the descriptions of the other processes. The various methods and techniques described above with reference to method 1500, or sub-processes 1520, 1530, and 1540, are optionally implemented as one or more units, such as those described with regard to FIG. 16.

Figure 16:
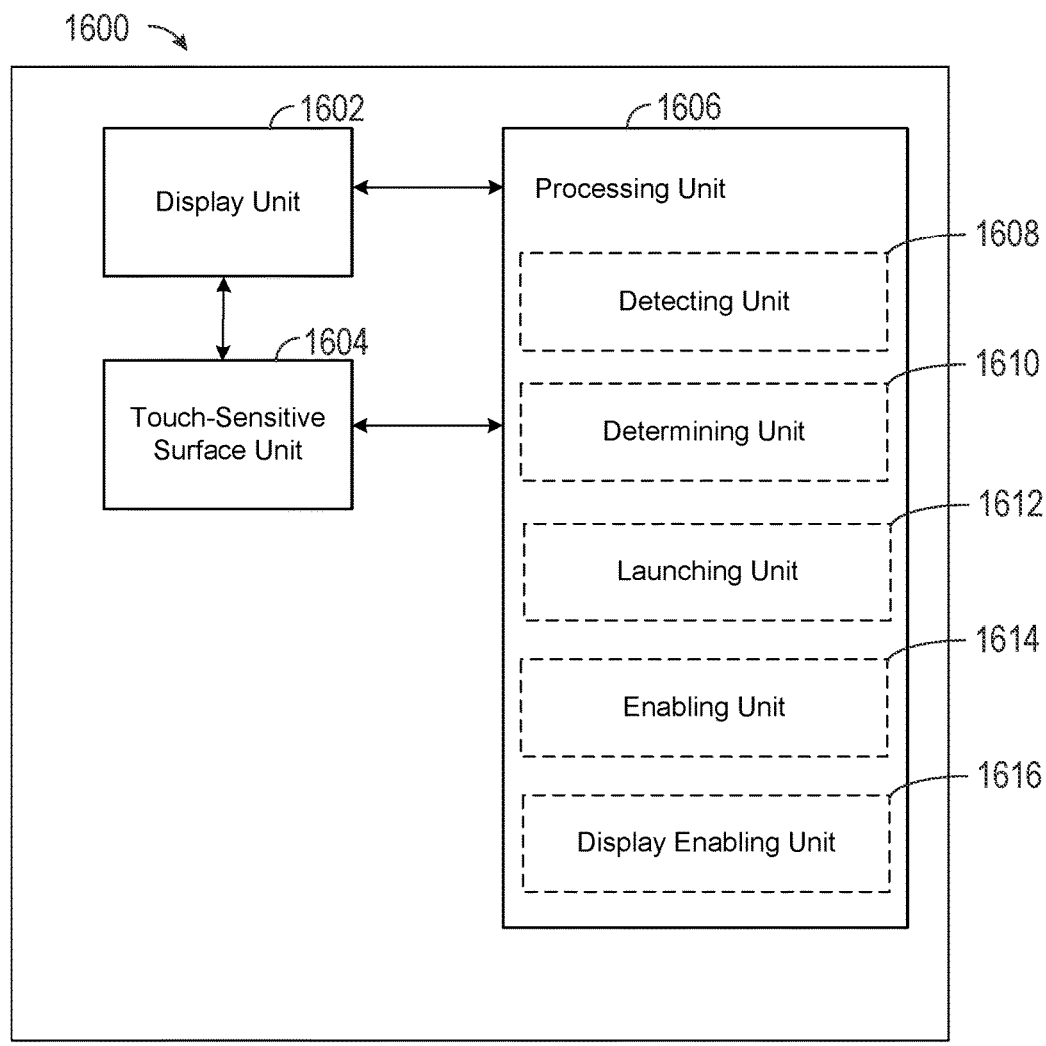
FIG. 16 illustrates an exemplary functional block diagram of an electronic device configured for sharing location information.

In accordance with some embodiments, FIG. 16 shows an exemplary functional block diagram of an electronic device 1600 configured in accordance with the principles of the various described embodiments. In accordance with some embodiments, the functional blocks of electronic device 1600 are configured to perform the techniques described above. The functional blocks of the device 1600 are, optionally, implemented by hardware, software, or a combination of hardware and software to carry out the principles of the various described examples. It is understood by persons of skill in the art that the functional blocks described in FIG. 16 are, optionally, combined or separated into sub-blocks to implement the principles of the various described examples. Therefore, the description herein optionally supports any possible combination or separation or further definition of the functional blocks described herein.

As shown in FIG. 16, an electronic device 1600 includes a display unit 1602 configured to display a graphic user interface, optionally, a touch-sensitive surface unit 1604 configured to receive contacts, and a processing unit 1606 coupled to the display unit 1602 and, optionally, the touch-sensitive surface unit 1604. In some embodiments, the processing unit 1606 includes a detecting unit 1608, a determining unit 1610, a launching unit 1612, an enabling unit 1614, and a display enabling unit 1616.

The processing unit 1606 is configured to: enable display (e.g., with display enabling unit 1616), on the display unit 1602, of a message region; enable display (e.g., with display enabling unit 1616), in the message region, of a message transcript of messages sent between a first participant and a second participant; enable (e.g., with enabling unit 1614) display (e.g., with display unit 1302), at a first position in the message transcript, of a shared-location affordance; while displaying the shared-location affordance at the first position, detect (e.g., with detecting unit 1608) a request to scroll the message transcript; in response to detecting the request to scroll the message transcript: determine (e.g., with determining unit 1610) whether the request to scroll the message transcript comprises a request to scroll the shared-location affordance beyond the message region; in accordance with a determination that the request to scroll the message transcript comprises a request to scroll the shared-location affordance beyond the message region: discontinue display (e.g., with display unit 1602) of the shared location in the message transcript; and enable display (e.g., with display enabling unit 1616), on the display unit 1602, of a location-sharing status bar outside the message region; and in accordance with a determination that the request to scroll the message transcript does not comprise a request to scroll the shared-location affordance beyond the message region: enable display (e.g., with display enabling unit 1616), on the display unit, of the shared-location affordance at a second location in the message transcript.

In some embodiments, the processing unit is further configured to: while displaying a location-sharing status bar outside the message region, detect (e.g., with detecting unit 1608) a second request to scroll the message transcript; in response to detecting the second request to scroll the message transcript: determine (e.g., with determining unit 1610) whether the second request to scroll the message transcript comprises a request to display the shared-location affordance in the message region; in accordance with a determination that the second request to scroll the message transcript comprises a request to display the shared-location affordance in the message region: discontinue display (e.g., with display unit 1602) of the location-sharing status bar outside the message region; enable display (e.g., with display enabling unit 1616), on the display unit, of the shared-location affordance in the message transcript; and in accordance with a determination that the second request to scroll the message transcript does not comprise a request to display the shared-location affordance in the message region: forgo display (e.g., with display unit 1602) of the shared-location affordance in the message transcript.

In some embodiments, the location-sharing status bar comprises an indication of a distance between the first participant and the second participant.

In some embodiments, the location-sharing status bar comprises an indication of a travel time between the first participant and the second participant.

In some embodiments, the location-sharing status bar alternates from the indication of a distance between the first participant and the second participant to the indication of the travel time between the first participant and the second participant.

In some embodiments, the travel time between the first participant and the second participant is determined by the distance between the first participant and the second participant and a mode of transport.

In some embodiments, the location-sharing status bar is selectable, and wherein the processing unit is further configured to: detect (e.g., with detecting unit 1608) a selection of the location-sharing status bar; and in response to detecting a selection of the location-sharing status bar: launch (e.g., with launching unit 1612) a map view, wherein the map view comprises a representation of a location of the first participant and a location of the second participant.

In some embodiments, the location-sharing status bar comprises a representation of at least one of a period of time until location sharing will end and a time of day until location sharing will end.

In some embodiments, the location-sharing status bar comprises one selected from the group consisting of a current location of the first participant and a map view depicting the current location of the first participant.

In some embodiments, the processing unit is further configured to: enable display (e.g., with display enabling unit 1616), on the display unit, of a map view affordance; detect (e.g., with detecting unit 1608) a selection of the map view affordance; and in response to detecting a selection of the map view affordance: enable display (e.g., with display enabling unit 1616), on the display unit, of a map view comprising a representation of a location of the first participant.

In some embodiments, the map view affordance indicates that multiple message conversation participants are sharing their respective locations, and wherein the processing unit is further configured to: further in response to detecting a selection of the map view affordance: enable display (e.g., with display enabling unit 1616), on the display unit, of a map view comprising representations of respective locations of the multiple message conversation participants.

In some embodiments, enabling display of a location-sharing status bar outside of the message region comprises enabling display of the location-sharing status bar above and adjacent to the message region.

The operations described above with reference to FIGS. 15A-15D are, optionally, implemented by components depicted in FIG. 1A-1B, 3, 5B, or 16. For example, display operation 1502, display operation 1504, detecting operation 1506, determining operation 1508, discontinue display operation 1510, and display operation 1512 is implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIG. 1A-1B, 3, 5B, or 16.

FIG. 17A illustrates an exemplary message user interface that is optionally displayed by device 1700. In some embodiments, the user interface is displayed on device 300 or device 500. The message user interface includes a message region 1702 for displaying messages 1706 and 1708 sent between a first participant (the user of device 1700) and a second participant in a message conversation and for displaying a banner 1704 including the name of the second participant and a current time of day. Messages sent between the participants are displayed inside bounded message areas. The message region also includes a map view 1710 with a representation of the first participant's location, indicating that location information is currently shared, below and adjacent the message transcript.

In some embodiments, device 1700 displays a representation of the first participant's updated location in the shared-location affordance as the first participant's location changes. In some embodiments, displaying the representation of the updated location includes shifting the map while maintaining the representation of the first participant in the same location on the display.

Figure 17C:
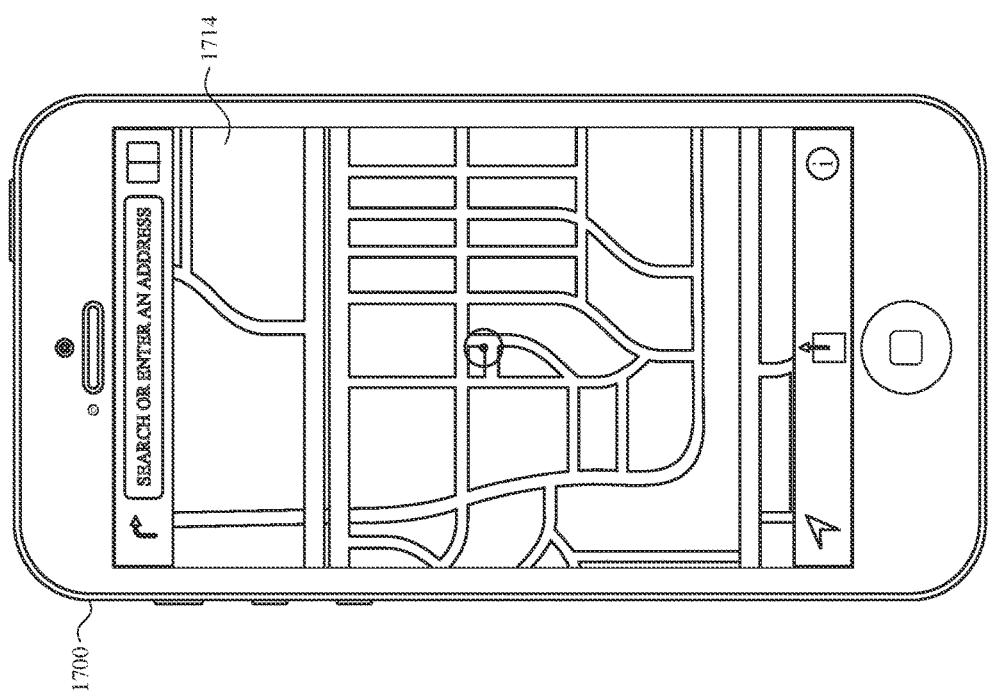
FIG. 17C illustrates exemplary map user interfaces.

FIG. 17B illustrates a user selecting map view 1710. In response to detecting the user's selection, device 1700 displays an enlarged map view 1714 (FIG. 17C) with a representation of the first participant at a location that corresponds to a location of the first participant.

In some embodiments, the selection is a predefined gesture, such as a single tap gesture, a double tap gesture, or a press and hold gesture (for example, a contact that is detected for more than a threshold amount of time). In some embodiments, if device 1700 determines that the characteristic of the gesture do not meet a predefined threshold, device 1700 forgoes enlarging the map view.

In some embodiments, device 1700 enlarges the map view with animation, such as a page curl or fade in. In some embodiments, enlarging the map view includes gradually enlarging the map view as a parameter associated with the gesture changes (for example, as a duration or intensity of the contact increases, the animation speed increases).

In some embodiments, a second map view is displayed if both participants are simultaneously sharing their locations (see FIG. 6H). In some embodiments, shared-location affordance 1710 continues to be displayed at the bottom of the transcript as new messages are added to the message transcript. In some embodiments, shared-location affordance 1710 includes a representation of the first participant, such as an avatar or a captured image.

In some embodiments, selection of a location-sharing affordance consists of a single contact. In response to the selection, device 1700 enables the second participant to obtain the first participant location information and displays a modified location-sharing affordance. (See, e.g., FIGS. 6A-6B). Advantageously, this single contact improves the user experience by minimizing the number of selections necessary to share location. In some embodiments, device 1700 enables the second participant to obtain the first participant location information without adding a new message to the message transcript.

In some embodiments, the second participant receives updated first participant location information as the first participant's location changes. In some embodiments, displaying a modified location-sharing affordance comprises replacing the location-sharing affordance with the modified location-sharing affordance. In some embodiments, a message compose field includes the modified location-sharing affordance. For example, the modified location-sharing affordance is displayed within a text entry field that is configured for entering text for draft messages. In some embodiments, tapping in the message compose field at a location that is away from the modified location-sharing affordance causes a cursor to be displayed in the message compose field (and, if a keyboard is not displayed, optionally, causes a soft keyboard to be displayed for entering text into the message compose field at the location of the cursor), while tapping in the message compose field at a location that corresponds to the location-sharing affordance toggles on/off location sharing. In some embodiments, the modified location-sharing affordance is discontinued after detection of a message composition.

FIG. 17D illustrates another option for displaying a shared location map. In FIG. 17D, shared-location affordance 1718 is a map view inserted at the bottom right corner of the message transcript 1702, similar to the shared-location affordance 1710 of FIG. 17A. Shared-location affordance 1718 has a rounded top corner at the center of the message transcript. The shared location affordance 1718 is optionally aligned to the same side of the message region as messages from the participant whose location is being shared (as illustrated in FIG. 17D, for example).

In some embodiments, the most recent message 1708 sent by the first participant is centered in the message transcript 1702. The tail of the most recent message 1708 is pointed toward the rounded corner of the shared-location affordance.

FIG. 17E illustrates the user interface of FIG. 17D after second participant location information is shared (as depicted by shared-location affordance 1722) and a new message 1720 is added by the second participant. As in FIG. 17D, the last message sent/received 1720 is centered in the message transcript 1702 and the other messages are aligned with the side of message transcript 1702.

In some embodiments, the displayed map region is not scrolled with the message transcript; it remains stationary in the message region as new messages are displayed. In this manner, participants can continue to view shared location information over the course of a message conversation, as the transcript continues to be scrolled.

FIG. 18A is a flow diagram illustrating process 1800 for sharing a message participant's location information using an electronic device in accordance with some embodiments. Process 1800 is performed at an electronic device (e.g., device 100, 300, 500) with a display and a touch-sensitive surface. Some operations in process 1800 are optionally combined, the order of some operations is optionally changed, and some operations are optionally omitted.

As described below, process 1800 provides an intuitive way for sharing location information. The method reduces the cognitive burden on a user for sharing location information, thereby creating a more efficient human-machine interface. For battery-operated computing devices, enabling a user to share location information faster and more efficiently conserves power and increases the time between battery charges.

At block 1802, the device displays, on the display, a message region (e.g., message region 1702 in FIG. 17A) with messages sent (e.g., messages 1706 and 1708 in FIG. 17A) between a first participant and a second participant in a message conversation. At block 1804, the device displays a shared location affordance (e.g., shared location affordance 1710 in FIG. 17A), in the message region, below and adjacent to the message transcript, wherein the shared location affordance comprises a representation of a location of the first participant. In some embodiments, the most recent message (e.g., message 1708 in FIG. 17D or message 1718 in FIG. 17E) in the message conversation is centered in the message transcript (e.g., message transcript 1702 in FIGS. 17D and 17E).

In some embodiments, the shared location affordance comprises a map view (e.g., map view 1710 in FIG. 17A).

FIG. 18B is a flow diagram illustrating sub-process 1810, which is optionally performed during process 1800 (FIG. 18A). At block 1812, the device detects a predefined gesture on the touch-sensitive surface at a position that corresponds to the shared location affordance (e.g., detecting contact on shared location affordance 1710 in FIG. 17B). In some embodiments, the selection is a predefined gesture, such as a single tap gesture, a double tap gesture, or a press and hold gesture (for example, a contact that is detected for more than a threshold amount of time). In response to detecting the predefined gesture, at block 1814 the device enlarges the map view (e.g., enlarged map view 1714 in FIG. 17C). In some embodiments, enlarging the map view includes animation, such as a page curl or fade in. In some embodiments, enlarging the map view includes gradually enlarging the map view as a parameter associated with the gesture changes (for example, as a duration or intensity of the contact increases, the animation speed increases). In some embodiments, if a device determines that the characteristic of the gesture do not meet a predefined threshold, the device forgoes enlarging the map view.

In some embodiments, the device displays the representation of the first participant on the map view at a position that corresponds to a location of the first participant.

FIG. 18C is a flow diagram illustrating sub-process 1820, which is optionally performed during process 1800 (FIG. 18A). At block 1822, the device displays a second map view in the message transcript (e.g., a second map view displayed in message region 1702 in FIG. 17A). At block 1824, the device displays a representation of the second participant at a position on the second map view that corresponds to a location of the second participant (e.g., map view 638 in FIG. 6H).

FIG. 18D is a flow diagram illustrating sub-process 1830 which is optionally performed during process 1800 (FIG. 18A). At block 1832, the device receives an updated location of the first participant. In response to receiving the updated location of the first participant, at block 1834, the device displays a representation of the updated location of the first participant in the shared location affordance associated with the first participant (e.g., by updating map view 1710 in FIG. 17B). In some embodiments, displaying the representation of the updated location includes shifting the map while maintaining the representation of the first participant in the same location on the display (e.g., by maintaining the solid circle and concentric line, while scrolling the background, in the map view of 1710).

Figure 18E:
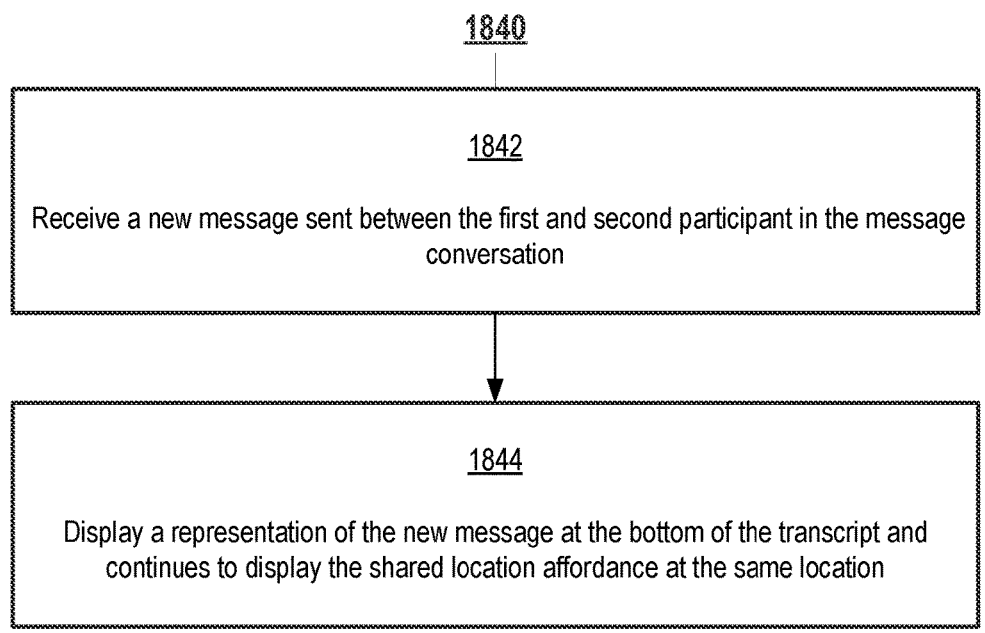
FIG. 18E is a flow diagram illustrating a process for sharing location information.

FIG. 18E is a flow diagram illustrating sub-process 1810, which is optionally performed during process 1800 (FIG. 18A). At block 1842, the device receives a new message sent between the first and second participant in the message conversation. In response to receiving the new message, at block 1844 the device displays a representation of the new message at the bottom of the transcript (e.g., new message 1720 is added to message transcript 1702 in FIG. 17E) and continues to display the shared location affordance at the same location (e.g., map view 1718 remains in position at the bottom right of the message transcript 1702 in FIG. 17A).

In some embodiments, the shared location affordance comprises a representation of the first participant, such as an avatar or a captured image.

Note that details of the processes described above with respect to process 1800 (e.g., FIGS. 18A-18E) are also applicable in an analogous manner to the processes described herein. For example, processes 700, 900, 1200, 1500, and 2000 optionally include one or more of the characteristics of the various processes described above with reference to process 1800. For example, display block 1802 is optionally incorporated in any of processes 700, 900, 1200, 1500, and/or 2000. Additionally, the conversations, location sharing affordances, shared location affordances, location-sharing time periods, participants, participant location information, location sharing extensions, map views, and detection of gestures described above with reference to process 1800, or sub-processes 1810, 1820, 1830, and 1840, optionally share some or all of the characteristics with the conversations, location sharing affordances, shared location affordances, location-sharing time periods, participants, participant location information, location sharing extensions, map views, and detection of gestures described with reference to processes 700, 900, 1200, 1500, and/or 2000, or sub-processes 720, 726, 732, 738, 744, 750, 760, 770, 790, 1220, 1230, 1240, 1250, 1260, 1270, 1280, 1520, 1530, 1540, 2010, and/or 2020. For brevity, these details are not repeated in the descriptions of the other processes. The various methods and techniques described above with reference to method 1800, or sub-processes 1810, 1820, 1830, and 1840, are optionally implemented as one or more units, such as those described with regard to FIG. 19.

Figure 19:
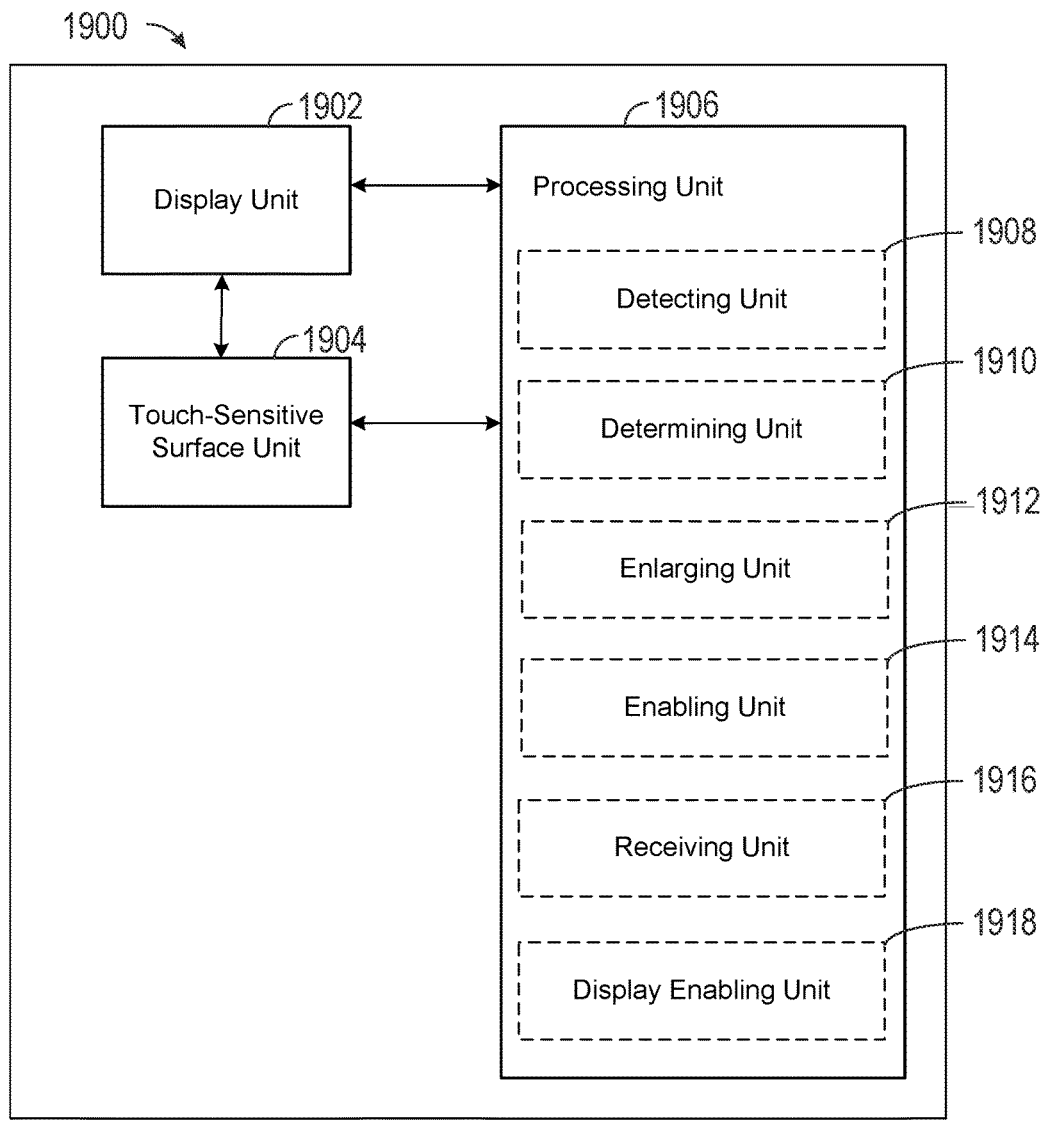
FIG. 19 illustrates an exemplary functional block diagram of an electronic device configured for sharing location information.

In accordance with some embodiments, FIG. 19 shows an exemplary functional block diagram of an electronic device 1900 configured in accordance with the principles of the various described embodiments. In accordance with some embodiments, the functional blocks of electronic device 1900 are configured to perform the techniques described above. The functional blocks of the device 1900 are, optionally, implemented by hardware, software, or a combination of hardware and software to carry out the principles of the various described examples. It is understood by persons of skill in the art that the functional blocks described in FIG. 19 are, optionally, combined or separated into sub-blocks to implement the principles of the various described examples. Therefore, the description herein optionally supports any possible combination or separation or further definition of the functional blocks described herein.

As shown in FIG. 19, an electronic device 1900 includes a display unit 1902 configured to display a graphic user interface, optionally, a touch-sensitive surface unit 1904 configured to receive contacts, and a processing unit 1906 coupled to the display unit 1902 and, optionally, the touch-sensitive surface unit 1904. In some embodiments, the processing unit 1906 includes a detecting unit 1908, a determining unit 1910, an enlarging unit 1912, an enabling unit 1914, a receiving unit 1916, and a display enabling unit 1918.

The processing unit 1906 is configured to: enable display (e.g., with display enabling unit 1918), on the display unit, of a message region; enable display (e.g., with display enabling unit 1918), in the message region, of a message transcript of messages sent between a first participant and a second participant; and enable display (e.g., with display unit 1902), on the display unit, of a shared-location affordance in the message region, wherein the shared-location affordance is displayed below and adjacent to the message transcript, and wherein the shared-location affordance comprises a representation of a location of the first participant.

In some embodiments, the shared-location affordance comprises a map view.

In some embodiments, the processing unit is further configured to: detect (e.g., with detecting unit 1908) a predefined gesture on the touch-sensitive surface at a position that corresponds to the shared-location affordance; in response to detecting the predefined gesture, enlarge (e.g., with enlarging unit 1912) the map view.

In some embodiments, enlarging the map view comprises gradually enlarging the map view as a parameter associated with the gesture changes.

In some embodiments, the processing unit is further configured to: enable (e.g., with enabling unit 1914) display, on the display unit, of the representation of the first participant on the map view at a position that corresponds to a location of the first participant.

In some embodiments, the processing unit is further configured to: enable (e.g., with enabling unit 1914) display, on the display unit, of a second map view in the message transcript; and enable display, on the display unit, of a representation of the second participant at a position on the second map view that corresponds to a location of the second participant.

In some embodiments, the processing unit is further configured to: receive (e.g., with receiving unit 1916) an updated location of the first participant; and in response to receiving the updated location of the first participant: enable (e.g., with enabling unit 1914) display, on the display unit, of a representation of the updated location of the first participant in the shared-location affordance associated with the first participant.

In some embodiments, the processing unit is further configured to: receive (e.g., with receiving unit 1916) a new message sent between the first and second participant in the message conversation; and in response to receiving the new message: enable (e.g., with enabling unit 1914) display, on the display unit, of a representation of the new message at the bottom of the transcript; and continue enabling display of the shared-location affordance at the same location.

In some embodiments, the shared-location affordance comprises a representation of the first participant.

The operations described above with reference to FIGS. 18A-18E are, optionally, implemented by components depicted in FIG. 1A-1B, 3, 5B, or 19. For example, display operation 1802 and display operation 1804 is implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIG. 1A-1B, 3, 5B, or 19.

FIG. 20A is a flow diagram illustrating process 2000 for sharing a message participant's location information using an electronic device in accordance with some embodiments. Process 2000 is performed at an electronic device (e.g., device 100, 300, 500) with a display and a touch-sensitive surface. Some operations in process 2000 are optionally combined, the order of some operations is optionally changed, and some operations are optionally omitted.

As described below, process 2000 provides an intuitive way for sharing location information. The method reduces the cognitive burden on a user for sharing location information, thereby creating a more efficient human-machine interface. For battery-operated computing devices, enabling a user to share location information faster and more efficiently conserves power and increases the time between battery charges.

At block 2002, the device displays, on the display, a message region (e.g., message region 602 in FIG. 6A) with messages sent (e.g., messages 606 and 608 in FIG. 6A) between a first participant and a second participant in a message conversation. At block 2004, the device displays a location-sharing affordance (e.g., location-sharing affordance 610 in FIG. 6A). At block 2006, the device detects a selection of the location-sharing affordance, wherein detecting a selection of the location-sharing affordance by the first participant consists of detecting a single contact by the first participant. In response to detecting a selection of the location-sharing affordance, at block 2008, the device enables the second participant to obtain the first participant location information and displays a modified location-sharing affordance (e.g., modified location-sharing affordance 616 in FIG. 6B).

Advantageously, this single contact improves the user experience by minimizing the number of selections necessary to share location. In some embodiments, the device enables the second participant to obtain the first participant location information without adding a new message to the message transcript.

In some embodiments, enabling the second participant to obtain the first participant location information is performed without adding a new message to the message transcript.

FIG. 20B is a flow diagram illustrating sub-process 2010, which is optionally performed during process 2000 (FIG. 20A). At block 2012, the device receives an updated location of the first participant. In response to receiving an updated location of the first participant, at block 2014 the device enables the second participant to obtain the updated first participant location information (e.g., by providing updated map view 320 in FIG. 6C).

In some embodiments, displaying a modified location-sharing affordance comprises replacing the location-sharing affordance with the modified location-sharing affordance.

In some embodiments, the device displays a message compose field that includes a modified location-sharing affordance. For example, the modified location-sharing affordance is displayed within a text entry field that is configured for entering text for draft messages. In some embodiments, tapping in the message compose field at a location that is away from the modified location-sharing affordance causes a cursor to be displayed in the message compose field (and, if a keyboard is not displayed, optionally, causes a soft keyboard to be displayed for entering text into the message compose field at the location of the cursor), while tapping in the message compose field at a location that corresponds to the location-sharing affordance toggles on/off location sharing. In some embodiments, the modified location-sharing affordance is discontinued after detection of a message composition.

FIG. 20C is a flow diagram illustrating sub-process 2020, which is optionally performed during process 2000 (FIG. 20A). At block 2022, the device detects a message composition (e.g., by selection of the text message entry affordance 1110 in FIG. 11C). In response to detecting a message composition, at block 2024 the device discontinues displaying the modified location-sharing affordance (e.g., by not displaying modified location-sharing affordance 616 in FIG. 6B).

In some embodiments, the modified location-sharing affordance is a toggle.

Note that details of the processes described above with respect to process 2000 (e.g., FIGS. 20A-20C) are also applicable in an analogous manner to the processes described herein. For example, processes 700, 900, 1200, 1500, and 1800 optionally include one or more of the characteristics of the various processes described above with reference to process 2000. For example, enable block 2008 is optionally incorporated in any of processes 700, 900, 1200, 1500, and/or 1800. Additionally, the conversations, location sharing affordances, shared location affordances, location-sharing time periods, participants, participant location information, location sharing extensions, selection detection, and responses to selection detection described above with reference to process 2000, or sub-processes 2010 and 2020, optionally share some or all of the characteristics with the conversations, location sharing affordances, shared location affordances, location-sharing time periods, participants, participant location information, location sharing extensions, selection detection, and responses to selection detection described with reference to processes 700, 900, 1200, 1500, and/or 1800, or sub-processes 720, 726, 732, 738, 744, 750, 760, 770, 790, 1220, 1230, 1240, 1250, 1260, 1270, 1280, 1520, 1530, 1540, 1810, 1820, 1830, and/or 1840. For brevity, these details are not repeated in the descriptions of the other processes. The various methods and techniques described above with reference to method 2000, or sub-processes 2010 and 2020, are optionally implemented as one or more units, such as those described with regard to FIG. 21.

Figure 21:
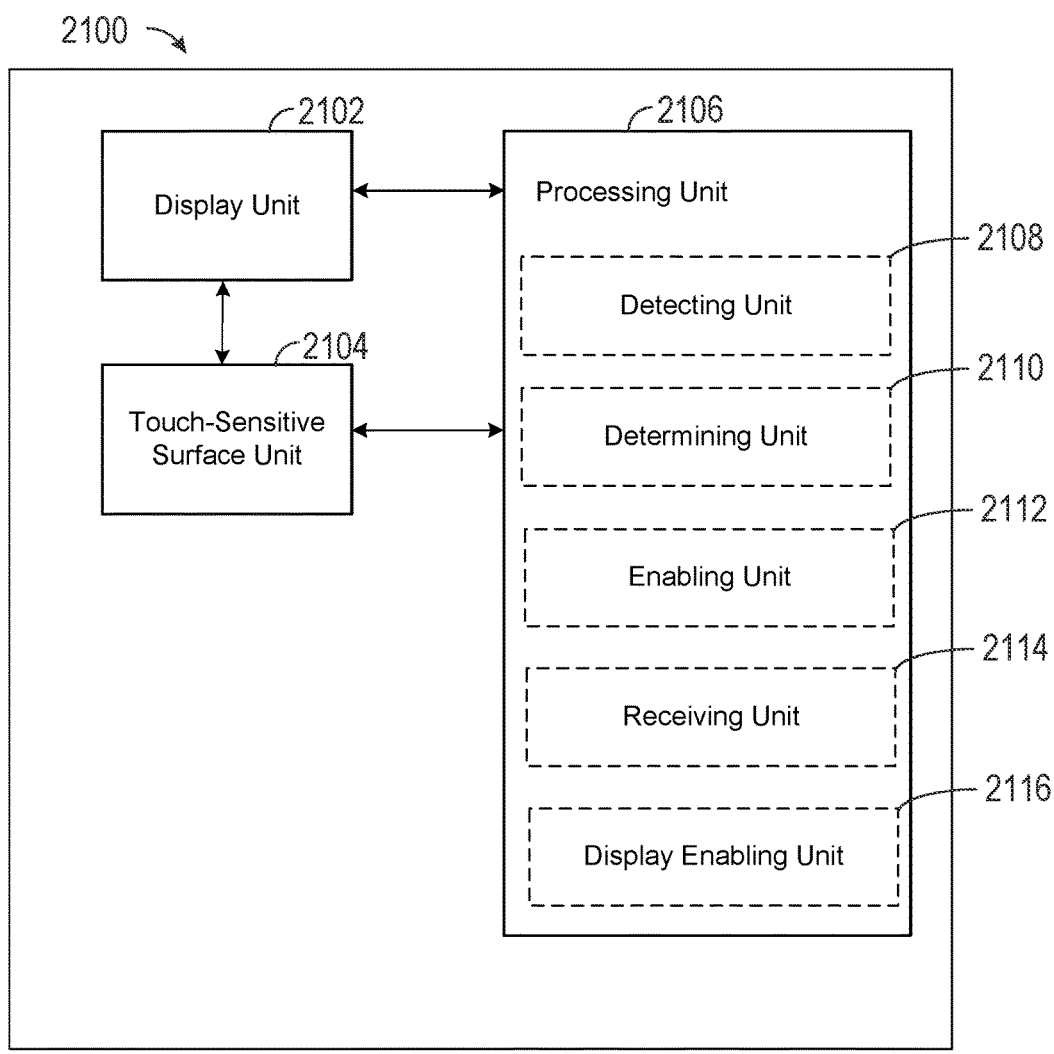
FIG. 21 illustrates an exemplary functional block diagram of an electronic device configured for sharing location information.

In accordance with some embodiments, FIG. 21 shows an exemplary functional block diagram of an electronic device 2100 configured in accordance with the principles of the various described embodiments. In accordance with some embodiments, the functional blocks of electronic device 2100 are configured to perform the techniques described above. The functional blocks of the device 2100 are, optionally, implemented by hardware, software, or a combination of hardware and software to carry out the principles of the various described examples. It is understood by persons of skill in the art that the functional blocks described in FIG. 21 are, optionally, combined or separated into sub-blocks to implement the principles of the various described examples. Therefore, the description herein optionally supports any possible combination or separation or further definition of the functional blocks described herein.

As shown in FIG. 21, an electronic device 2100 includes a display unit 2102 configured to display a graphic user interface, optionally, a touch-sensitive surface unit 2104 configured to receive contacts, and a processing unit 2106 coupled to the display unit 2102 and, optionally, the touch-sensitive surface unit 2104. In some embodiments, the processing unit 2106 includes a detecting unit 2108, a determining unit 2110, an enabling unit 2112, a receiving unit 2114, and a display enabling unit 2116.

The processing unit 2106 is configured to: enable display (e.g., with enabling unit 2116), on the display unit 2102, of a message region for displaying a message transcript of messages sent between a first participant and a second participant in a message conversation; enable display (e.g., with enabling unit 2116), on the display unit 2102, of a location-sharing affordance; detect (e.g., with enabling unit 2108) a selection of the location-sharing affordance, wherein detecting a selection of the location-sharing affordance by the first participant consists of detecting a single contact by the first participant; and in response to detecting a selection of the location-sharing affordance: enable (e.g., with enabling unit 2112) the second participant to obtain the first participant location information; and enable display, on the display unit, of a modified location-sharing affordance.

In some embodiments, enabling the second participant to obtain the first participant location information is performed without adding a new message to the message transcript.

In some embodiments, the processing unit is further configured to: receive (e.g., with receiving unit 2114) an updated location of the first participant; and in response to receiving an updated location of the first participant: enable (e.g., with enabling unit 2112) the second participant to obtain the updated location of the first participant.

In some embodiments, enabling display of a modified location-sharing affordance comprises enabling replacement of the location-sharing affordance with the modified location-sharing affordance.

In some embodiments, the processing unit is further configured to: enable display (e.g., with enabling unit 2116), on the display unit, of a message compose field, wherein the message compose field comprises the modified location-sharing affordance.

In some embodiments, the processing unit is further configured to: detect (e.g., with detecting unit 2108) a message composition; and in response to detecting a message composition: discontinue display of the modified location-sharing affordance.

In some embodiments, the modified location-sharing affordance is a toggle.

The operations described above with reference to FIGS. 20A-20C are, optionally, implemented by components depicted in FIG. 1A-1B, 3, 5B, or 21. For example, display operation 2002, display operation 2004, detect operation 2006, and enable operation 2008 is implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIG. 1A-1B, 3, 5B, or 21.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data optionally includes personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A mobile electronic device, comprising:
a touch-sensitive surface;
a display;
one or more processors; and
memory storing one or more programs configured to be executed by the one or more processors, the one or more programs including instructions for:
displaying, on the display, a message region;
displaying, in the message region, a message transcript of messages sent between a first participant and a second participant;
while displaying the message transcript of messages in the message region, detecting, via the touch-sensitive surface, one or more inputs directed to sharing a location of the first participant and
in response to detecting the one or more inputs, displaying a shared-location affordance in the message region, wherein the shared-location affordance comprises a map representation of a location of the first participant, wherein user input on the shared-location affordance causes display of an enlarged map view of the map representation corresponding to the location of the first participant, and wherein displaying the shared-location affordance in the message region comprises:
shifting, in an upwards direction, the message transcript in the message region; and
displaying the shared-location affordance is displayed below and adjacent to the message transcript; and
subsequent to displaying the shared-location affordance in the message region, displaying a new message of the message transcript of messages in the message region, wherein the new message is by the first participant or the second participant, and wherein displaying the new message comprises:
shifting, in an upwards direction, the message transcript and the shared-location affordance in the message region; and
displaying the new message below the shared-location affordance in the message region.

2. The electronic device of claim 1, wherein the shared-location affordance comprises a map view.

3. The electronic device of claim 2, wherein the one or more programs further include instructions for:
detecting a predefined gesture on the touch-sensitive surface at a position that corresponds to the shared-location affordance; and
in response to detecting the predefined gesture, enlarging the map view.

4. The electronic device of claim 3, wherein enlarging the map view comprises gradually enlarging the map view as a parameter associated with the gesture changes.

5. The electronic device of claim 2, wherein the one or more programs further include instructions for:
displaying the representation of the first participant on the map view at a position that corresponds to a location of the first participant.

6. The electronic device of claim 5, wherein the one or more programs further include instructions for:
displaying a second map view in the message transcript; and
displaying a representation of the second participant at a position on the second map view that corresponds to a location of the second participant.

7. The electronic device of claim 1, wherein the one or more programs further include instructions for:
receiving an updated location of the first participant; and
in response to receiving the updated location of the first participant, displaying a representation of the updated location of the first participant in the shared-location affordance associated with the first participant.

8. The electronic device of claim 1, wherein the one or more programs further include instructions for:
receiving a new message sent between the first and second participant in the message conversation; and
in response to receiving the new message:
displaying a representation of the new message at the bottom of the transcript; and
continuing display of the shared-location affordance at the same location.

9. The electronic device of claim 1, wherein the one or more programs further include instructions for:
receiving a new message sent between the first and second participant in the message conversation; and
in response to receiving the new message:
displaying a representation of the new message in the center of the transcript; and continuing display of the shared-location affordance at the same location.

10. The electronic device of claim 1, wherein the shared-location affordance comprises a representation of the first participant.

11. The electronic device of claim 1, wherein the shared-location affordance comprises a rounded corner toward the center of the message transcript.

12. A method comprising:
at a mobile electronic device with a touch-sensitive surface and a display:
displaying, on the display, a message region;
displaying, in the message region, a message transcript of messages sent between a first participant and a second participant;
while displaying the message transcript of messages in the message region, detecting, via the touch-sensitive surface, one or more inputs directed to sharing a location of the first participant and
in response to detecting the one or more inputs, displaying a shared-location affordance in the message region, wherein the shared-location affordance comprises a map representation of a location of the first participant, wherein user input on the shared-location affordance causes display of an enlarged map view of the map representation corresponding to the location of the first participant, and wherein displaying the shared-location affordance in the message region comprises:
shifting, in an upwards direction, the message transcript in the message region; and
displaying the shared-location affordance is displayed below and adjacent to the message transcript; and
subsequent to displaying the shared-location affordance in the message region, displaying a new message of the message transcript of messages in the message region, wherein the new message is by the first participant or the second participant, and wherein displaying the new message comprises:
shifting, in an upwards direction, the message transcript and the shared-location affordance in the message region; and
displaying the new message below the shared-location affordance in the message region.

13. A non-transitory computer-readable storage medium comprising one or more programs configured to be executed by one or more processors of a mobile electronic device with a touch-sensitive surface and a display, the one or more programs including instructions for:
displaying, on the display, a message region;
displaying, in the message region, a message transcript of messages sent between a first participant and a second participant;
while displaying the message transcript of messages in the message region, detecting, via the touch-sensitive surface, one or more inputs directed to sharing a location of the first participant and
in response to detecting the one or more inputs, displaying a shared-location affordance in the message region, wherein the shared-location affordance comprises a map representation of a location of the first participant, wherein user input on the shared-location affordance causes display of an enlarged map view of the map representation corresponding to the location of the first participant, and wherein displaying the shared-location affordance in the message region comprises:
shifting, in an upwards direction, the message transcript in the message region; and
displaying the shared-location affordance is displayed below and adjacent to the message transcript; and
subsequent to displaying the shared-location affordance in the message region, displaying a new message of the message transcript of messages in the message region, wherein the new message is by the first participant or the second participant, and wherein displaying the new message comprises:
shifting, in an upwards direction, the message transcript and the shared-location affordance in the message region; and
displaying the new message below the shared-location affordance in the message region.

14. The method of claim 12, wherein the shared-location affordance comprises a map view.

15. The method of claim 14, further comprising:
detecting a predefined gesture on the touch-sensitive surface at a position that corresponds to the shared-location affordance; and
in response to detecting the predefined gesture, enlarging the map view.

16. The method of claim 15, wherein enlarging the map view comprises gradually enlarging the map view as a parameter associated with the gesture changes.

17. The method of claim 14, further comprising:
displaying the representation of the first participant on the map view at a position that corresponds to a location of the first participant.

18. The method of claim 17, further comprising:
displaying a second map view in the message transcript; and
displaying a representation of the second participant at a position on the second map view that corresponds to a location of the second participant.

19. The method of claim 12, further comprising:
receiving an updated location of the first participant; and
in response to receiving the updated location of the first participant, displaying a representation of the updated location of the first participant in the shared-location affordance associated with the first participant.

20. The method of claim 12, further comprising:
receiving a new message sent between the first and second participant in the message conversation; and
in response to receiving the new message:
displaying a representation of the new message at the bottom of the transcript; and
continuing display of the shared-location affordance at the same location.

21. The method of claim 12, further comprising:
receiving a new message sent between the first and second participant in the message conversation; and
in response to receiving the new message:
displaying a representation of the new message in the center of the transcript; and
continuing display of the shared-location affordance at the same location.

22. The method of claim 12, wherein the shared-location affordance comprises a representation of the first participant.

23. The method of claim 12, wherein the shared-location affordance comprises a rounded corner toward the center of the message transcript.

24. The non-transitory computer-readable storage medium of claim 13, wherein the shared-location affordance comprises a map view.

25. The non-transitory computer-readable storage medium of claim 24, wherein the one or more programs further include instructions for:

detecting a predefined gesture on the touch-sensitive surface at a position that corresponds to the shared-location affordance; and in response to detecting the predefined gesture, enlarging the map view.

26. The non-transitory computer-readable storage medium of claim 25, wherein enlarging the map view comprises gradually enlarging the map view as a parameter associated with the gesture changes.

27. The non-transitory computer-readable storage medium of claim 24, wherein the one or more programs further include instructions for:

displaying the representation of the first participant on the map view at a position that corresponds to a location of the first participant.

28. The non-transitory computer-readable storage medium of claim 27, wherein the one or more programs further include instructions for:

displaying a second map view in the message transcript; and displaying a representation of the second participant at a position on the second map view that corresponds to a location of the second participant.

29. The non-transitory computer-readable storage medium of claim 13, wherein the one or more programs further include instructions for:

receiving an updated location of the first participant; and in response to receiving the updated location of the first participant, displaying a representation of the updated location of the first participant in the shared-location affordance associated with the first participant.

30. The non-transitory computer-readable storage medium of claim 13, wherein the one or more programs further include instructions for:

receiving a new message sent between the first and second participant in the message conversation; and in response to receiving the new message:
displaying a representation of the new message at the bottom of the transcript; and
continuing display of the shared-location affordance at the same location.

31. The non-transitory computer-readable storage medium of claim 13, wherein the one or more programs further include instructions for:

receiving a new message sent between the first and second participant in the message conversation; and in response to receiving the new message:
displaying a representation of the new message in the center of the transcript; and
continuing display of the shared-location affordance at the same location.

32. The non-transitory computer-readable storage medium of claim 13, wherein the shared-location affordance comprises a representation of the first participant.

33. The non-transitory computer-readable storage medium of claim 13, wherein the shared-location affordance comprises a rounded corner toward the center of the message transcript.

* * * * *